United States Patent [19]
Olnowich

[11] Patent Number: 5,933,428
[45] Date of Patent: Aug. 3, 1999

[54] TWO-TAILED ADAPTER FOR SCALABLE, NON-BLOCKING NETWORKS

[75] Inventor: Howard Thomas Olnowich, Broome County, N.Y.

[73] Assignee: International Business Machines Corporation, Armonk, N.Y.

[21] Appl. No.: 08/762,763

[22] Filed: Dec. 10, 1996

[51] Int. Cl.$^6$ .................................................... H04L 1/22
[52] U.S. Cl. ........................... 370/388; 370/220; 370/360
[58] Field of Search .................... 370/218–220, 370/226, 227, 357, 360, 380, 388, 386, 361, 350

[56] References Cited

U.S. PATENT DOCUMENTS

| | | | |
|---|---|---|---|
| 5,177,738 | 1/1993 | Dell'Oro et al. | 370/84 |
| 5,229,990 | 7/1993 | Teraslinna | 370/60 |
| 5,287,491 | 2/1994 | Hsu | 395/575 |
| 5,408,462 | 4/1995 | Opoczynski | 370/16 |
| 5,471,460 | 11/1995 | Tanabe | 370/16 |
| 5,654,695 | 8/1997 | Olnowich et al. | 340/825.01 |
| 5,737,628 | 4/1998 | Birrittella | 395/800.11 |

*Primary Examiner*—Chi H. Pham
*Assistant Examiner*—Kim T. Nguyen
*Attorney, Agent, or Firm*—Shelley M Beckstrand

[57] ABSTRACT

An adapter with two or more tails for interconnecting a node to a multi-stage interconnection network. The plurality of tails create various options. Option 1 connects a 2-tailed adapter to two sub-networks comprising the same network to provide cost effective non-blocking networks. Both serial and parallel searches through the sub-networks for non-blocked paths are supported. Option 2 connects the 2-tailed adapter to redundant networks to provide fault tolerance in case of the failure of one network. Option 3 forms direct connections amongst two or three nodes without requiring a central switch. Instead, each tail provides a direct link to a different node. Option 4 extends the adapter to provide additional tails; 3-tailed adapters provide direct links amongst four nodes, 4-tailed adapters provide direct links amongst five nodes, etc. Option 5 interconnects similar multi-tailed adapters to provide ring or hyper-cube networks without requiring a central switch.

16 Claims, 59 Drawing Sheets

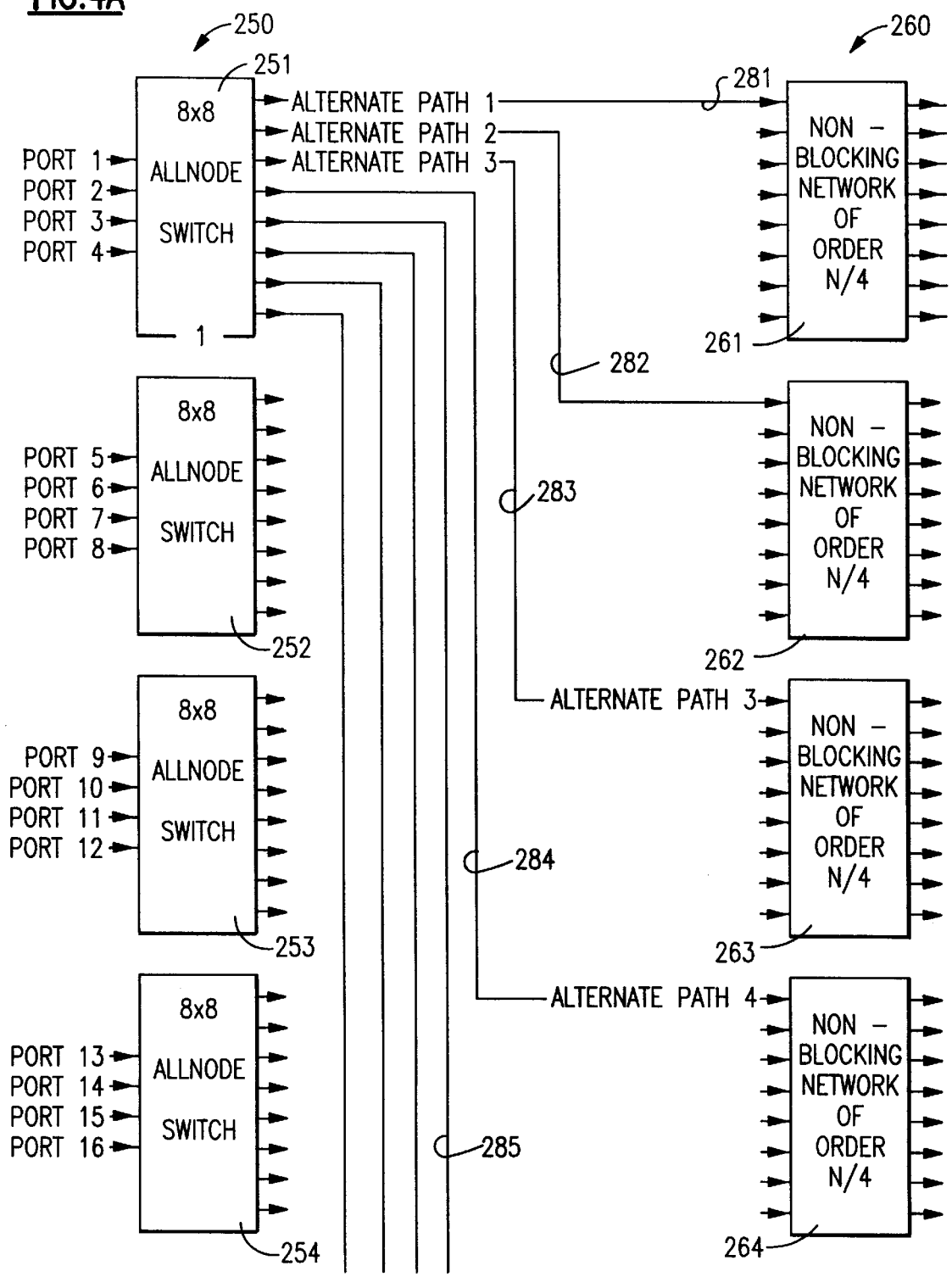

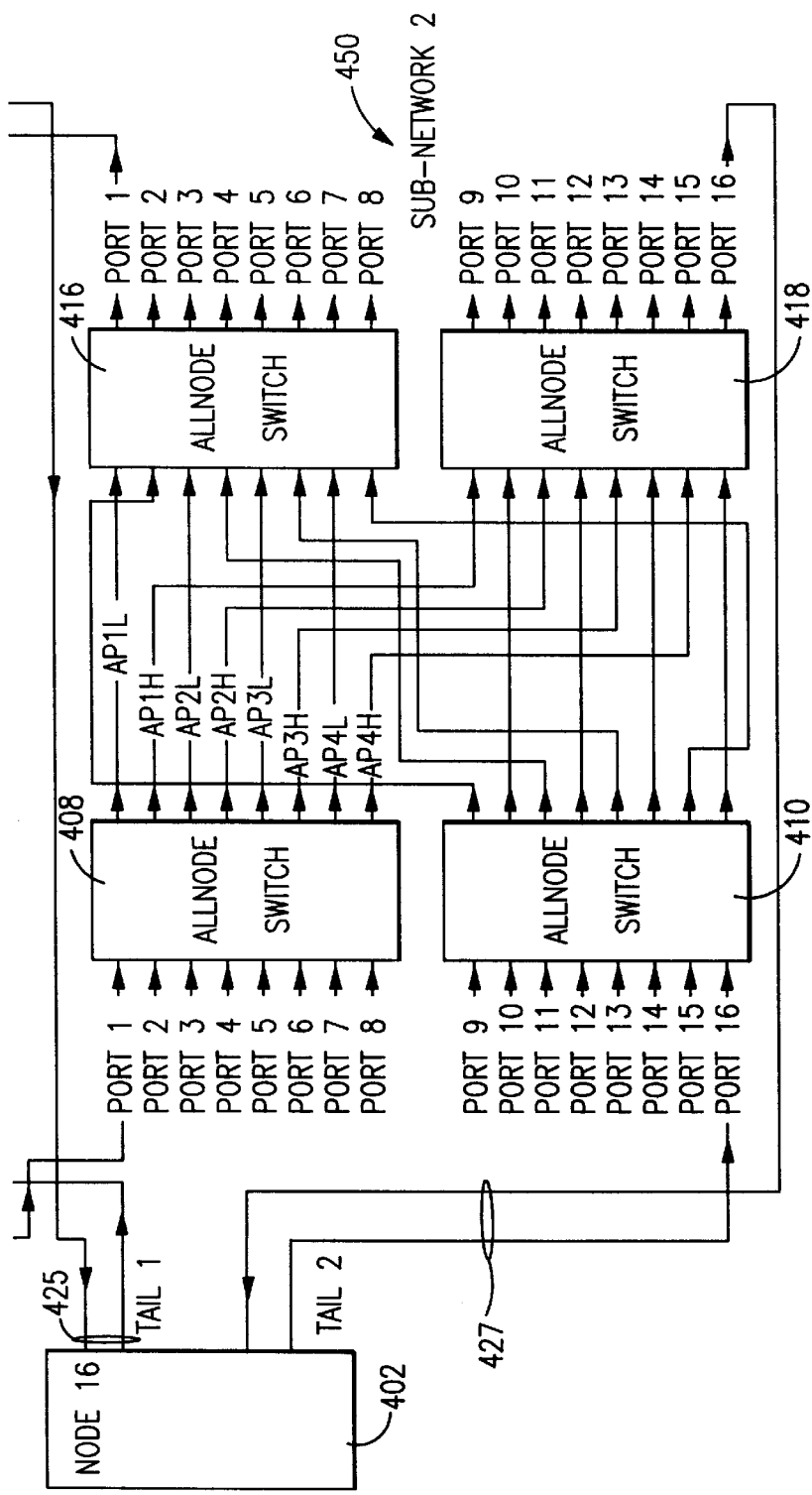
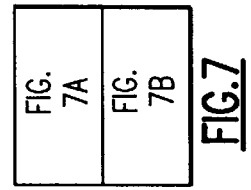
FIG. 7B

| NODES | NON-BLOCKING CLOS CHIPS | CHIPS/NODE | 8 ALTERNATE PATHS CHIPS | CHIPS/NODE | NON-BLOCKING ALLNODE CHIPS | CHIPS/NODE |
|---|---|---|---|---|---|---|
| 8 | 1 | 1/8 | 1 | 1/8 | 1 | 1/8 |
| 16 | 12 | 3/4 | 6 | 3/8 | 12 | 3/4 |
| 32 | 24 | 3/4 | 12 | 3/8 | 24 | 3/4 |
| 64 | 128 | 2 | 24 | 3/8 | 48 | 3/4 |
| 128 | 256 | 2 | 80 | 2/3 | 128 | 1 |
| 256 | 1152 | 4.5 | 160 | 2/3 | 320 | 1.25 |
| 512 | 2304 | 4.5 | 320 | 2/3 | 640 | 1.25 |
| 1024 | 9728 | 9.5 | 896 | 7/8 | 2560 | 2.5 |
| 2048 | 19456 | 9.5 | 1792 | 7/8 | 5120 | 2.5 |
| 4096 | 79872 | 19.5 | 3584 | 7/8 | 10240 | 2.5 |
| 8192 | 159744 | 19.5 | 9216 | 9/8 | 40960 | 5.0 |
| 16K | 647168 | 39.5 | 18432 | 9/8 | 81920 | 5.0 |
| 32K | 1294336 | 39.5 | 36864 | 9/8 | 163840 | 5.0 |
FIG.10
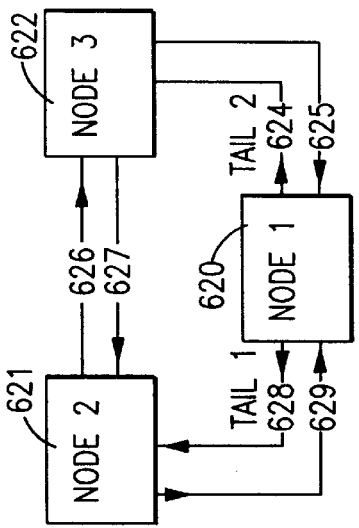
FIG.12B
DIRECT LINKS AMONGST 3 NODES
(USES 2 TAILS PER NODE)
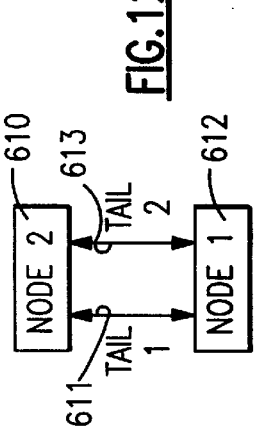
FIG.12A

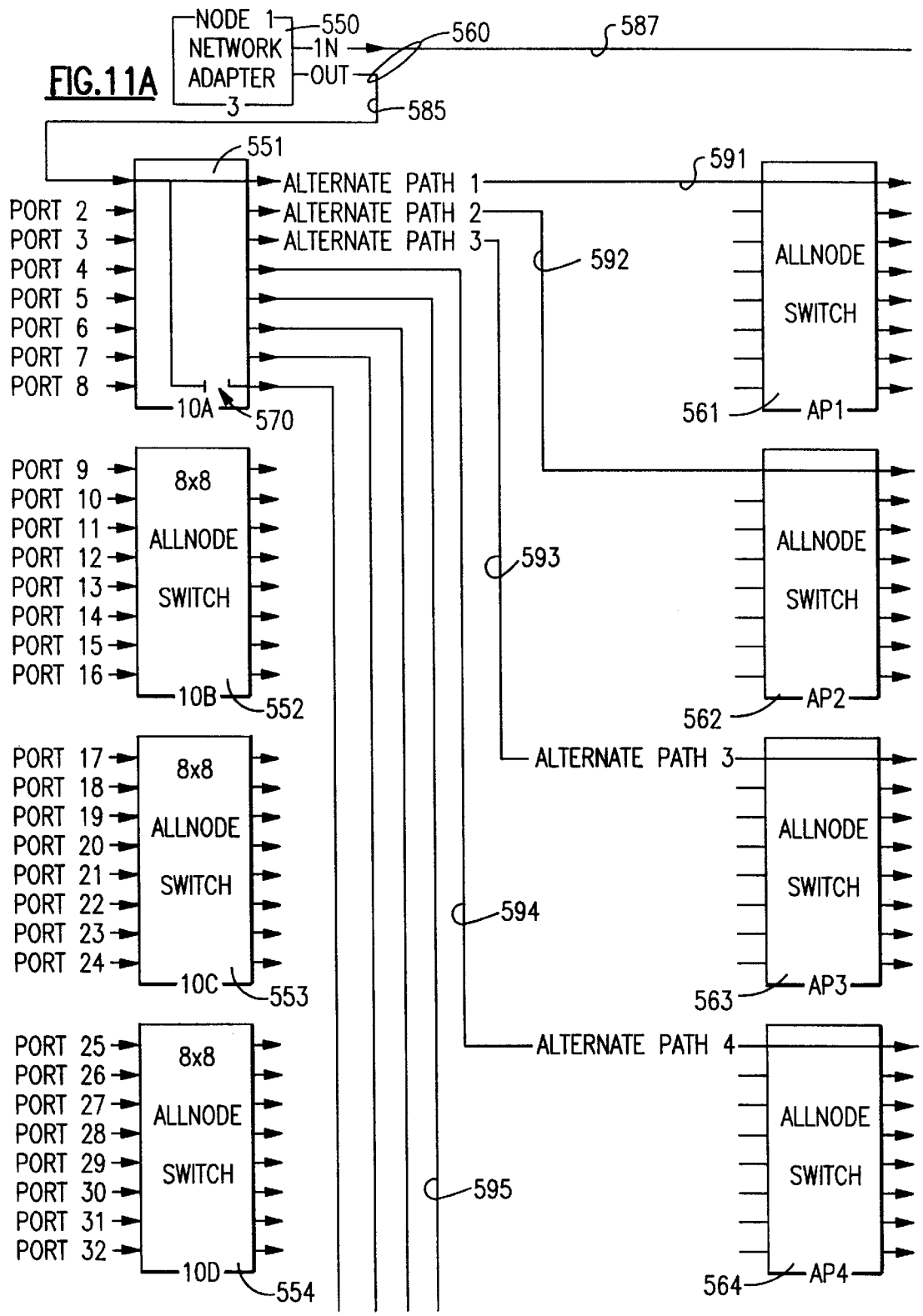

RING NETWORK AMONGST 4 NODES
(USES 2 TAILS PER NODE)

D) CUBE NETWORK AMONGST 8 NODES
(USES 3 TAILS PER NODE)

DIRECT LINKS AMONGST 4 NODES
(USES 3 TAILS PER NODE)

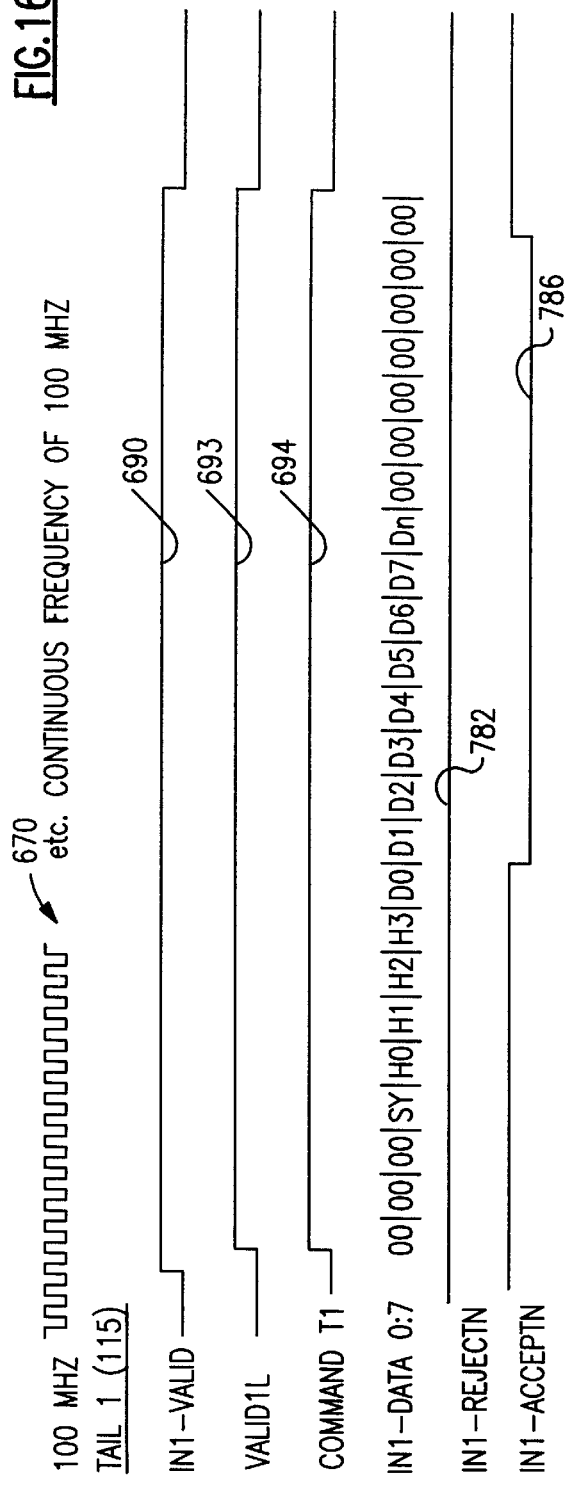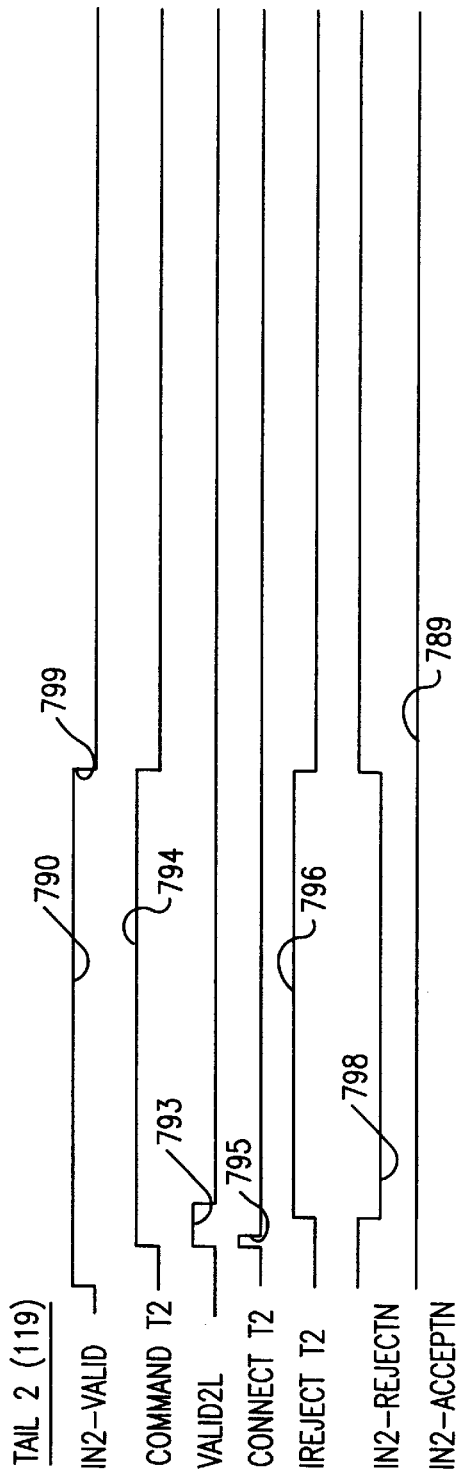
FIG.16A(a)

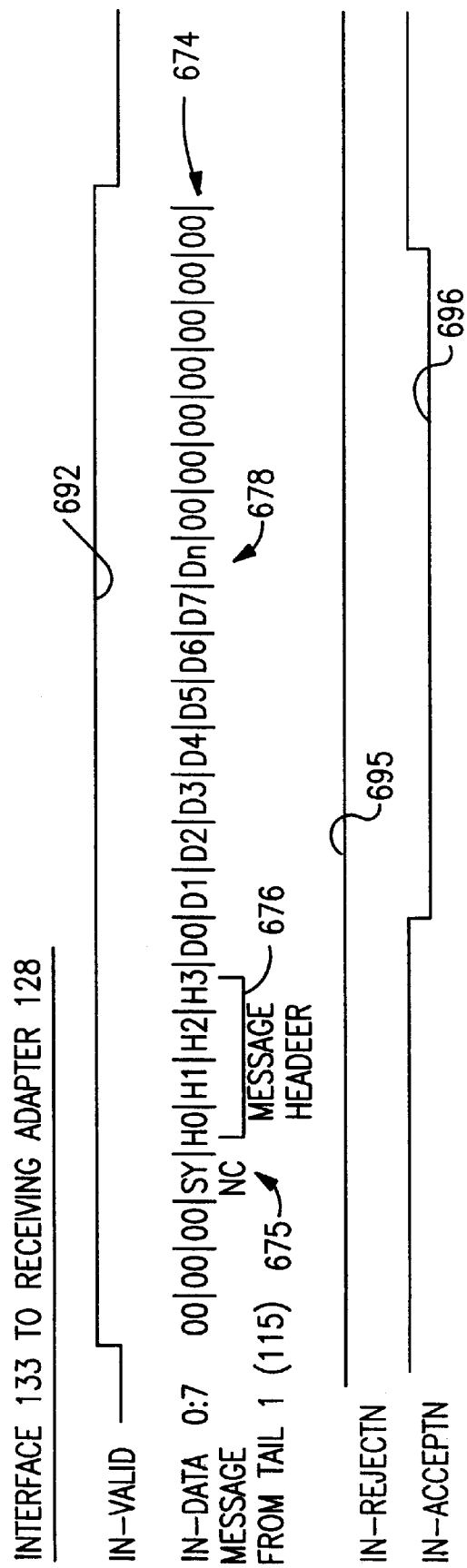
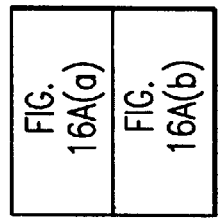
FIG.16A(b)

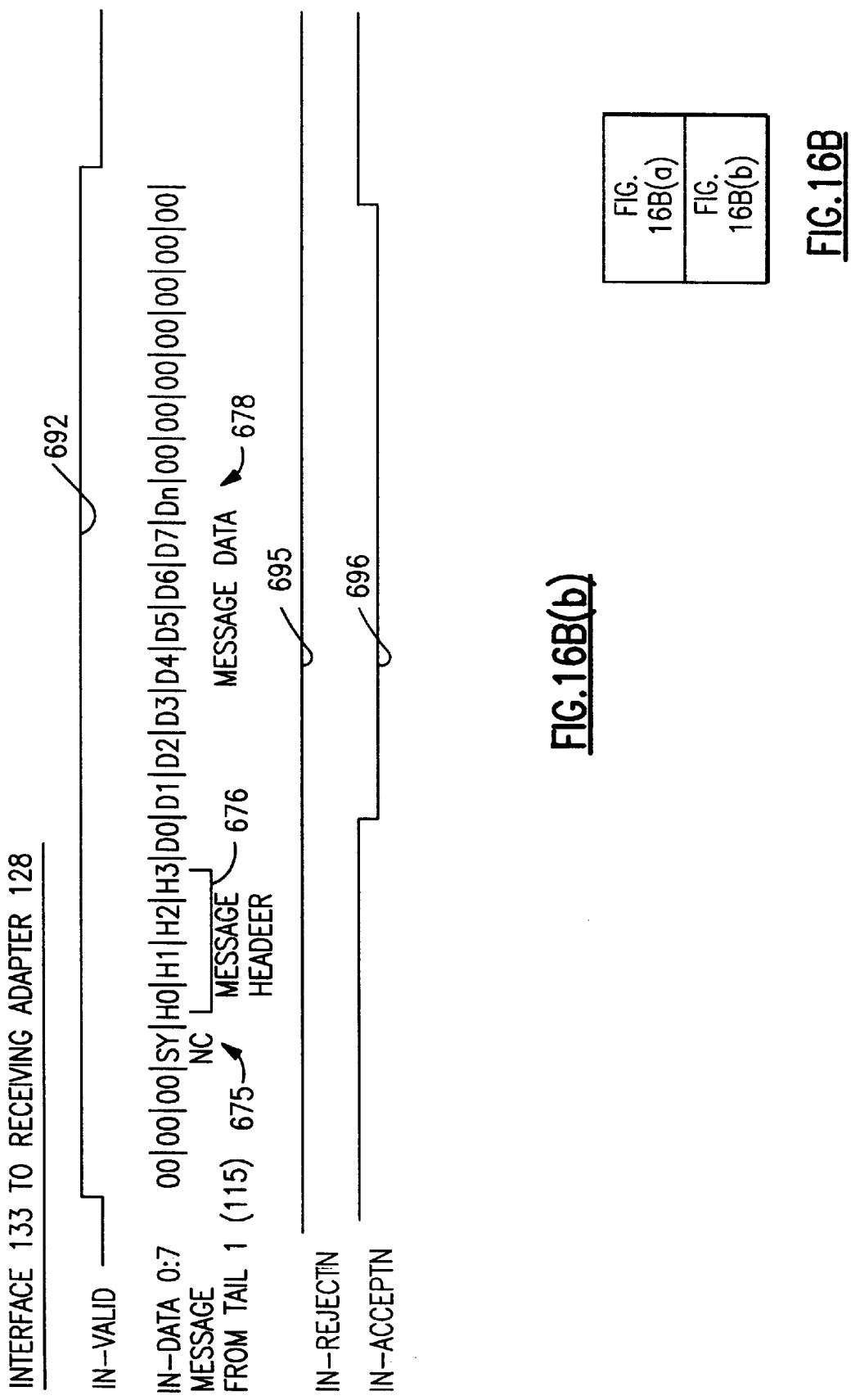

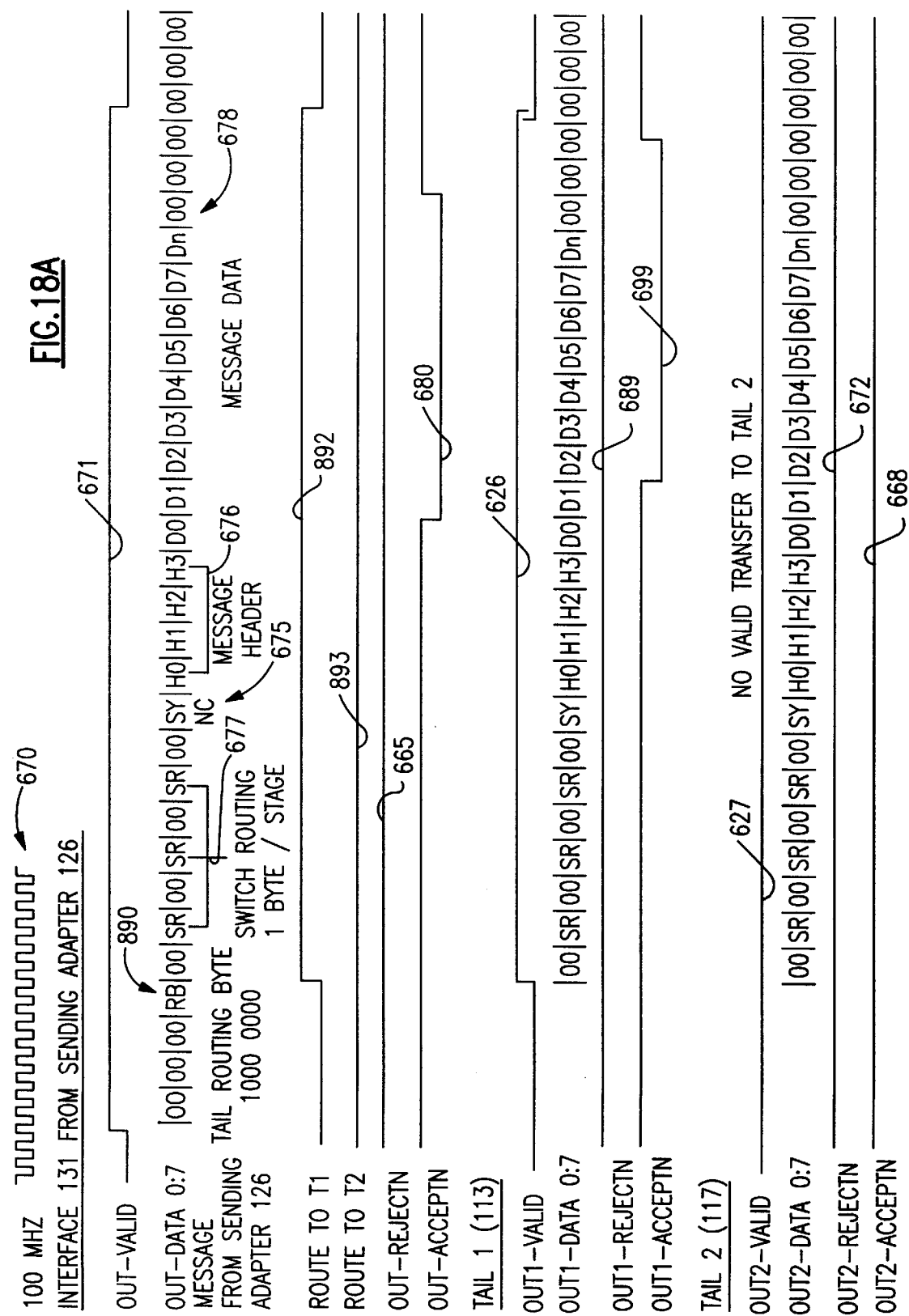

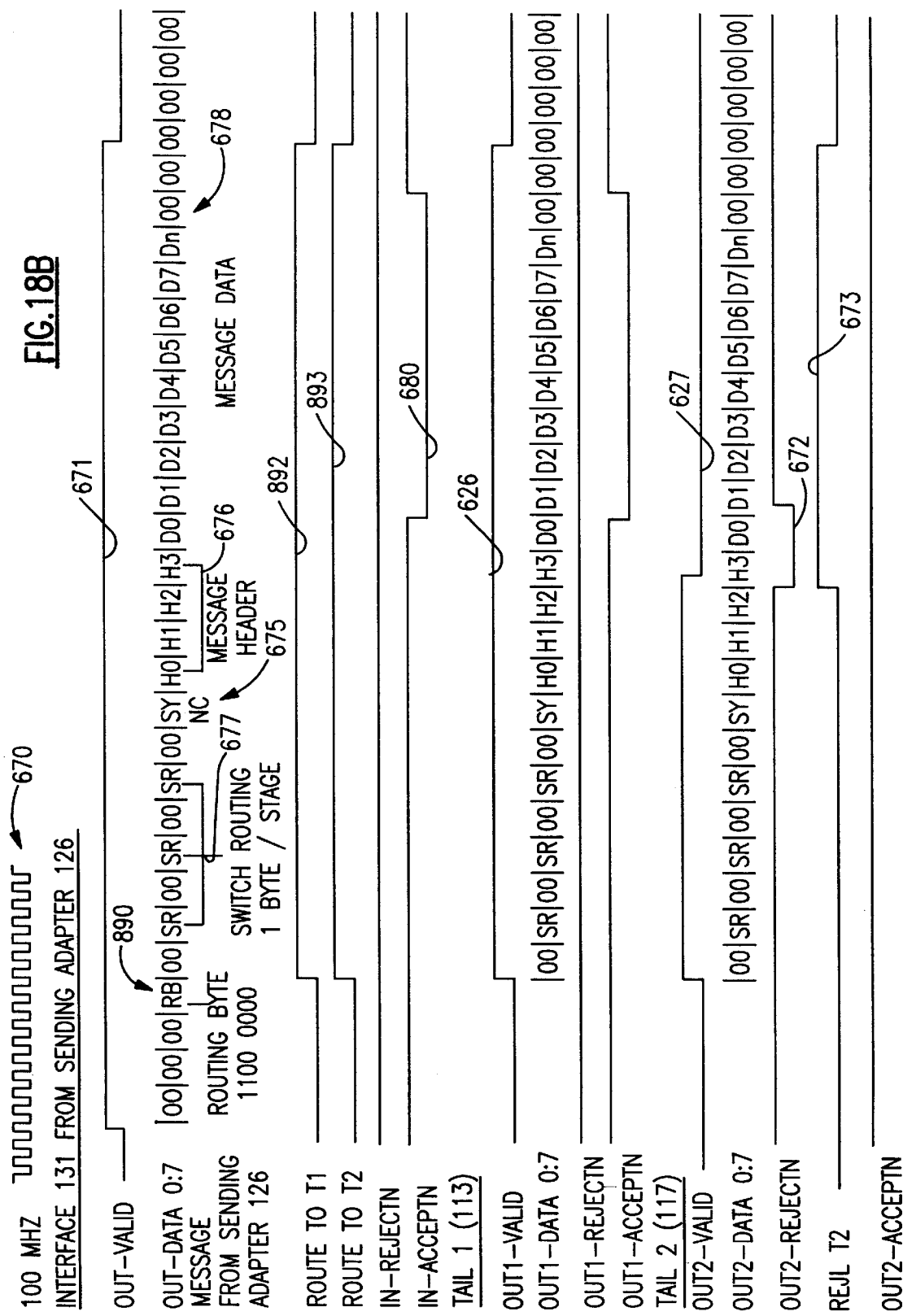

FIG.19C
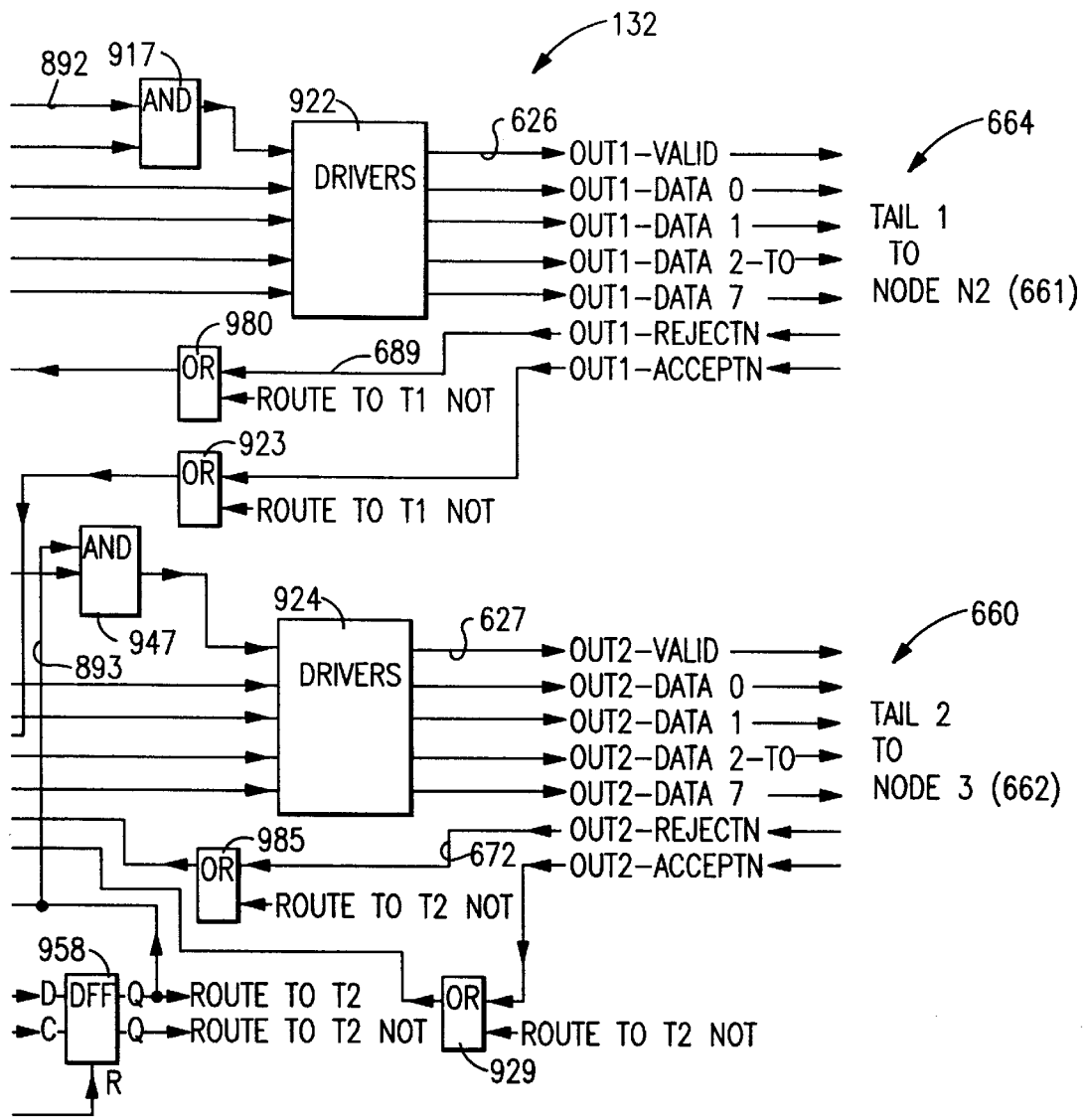
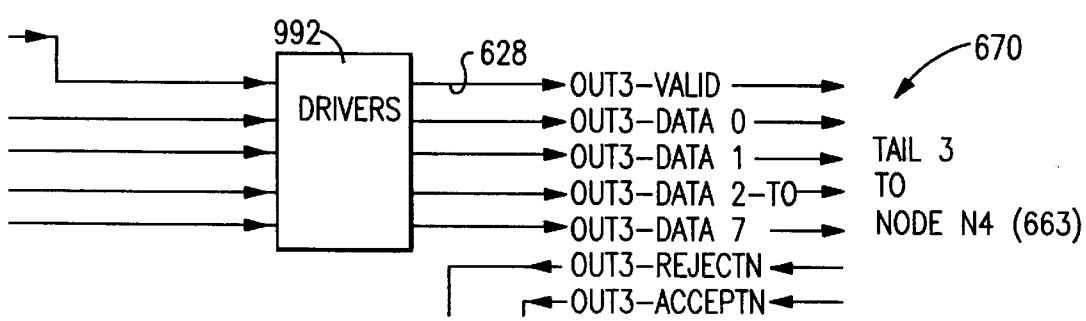

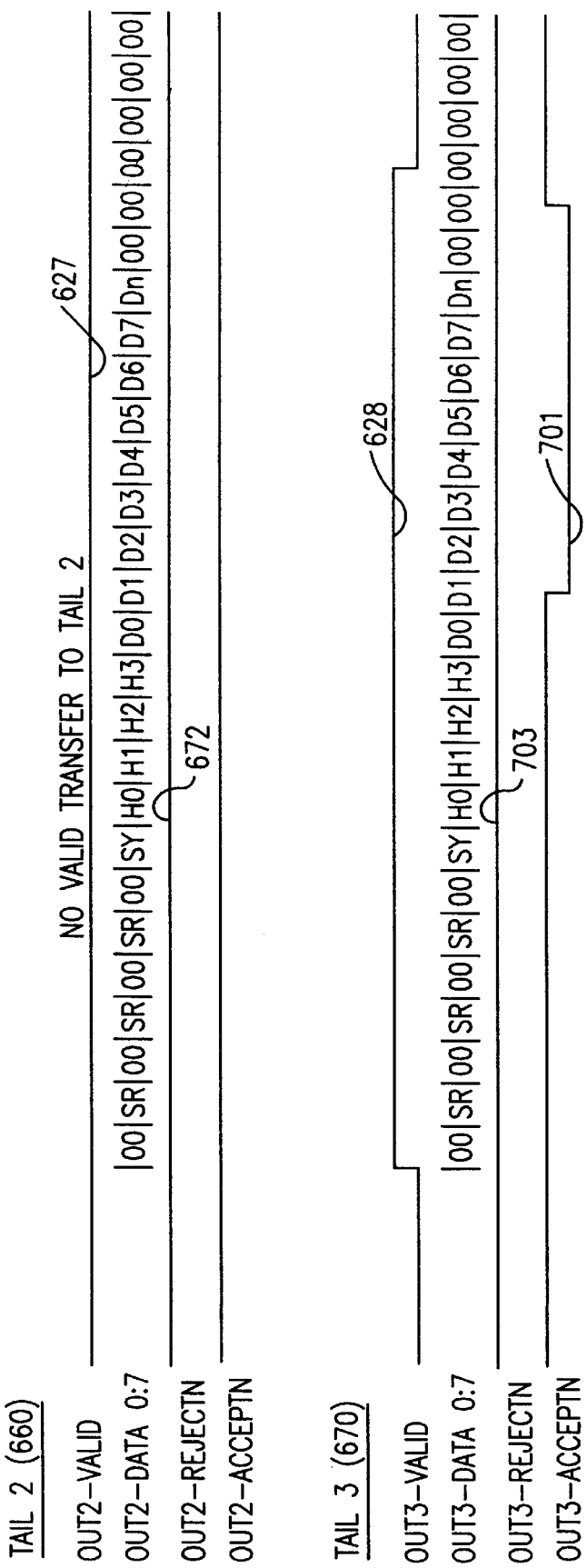
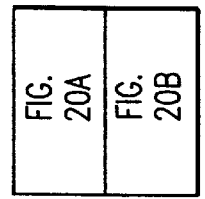
FIG. 20B
FIG. 20

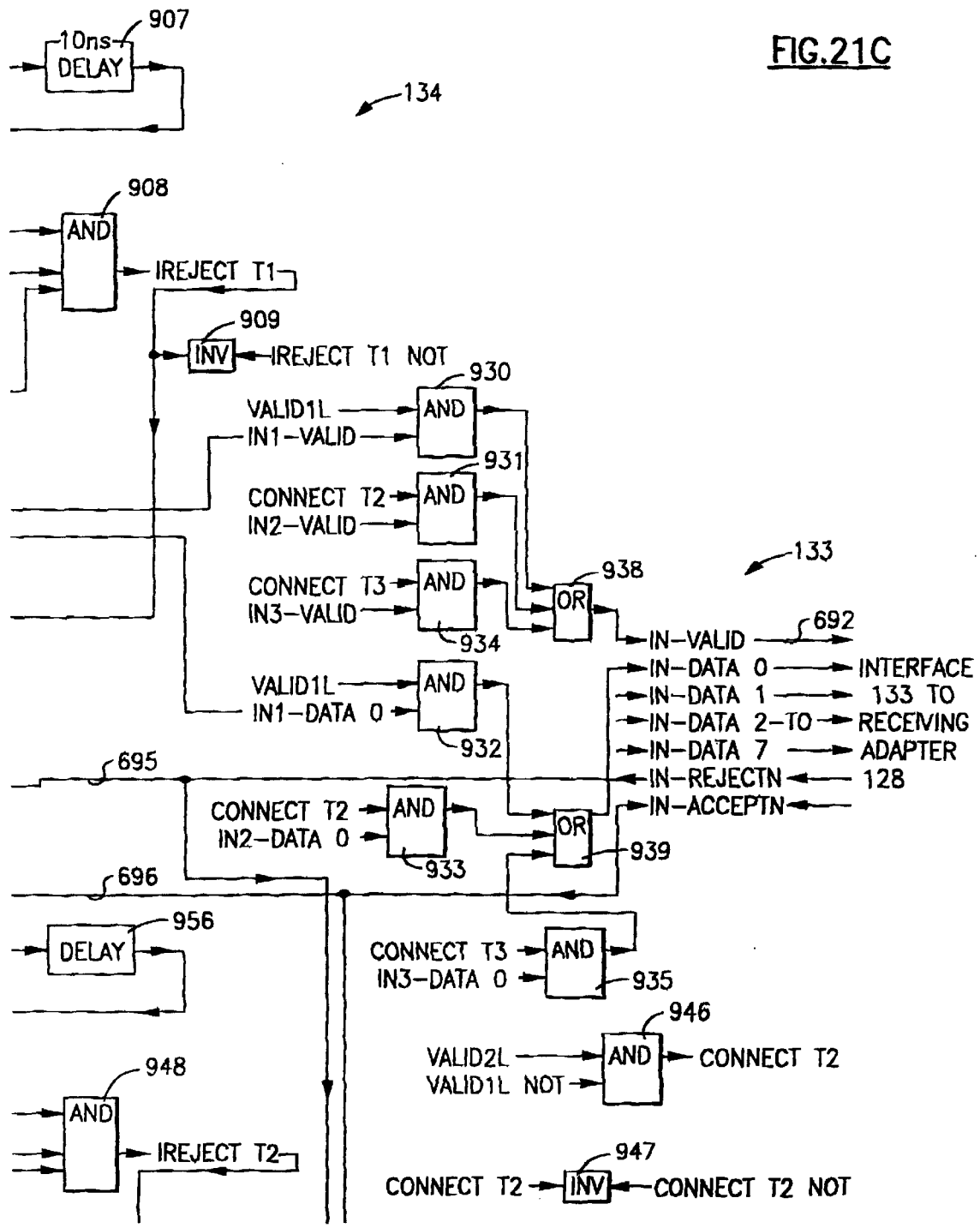

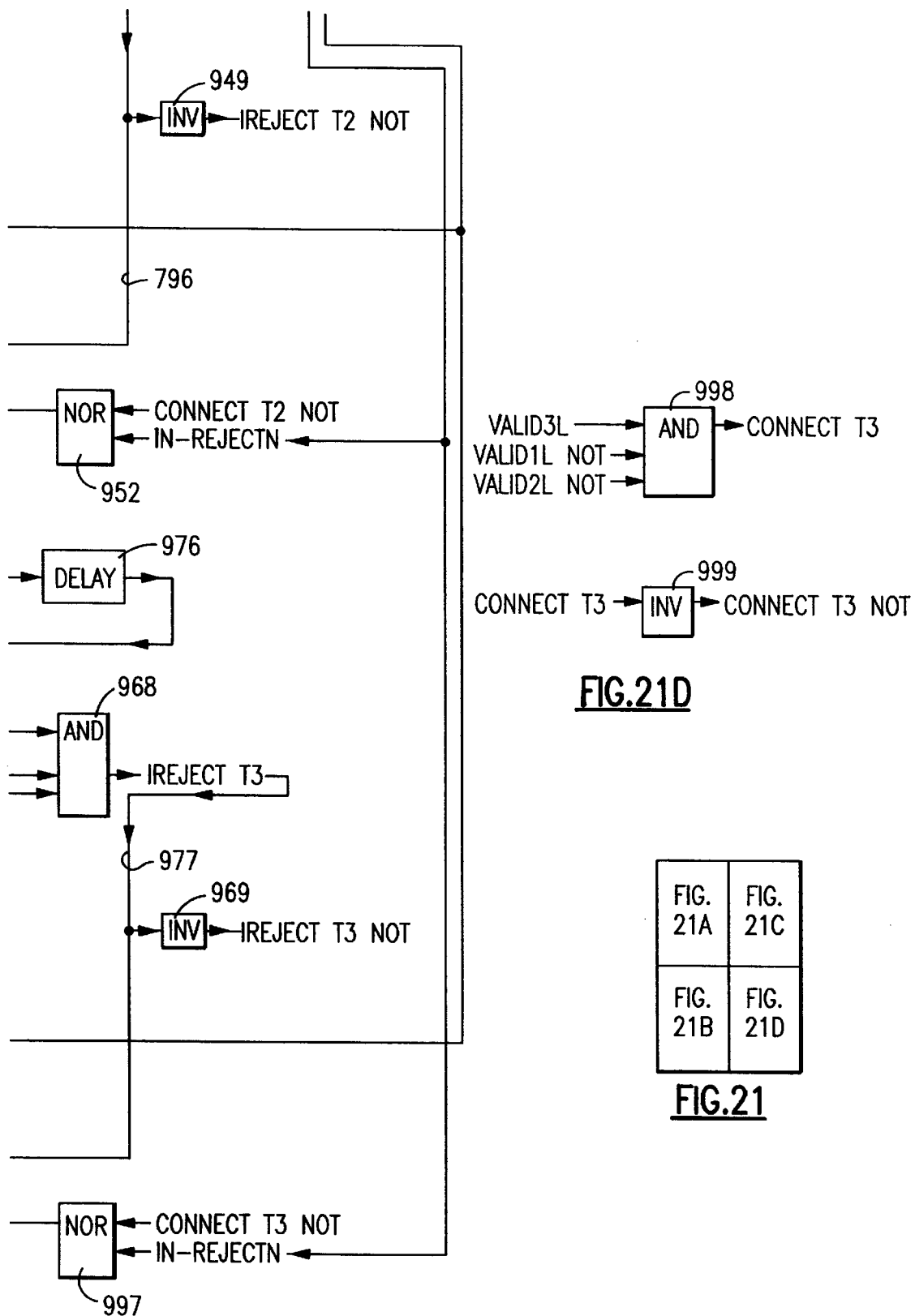

5,933,428

TWO-TAILED ADAPTER FOR SCALABLE, NON-BLOCKING NETWORKS

BACKGROUND OF THE INVENTION

1. Technical Field of the Invention

This invention relates to digital parallel processing systems, wherein a plurality of nodes communicate via messages sent over an interconnection network. In particular, this invention provides a method and apparatus for creating scalable, non-blocking networks.

2. Background Art

Clos has set the basis for non-blocking networks in his paper, "A study of Non-blocking Switching Networks", March 1953; Bell System Technical Journal (vol.32, pp 406–24). While Clos solves the blocking problem, his solution requires for larger networks a very large number of switch chips. For example, for a network with 32,000 nodes, CLOS's solution requires 39.5 switch chips per node or 1,294,336 total chips to build the network. There is a need, therefore, in the art to provide a more efficient solution to the blocking problem.

The CLOS non-blocking multi-stage network includes input, middle, and output stages. CLOS requires the three stages to be of variable size and to have a variable number of inputs and outputs to each stage. A high development cost is required to build a network using a multiplicity of various sized switch chips. In this case variable numbers of inputs and outputs can be obtained by simply not using (wasting) some of the input and output ports to the switch chip. There is, therefore, a need in the art for a switch chip of one given size to be used in constructing all three stages, one which avoids the inefficiency of wasting switch ports.

This invention relates to digital parallel processing systems, wherein a plurality of nodes communicate via messages sent over an interconnection network. Each node usually interfaces to the network via a network adapter. There is a demand for larger networks requiring non-blocking. Non-blocking means that two idle nodes attached to the network can always be connected through the network, and the network will never prevent the connection. For instance, in the extreme case where a network supports 32,000 nodes, if 31,998 nodes are connected to each other, the network (if non-blocking) will always provide at least one idle path whereby the last two nodes can be connected. The characteristic of being non-blocking and scalable to a large number of nodes is very challenging.

It is, therefore, an object of the invention to provide a network switching structure and method which reduce the complexity of non-blocking networks.

It is a further object of this invention to provide a method and apparatus for creating scalable, non-blocking networks with an order of magnitude less hardware than the state-of-the-art approach.

SUMMARY OF THE INVENTION

In accordance with the apparatus of this invention, a network adapter comprises two tails, each capable of driving two separate and identical networks simultaneously.

In accordance with the method of this invention, a network adapter is operated to drive two separate and identical networks simultaneously.

Other features and advantages of this invention will become apparent from the following detailed description of the presently preferred embodiment of the invention, taken in conjunction with the accompanying drawings.

BRIEF DESCRIPTION OF THE DRAWINGS

FIGS. 4A, 4B, 4C and 4D, oriented as shown in FIG. 4, are a diagram showing a 3-stage non-blocking network having a middle stage of the order N/4, whereby the non-blocking is created by providing unused network inputs and outputs according to the CLOS definition of a non-blocking network.

FIG. 7A and 7B, oriented as shown in FIG. 7, are a diagram showing two sixteen node networks (N=16), where each node is a two-tailed adapter attaching to each sixteen node network via a different tail according to this invention.

FIG. 10 is a comparison chart comparing the number of switch chips required to implement various size networks using prior art networks and networks according to this invention.

FIGS. 11A, 11B, 11C and 11D, oriented as shown in FIG. 11, are a diagram showing an example of simultaneously searching multiple alternate paths in parallel through a network to find an open path quickly according to this invention.

FIGS. 12A through 12E are diagrams showing alternate direct, ring, and cube connections provided by two-tailed and three-tailed adapters according to this invention.

FIGS. 16A(a) and 16A(b), oriented as shown in FIG. 16A, are a timing diagram showing the timing for receiving a message from the 2-tail network adapter of the invention for the non-blocking Allnode network when messages on both tails arrive simultaneously.

FIG. 18A is a timing diagram showing the timing for sending a message from the disclosed 2-tail network adapter for making direct connections amongst three nodes and operating in the normal case where the message is sent only to one tail.

FIG. 18B is a timing diagram showing the timing for sending a message from the 2-tail network adapter of the invention for making direct connections amongst three nodes and operating in the broadcast mode where the message is to both tails simultaneously.

FIGS. 19A through 19D, oriented as shown in FIG. 19, are a logic diagram showing the extension of the sending logic to a 3-tailed network adapter for making direct connections amongst four nodes and for selecting one or more of the tails to send a message.

FIGS. 20A and 20B oriented as shown in FIG. 20, is a timing diagram showing the timing for sending a message from the 3-tail network adapter of the invention for making direct connections amongst four nodes and operating in the normal case where the message is sent only to one tail.

FIGS. 21A through 21D, oriented as shown in FIG. 21, are a logic diagram showing the extension of the receiving logic to a 3-tailed network adapter for making direct connections amongst four nodes and for selecting the message to be received from one of three tails.

BEST MODE FOR CARRYING OUT THE INVENTION

This invention provides a simplified non-blocking network, which improves upon the CLOS definition of a non-blocking network. A simple rephrasing of the existing CLOS definition of a non-blocking symmetrical network is: the network is non-blocking if 2n−1 alternate paths are provided from each input port to each output port through a middle stage of the order N/4; where n=the number of input ports=the number of output ports per switch chip, and N=the number of input ports=the number of output ports for the entire network.

Figure 1:
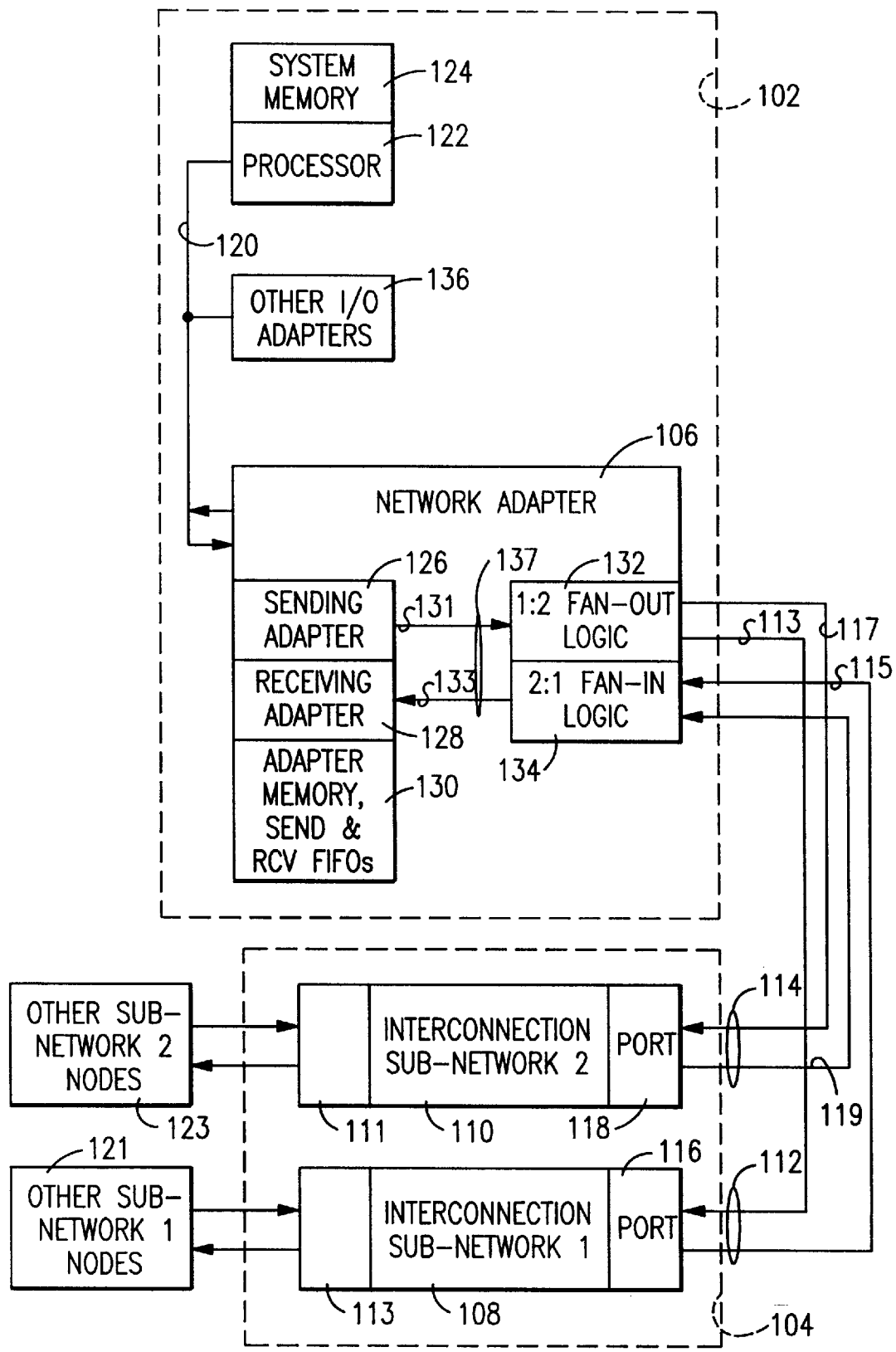
FIG. 1 is a diagram of a multi-stage digital network showing the interconnection of a typical network node to two networks via a two-tailed network adapter according to the preferred embodiment of this invention.

Referring to FIG. 1, a typical network node 102 that implements the apparatus of the invention is shown. Node 102 attaches to network 104 via two-tailed network adapter 106 to two sub-networks 108, 110. A sub-network 108, 110 is a portion of the complete network 104. In this preferred embodiment, a tail is a set of unidirectional communication signal lines 101, and a fully duplexed tail is a set of two such sets. Hereafter, as will be apparent from context, reference to a tail may be to a single set or a pair of such sets, of lines 101. Tail 112 of network adapter 106 attaches to one port 116 of sub-network 108, and the other tail 114 of network adapter 106 attaches to one port 118 of sub-network 110. Both network attachments 116, 118 are full duplex. Network adapter 106 normally converts the processor I/O Bus 120 for communication to the two sub-networks 108, 110. Processor 122 sends commands over I/O Bus 120 to control network adapter 106; it can also write messages to adapter 106 to be forwarded to either sub-network 108, 110 and read messages from adapter 106 that have been received from either sub-network. In addition, if network adapter 106 is a bus master, it can also be commanded to read or write messages from/to system memory 124 using DMA operations. Other I/O adapters 136 may also be attached to processor I/O bus 120.

Referring further to FIG. 1, network adapter 106 comprises five entities: a) 1:2 fan-out logic 132 which transmits messages from the network adapter 106 to other network adapters attached to either sub-network 108, 110, b) 2:1 fan-in logic 134 which receives messages from the other network adapters 121, 123 attached to either sub-network 108, 110 into network adapter 106, c) adapter memory 130 including a block of memory dedicated as send FIFO, and a block of memory dedicated as receive (RCV) FIFO for storing messages before they are forwarded, d) sending adapter 126 which reads one message at a time from the send FIFO of adapter memory 130 and sends the message over interface 131 to 2:1 fan-out logic 132 for forwarding to network 104, and e) receiving adapter 128 which stores one message at time to the receive FIFO of adapter memory 130, so a message arriving from either sub-network 108, 110 through 2:1 fan-in logic 134 is passed to receiving adapter 128 over interface 133. Sending adapter 126 and receiving adapter 128 need only provide a normal single tail network interface 137. Interfaces 131 and 133 are single tailed and combine to provide the exact same network interface as provided by either of the two tails 112, 114. The special logic required to provide 2-tailed network adapter 106 is provided solely by blocks 132 and 134. The Allnode networks are unidirectional going from sending adapter 126 to 1:2 fan-out logic 132 then across network 104 to the 2:1 fan-in logic 134 and then to receiving adapter 128. The allnode network interface 137, 112, 114 contains two separate sets of communication lines, one going in each direction, which are totally independent of each other.

The preferred embodiment of sub-networks 108, 110 is a multi-stage interconnection network comprised of Allnode switches at each stage of the network. The Allnode switch (described in U.S. Pat. No. 5,404,461) provides a self-routing, asynchronous, unbuffered network capable of trying a plurality of alternate paths between any two nodes. The alternate paths are tried in succession until an available path is found to circumvent blocking. An unbuffered switch merely forwards the message directly without storing.

Figure 1A:
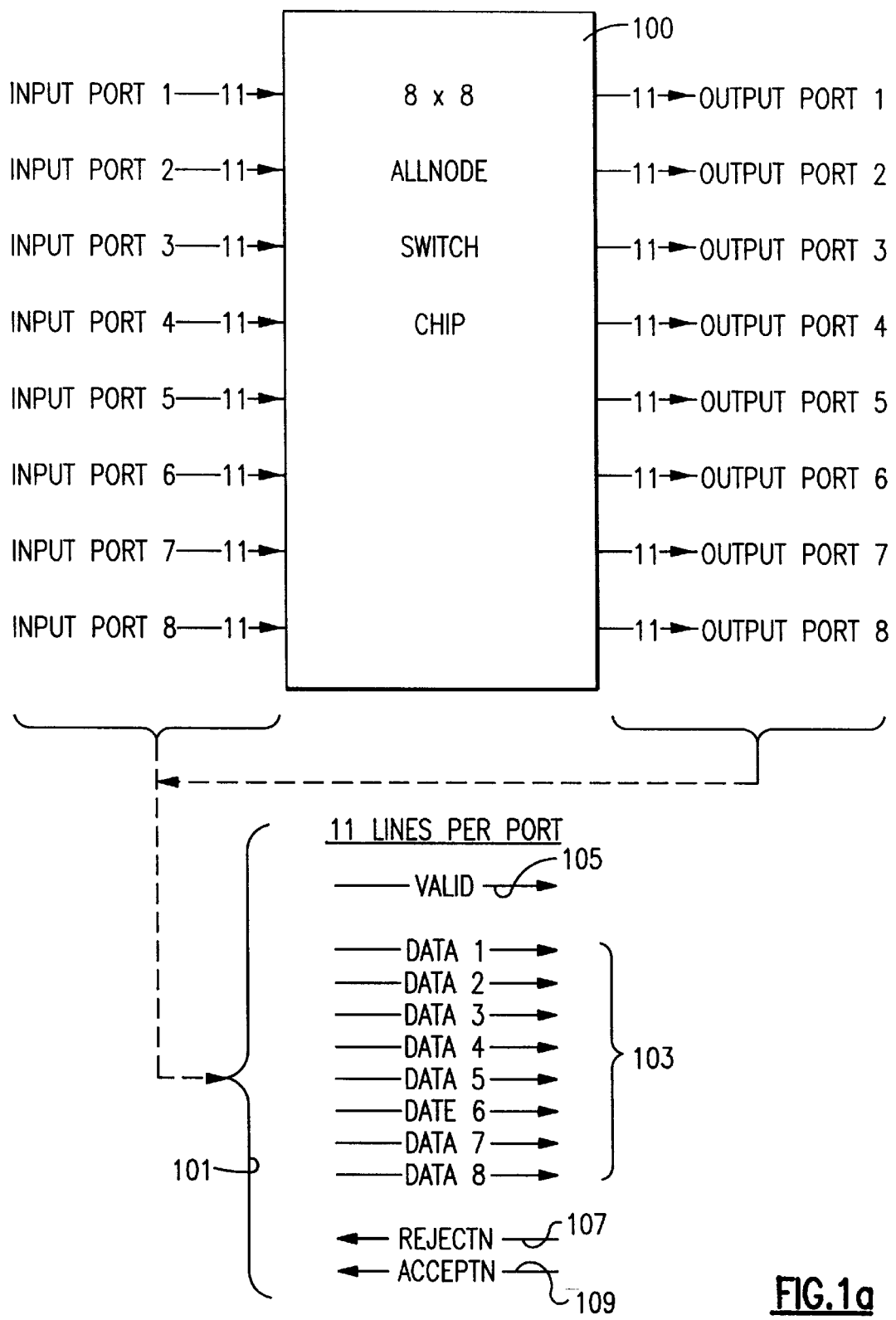
FIG. 1a is a block diagram of the switch apparatus showing the interface connection to the input and output ports according to the preferred embodiment of this invention.
Figure 8A:
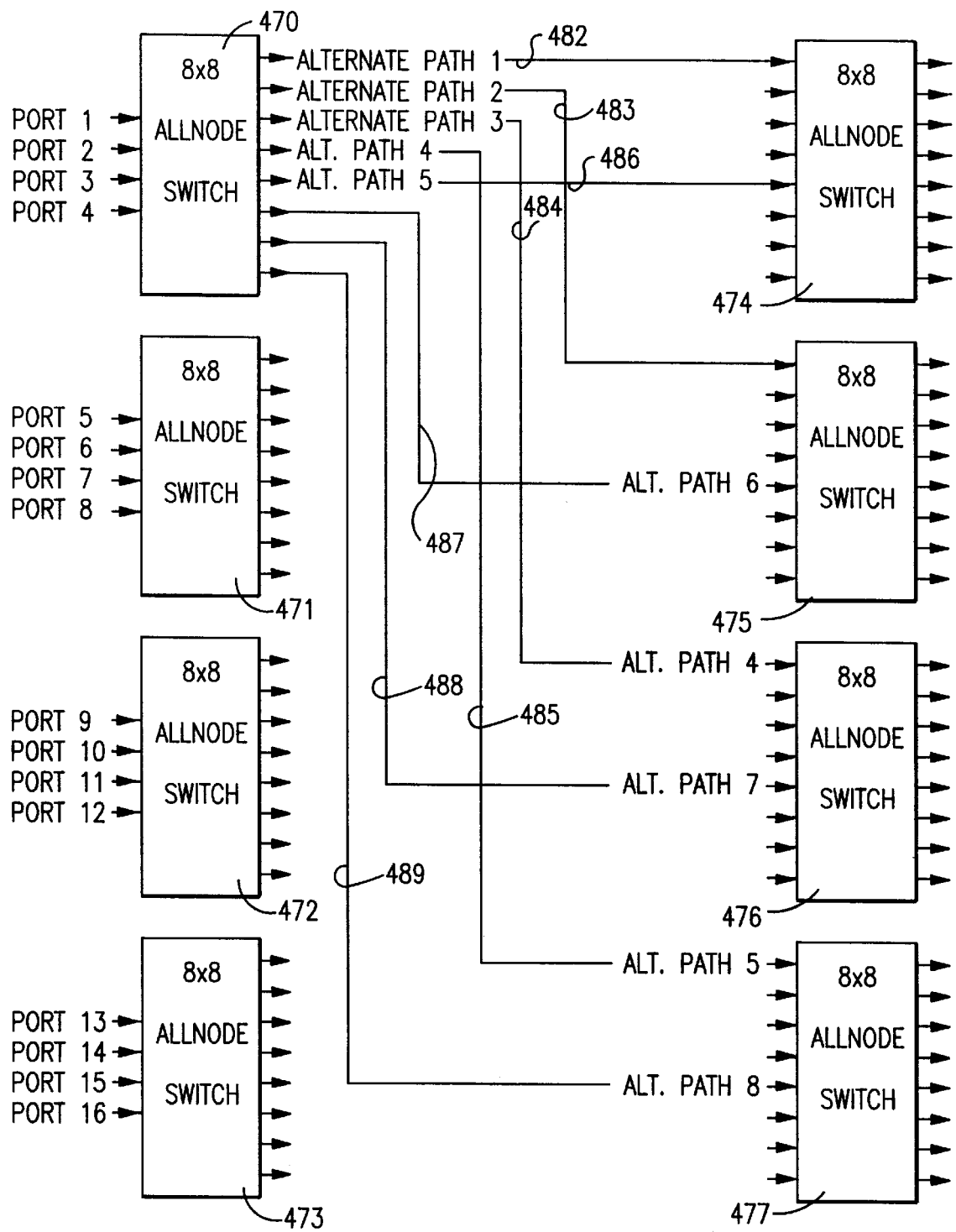
FIGS. 8A and 8B, oriented as shown in FIG. 8, are a diagram showing a CLOS non-blocking network for sixteen nodes according to the CLOS definition of a non-blocking network.
Figures 8, 8B:
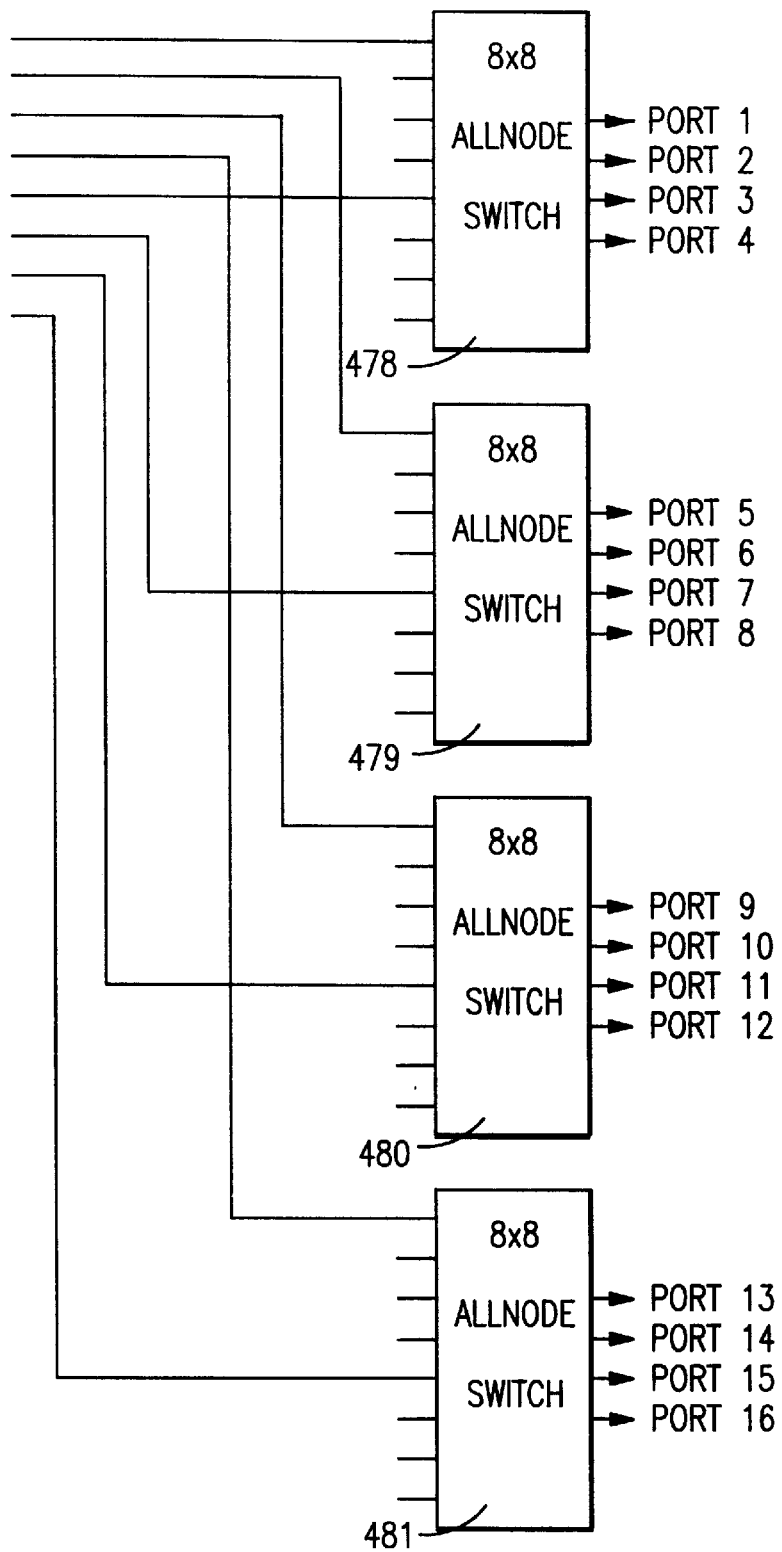

Referring to FIG. 1a, the 8×8 ALLNODE switch chip 100 and its interfaces 101 are shown. Multiple Allnode switch chips 100 are used to build two identical multi-stage sub-networks 108, 110, which comprise network 104 in accordance with the preferred embodiment of this invention. The construction of a typical sub-network 108, 110 is shown in FIG. 3 and will be described hereafter. Referring to FIG. 1a, 8×8 Allnode switch chip 100 has eight input ports and eight output ports such that any input port can connect to any output port. Interface 101 at each of the eight intput ports and eight output ports contains eleven lines: eight data plus three control lines—VALID, ACCEPTN, and REJECTN (where N at the end of a signal name indicates that the signal is active when in the 0 state). The switch interface lines have the following meanings:

8 DATA Lines 103: Eight parallel, unidirectional data lines 103 that carry byte wide data and switch selection commands from sending adapter 126 (through 1:2 fan-out logic 132) to either sub-network 108, 110 and that also carry byte wide data from either sub-network 108, 110 to receiving adapter 128 (through 2:1 fan-in logic 134). The sequential byte wide data comprises the message being transmitted over network 104.

VALID 105: When active, indicates that a message is in the process of being transmitted. When inactive, indicates a RESET command and causes all switches to reset, breaks all connections, and returns to the IDLE state. The VALID signal 105 is unidirectional in the same direction as the eight DATA Lines.

REJECTN 107: Signal flow is in the opposite direction from the data signals. It indicates that a rejection condition has been detected and that a connection was not established by network 104 or the message was not successfully transmitted across the network to receiving adapter 128. Any Allnode switch chip 100 of either sub-network 108, 110 generates the REJECTN signal 107 if it cannot establish the commanded connection because of blockage (which occurs as a result of an output port being used to support a previously commanded connection). Receiving adapter 128 generates the REJECTN signal 107 to 0 if it cannot take the message or if it detects an error in the message.

ACCEPTN 109: Signal flow is in the same direction as the REJECTN signal and opposite to that of the data signals. It provides a positive acknowledgement that the message has been transmitted successfully through network 104 to receiving adapter 128. Allnode switch chips 100 of sub-networks 108, 110 never generates the ACCEPTN signal, only receiving adapter 128 can generate the ACCEPTN signal to 0 after it starts to receive the message until after it has received the entire message correctly or has subsequently rejected the message.

The eleven line switch interface 101 shown in FIG. 1a is used in each direction to provide a full duplex interface. For instance, interfaces 131 and 133 of FIG. 1 each comprise the eleven lines (101) shown in FIG. 1a, each one providing unidirection al data flow. When used together as interface 131, 133, they provide a full duplex interface 137. FIG. 1 shows three full duplex Allnode interfaces as follows: 1) 137, 2) 112, and 3) 114. Each duplex interface contains a total of twenty two lines, comprised of the eleven line interface 101 used twice, once for each direction.

In general, the non-blocking embodiment of this invention does not apply to buffered networks which are comprised of switch chips that store and forward the messages. This is because buffered networks do not normally retry messages over a plurality of paths in search of an unblocked path. Most buffered networks are blocking, so they usually are restricted to transmitting only short messages to reduce the time that a message can wait for the blocking condition to clear. The present invention applies to either short or long messages, and will find a non-blocked path from a sending adapter 126 through network 104 to an idle receiving adapter 128 (at another node, such as node 121 or 123.) Other unbuffered networks with retry capability would provide alternate networks for the disclosed invention.

The Allnode Network, a network 104 comprising single or multiple stages of Allnode switch chips 100 (FIG. 1A), permits a wide variety of network options including non-blocking and high bandwidth operation by using two sub-networks 108, 110 in parallel. Each sub-network 108, 110, when comprising Allnode Switch chips 100, is referred to as an ALLNODE sub-network. In this preferred embodiment, ALLNODE sub-networks 108, 110 are multi-stage networks including cascaded 8×8 ALLNODE switch chips 100. The cascading of switch chips is used to increase the size of the sub-network and the number of nodes attached to the sub-network to as many as 32K nodes. Paralleling of Allnode sub-networks is used to both increase the bandwidth (throughput) of the network, and/or to provide non-blocking, as will be further described hereafter.

All Allnode sub-networks 108, 110 of this embodiment are equi-distant networks, which means that all inter-nodal communications traverse the same number of switch stages. Two of the sub-networks can be used to provide non-blocking characteristics and/or two sub-networks can be used to double the data transfer rate between nodes.

The objective of the Allnode Sub-Networks is to implement high throughput, low latency, and high connectivity for all interconnection patterns up to and including 100% network utilization. In accordance with various embodiments of the invention to be described hereafter, three types of sub-networks include, from least to best performance: Eight Alternate Path Network, Near Non-Blocking Network, and Full Non-Blocking Network.

Eight Alternate Path Network

Figure 2A:
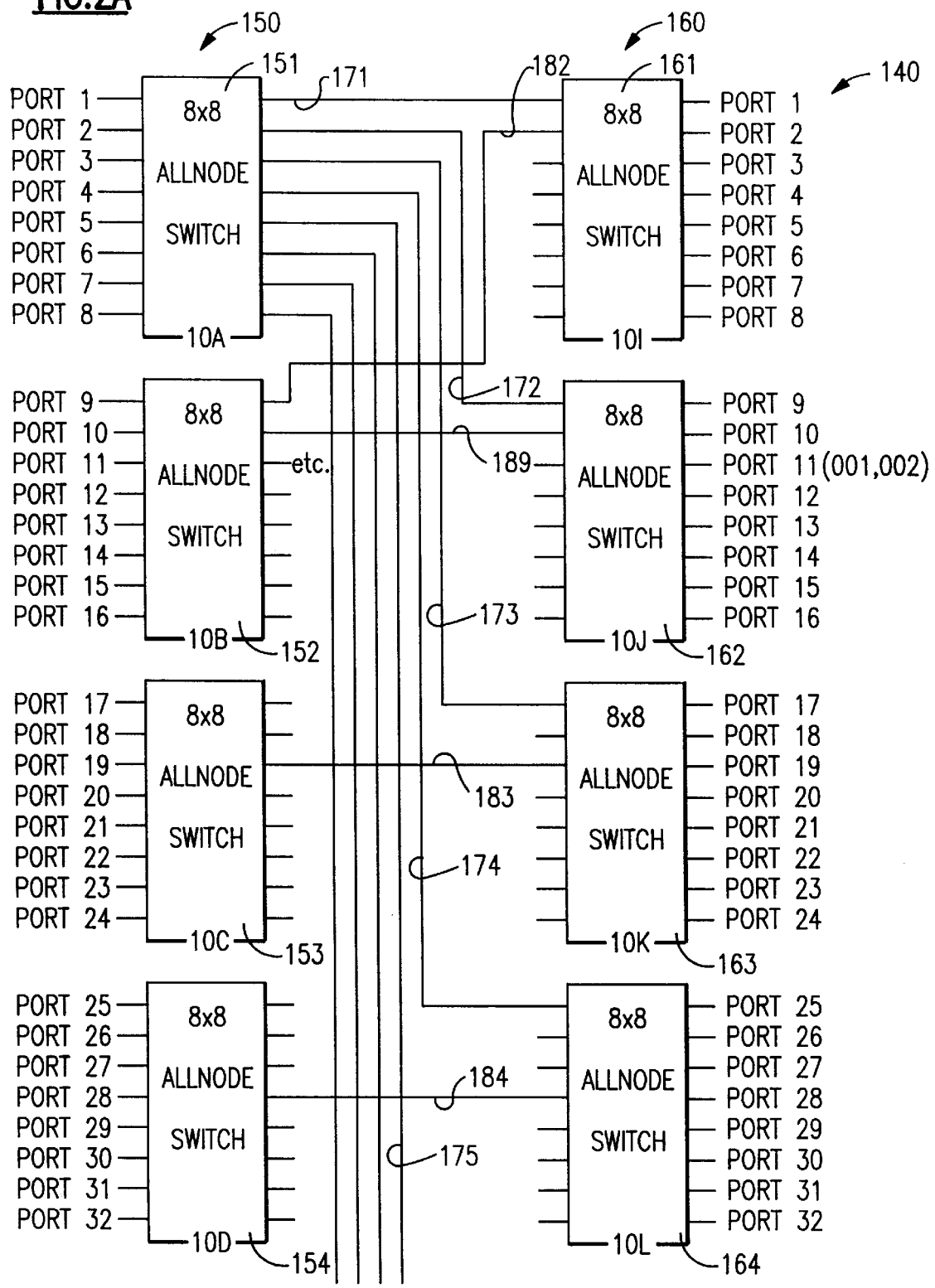
FIGS. 2A and 2B, oriented as shown in FIG. 2, are a diagram of a basic omega network having two stages and providing a high degree of blocking according to the prior art.
Figures 2, 2A, 2B:
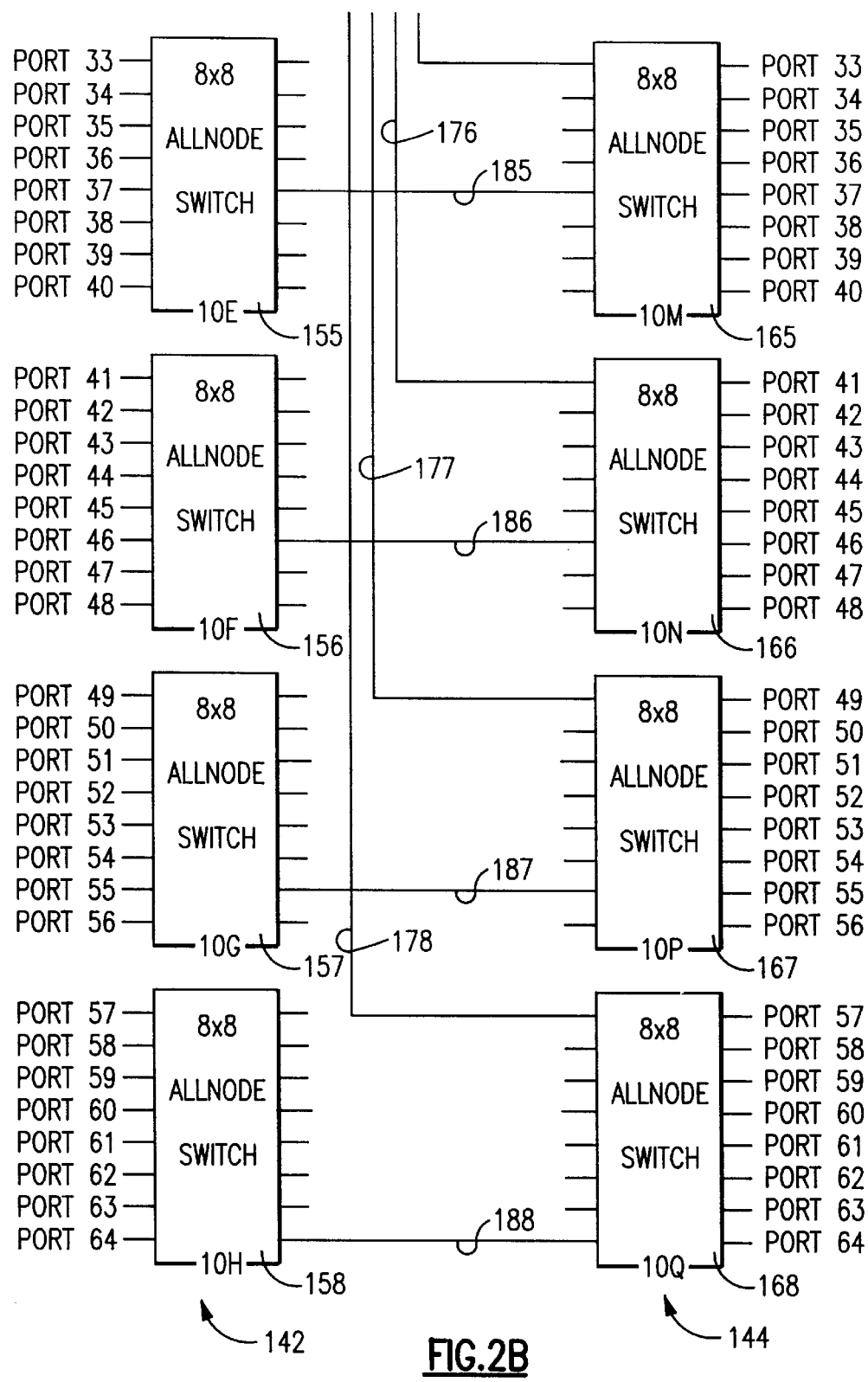
Figure 3A:
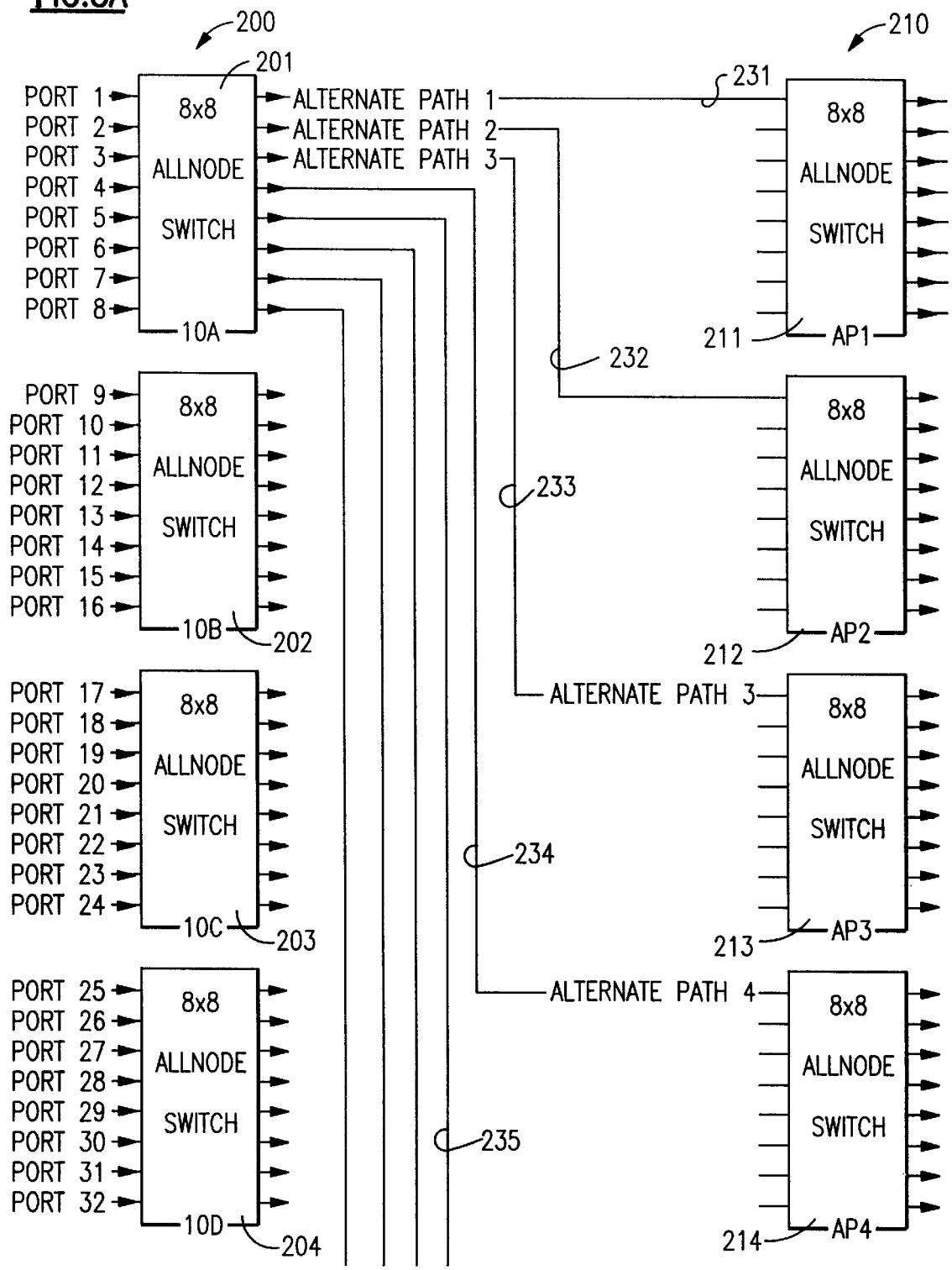
FIGS. 3A, 3B, 3C and 3D, oriented as shown in FIG. 3 are a diagram showing the addition of a middle stage of the order N/8 to the two stage omega network to provide eight alternate paths between any two nodes of the network according to this invention.
Figure 3B:
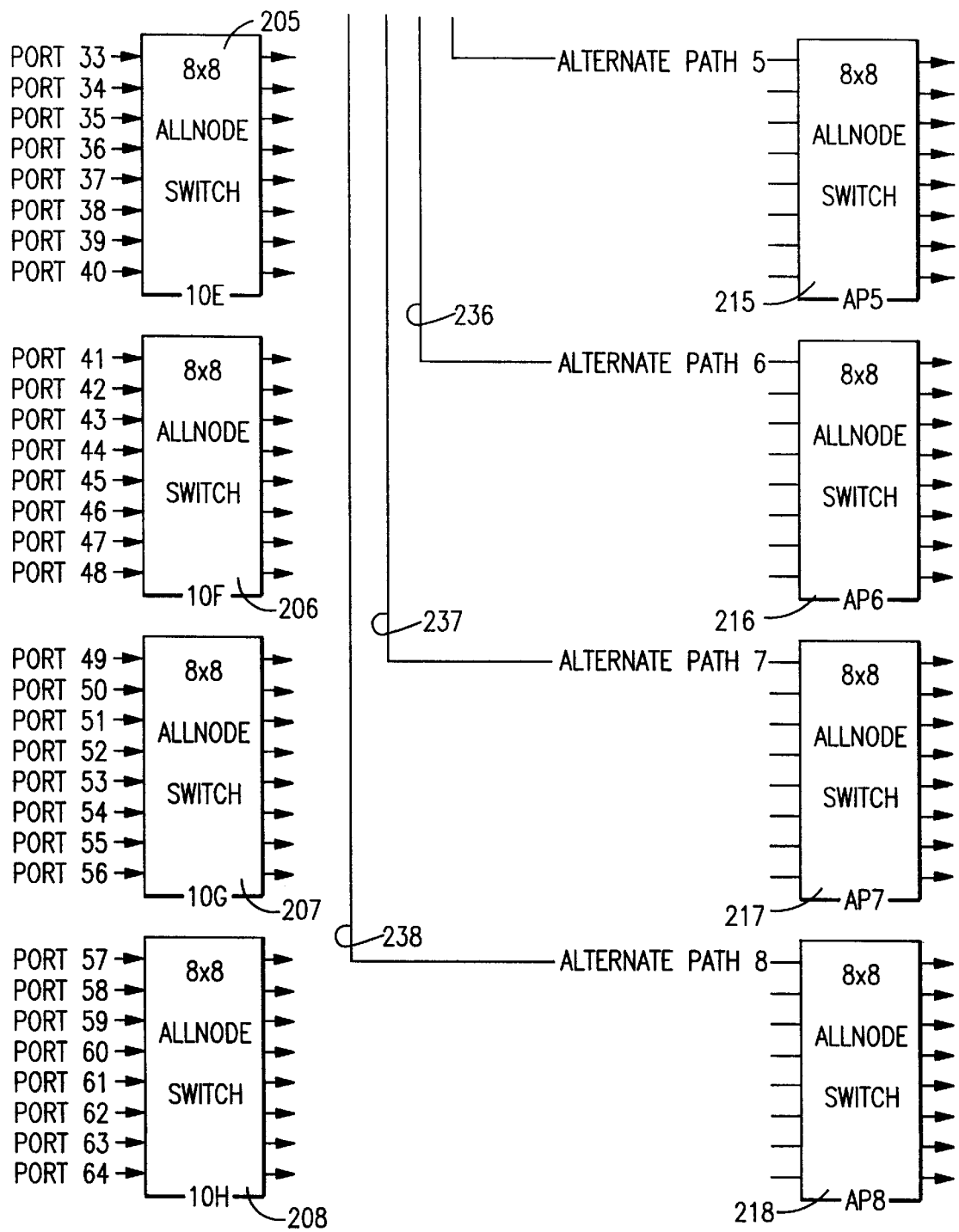
Figure 3C:
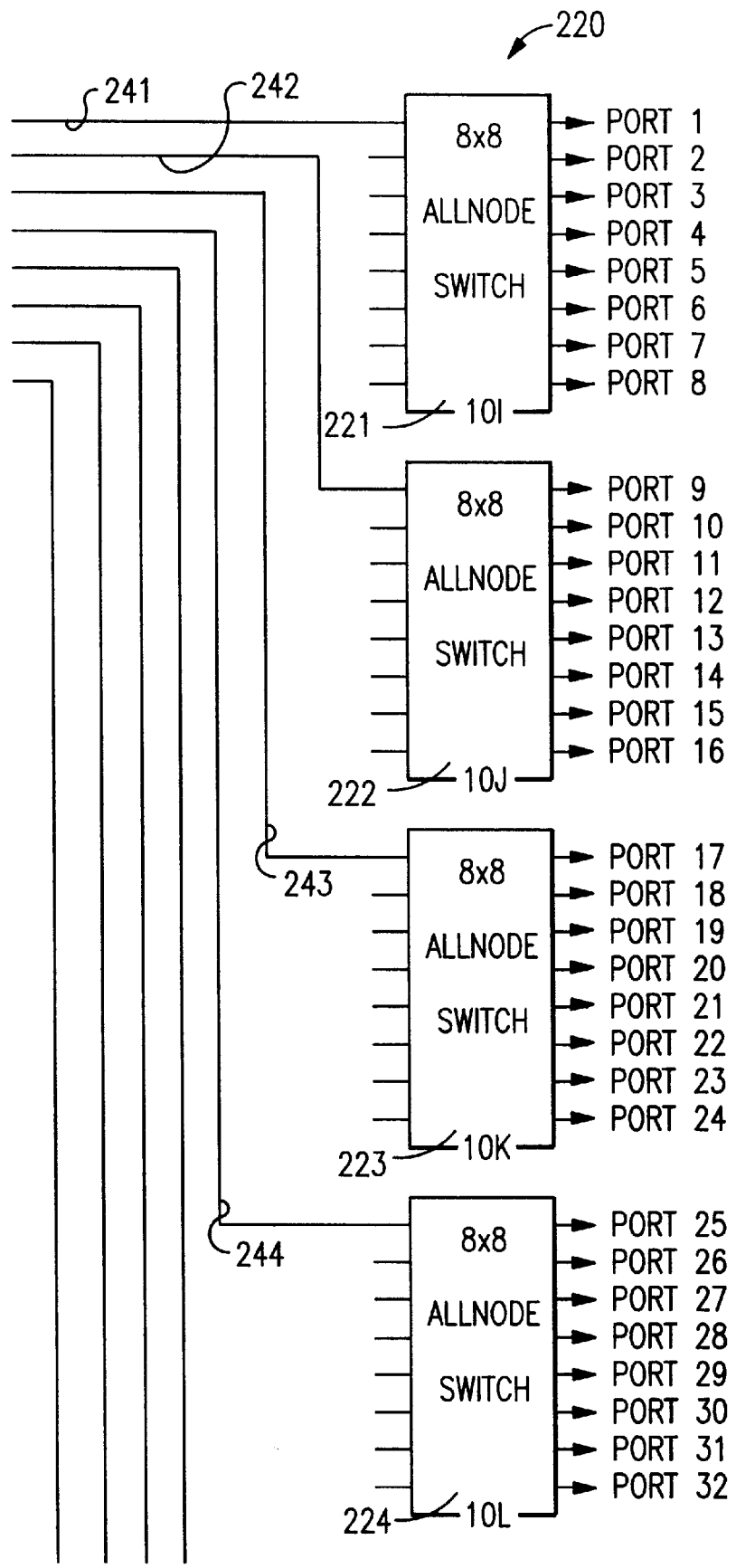
Figure 3D:
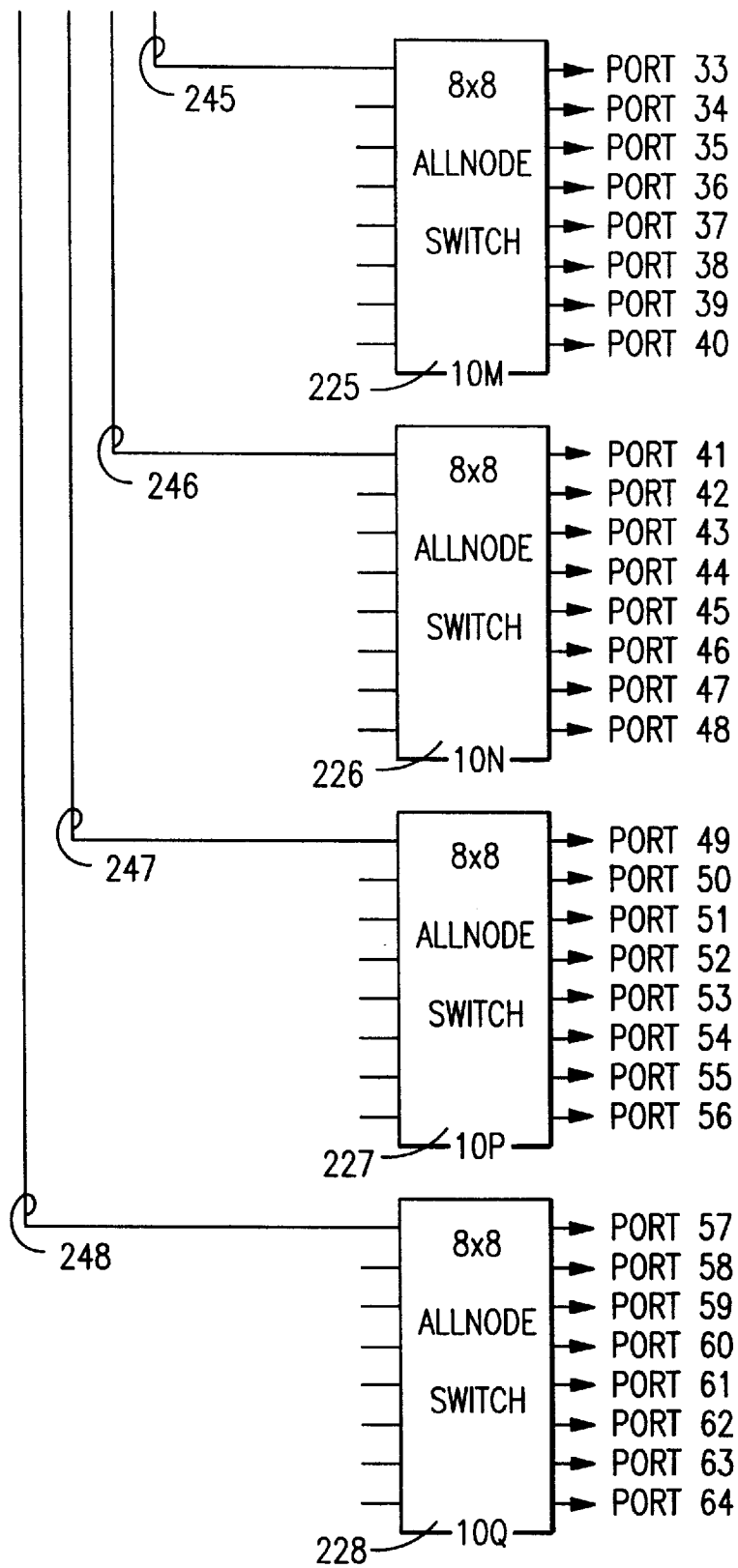

Referring to FIG. 2, the concept of blocking will be described. In FIG. 2, a two-stage (herein, stages 150, 160), equi-distant, uni-directional Omega network 140 comprises sixteen switch 8×8 Allnode Switch chips 151–158 and 161–168 for the purpose of interconnecting 64 nodes. With this equi-distant network every node (not shown) traverses two network stages 150, 160 to send a message to any other node. Each node of the network attaches via its individual network adapter (not shown) to one of 64 input ports 142 and one of 64 output ports 144 of the network. For instance, the network adapter for Node 1 attaches to both a network input port 146 (Port 1 at switch 151) and a network output port 148 (Port 1 at switch 161), where the input port is on the left side of the network and output on the right side of the network as illustrated in FIG. 2. Outputs 171–178 of switch 151 are connected, respectively, to the first inputs of switches 161–168. The first outputs 171, 182 of each switch 151–158 are connected to respective inputs of switch 161; second outputs 172, 189 of switches 151–158 are connected to respective inputs of switch 162; and so on for third outputs 173, 183, fourth outputs 174, 184, fifth outputs 175, 185, sixth outputs 176, 186, seventh outputs 177, 187 and eighth outputs 178, 188.

The network of FIG. 2 is a highly blocking network in that there is one and only one path between any two nodes and that path can be readily blocked. Network blockage occurs when a network is unable to establish a connection between two idle nodes. For instance, in FIG. 2 if node 2 was to make a connection to node 3, the connection would be made in switch 151 by connecting the second input 142 (Port 2) on the left of switch 151 to the first output, represented by line 171, on the right of switch 151. This connection ties the first output of 151 to the first input on the left of switch 161, which in turn makes the connection through switch 161 to node 3 at output 144 Port 3. This is the only path that could possibly make the connection. Now, if node 3 simultaneously wanted to connect to node 4, it would be blocked and could not make the connection even though both nodes were presently idle. This is because if node 3 was to make a connection to node 4, the connection would be made in switch 151 by connecting the third input 142 (Port 3) on the left of 151 to the first output on the right of 151, represented by line 171. Line 171 ties the first output of 151 to the first input on the left of switch 161, which in turn makes the connection through switch 161 to node 4 (output 144 Port 4). This is the only path that could possibly make the connection. Therefore, since node 2 is already connected to the first output 171 of switch 151, the connection of node 3 to node 4 is blocked.

Referring to FIG. 3, an improved Eight Alternate Path Network, which is a modification of the Omega Network shown in FIG. 2, is shown. The modification is an expanding of the network to three stages 200 (switches 201–208), 210 (switches 211–218) and 220 (switches 221–228) by inserting a center column, or stage 210 of eight additional switch chips 211–218. As is represented by lines 231–238, the outputs of switch 201 are fed to the first inputs of switches 211–218, respectively. Similarly, the eight outputs of the second first stage switches 202 are fed to the second inputs of center stage switches 212–218, respectively. And so on through the eighth first stage switch 208. As is represented by lines 241–248, the eight outputs of first center stage switch 211 are fed to the first inputs of switches 221–228, respectively. Similarly, the eight outputs of switch 212 are fed to the second inputs of switches 221–228, respectively—and so on, through the eighth center stage switch 218.

This three stage network provides eight alternate paths between any two nodes, where each switch 211–218 of center stage 210 implements an alternate path. For instance, if node 2 (at port 2) requests a connection to node 3 (at port 3), eight alternative connection options are possible: all beginning at block 201 and ending at block 221, but the middle connection can be made through any of the eight alternate paths provided by switches 211–218. This means that additional connections, such as node 3 (at port 3 on switch 201) to node 4 (at port 4 on switch 221) or any node attached to switch block 201 (ports 1 through 8) to any node attached to block 221, would no longer be blocked and could establish up to eight connections simultaneously between block 201 and 221. This is true of all switch blocks 201–208 and 221–228.

Referring further to FIG. 3, the method of utilizing the alternate paths effectively to establish a connection between any two nodes is controlled by hardware in sending adapter 126 (FIG. 1). The adapter 126 hardware cycles through the alternate paths (across switches 211–218) one at a time, choosing an arbitrary alternate path to start. The hardware searches the alternate paths looking to find a free path to the receiving adapter across the network stages 200, 210 and 220. If any attempt on an alternate path is successful, the connection is established and the searching stops. If any attempt is unsuccessful, any partially established connection is broken and the search continues by retrying a different alternate path from the beginning (starting at first stage 200 of the network). If the network is non-blocking, a path will always be found quickly.

Referring further to FIG. 3, the Eight Alternate Path Network illustrated can be used as either the entire network when only one copy is implemented, or it can be used twice with each copy forming a sub-network 108 or 110 of network 104 as shown in FIG. 1. When used as the only sub-network to interconnect 64 nodes, the Eight Alternate Path Network of FIG. 3 is blocking; however, it is an excellent network that will continually search the alternate paths and establish a connection as soon as the blocking goes away and one of the alternate paths becomes free.

Figure 4B:
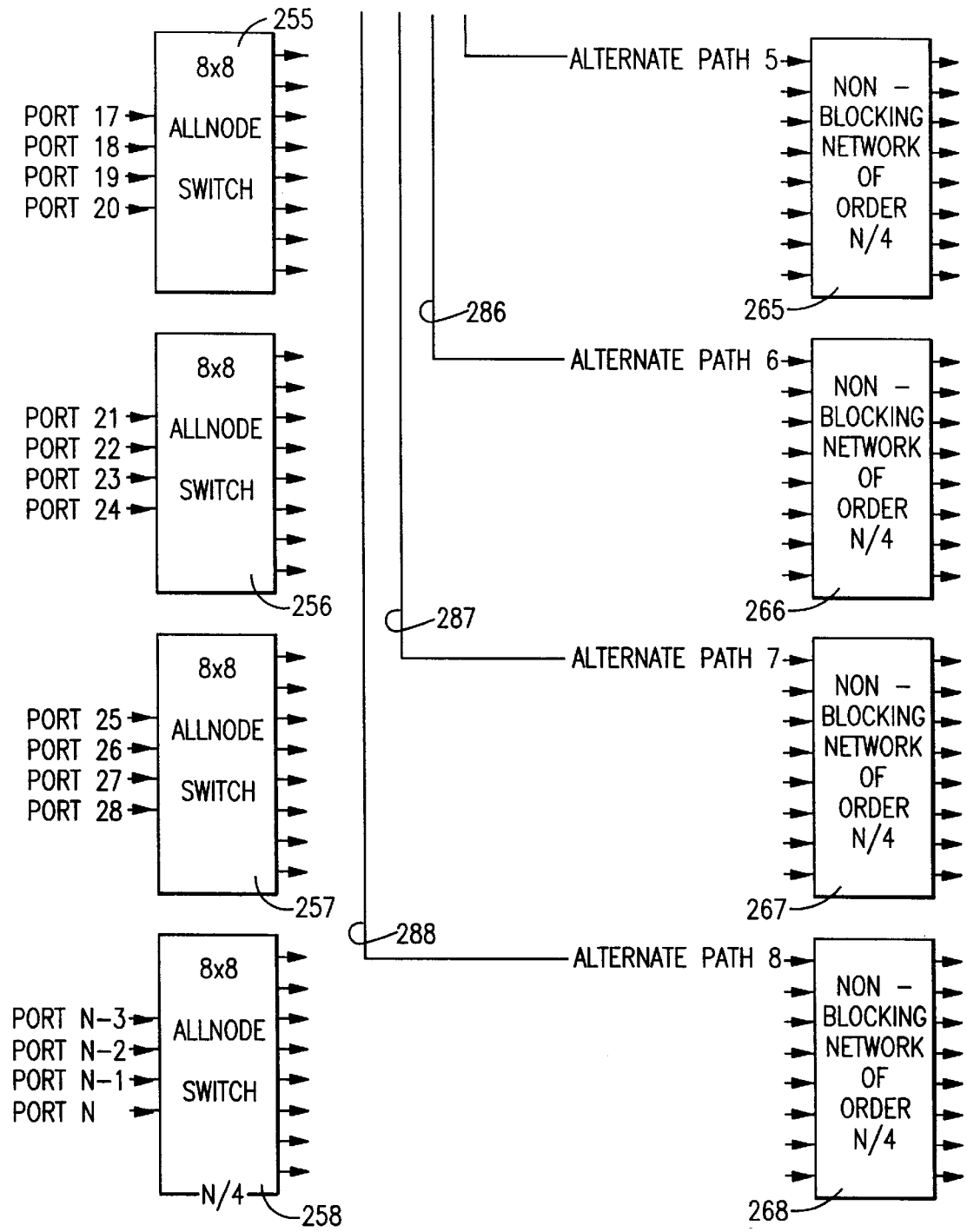
Figure 4C:
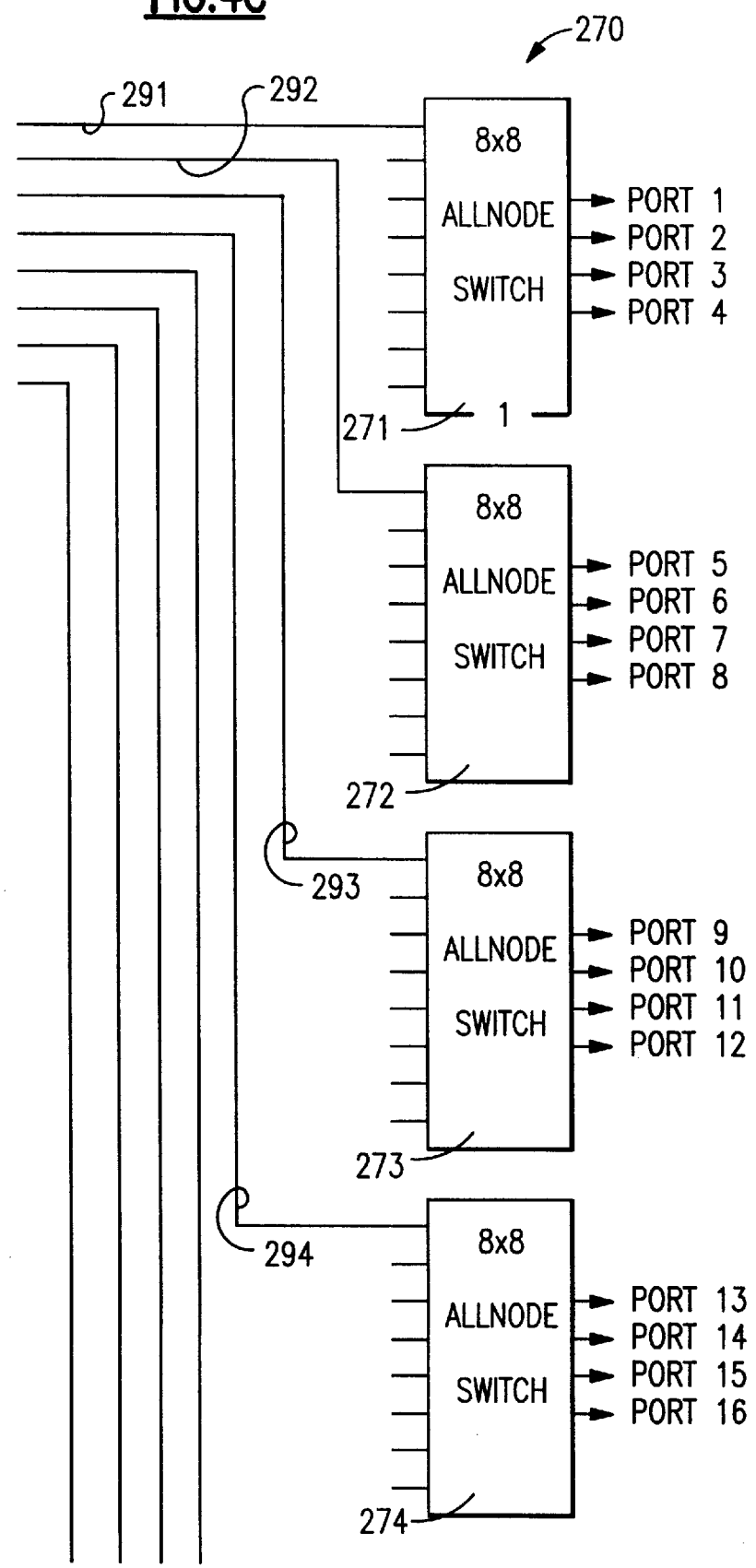
Figure 4D:
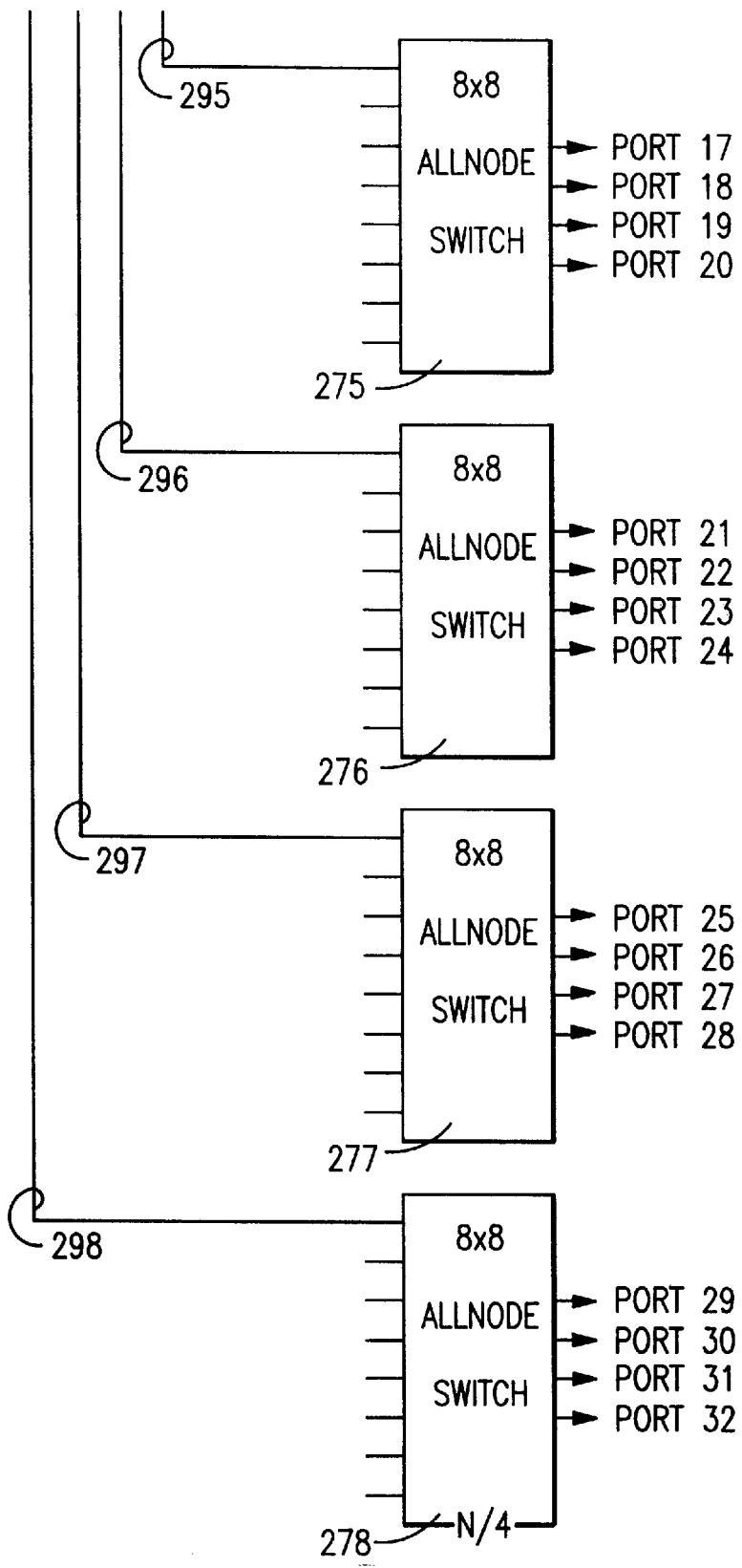

Referring to FIG. 4, the Eight Alternate Path Network of FIG. 3 is made NON-BLOCKING when used to interconnect 32 nodes. First stage 250 comprises switches 251–258, each switch having, in this case, only four ports on the input (Ports 1 through N, where N equals 32). The eight outputs of first switch 251 are fed to the first inputs of each of center stage 260 switch blocks 261–268. Similarly, the eight outputs of second switch 252 of input stage 250 are fed to the second inputs of each of center stage 260 switch blocks 261–268. And so on, for each of switch blocks 253 through 258. The outputs of first center stage switch 261 are fed on outputs 291–298 to the first inputs of switches 271–278, respectively. Similarly, for the second through eighth switch blocks 262–268 to the corresponding inputs to switch blocks 272–278. In this exemplary embodiment, each of switch blocks 271 through 278 has four output ports.

The Eight Alternate Path Network of FIG. 4 meets the criteria of the CLOS non-blocking definition. The CLOS definition of a non-blocking symmetrical network is: the network is non-blocking if 2n−1 alternate paths are provided from each input port (ports 1 through N at stage 250) to each output port (ports 1 through 32 at stage 270) through a middle stage 260 of the order N/4; where n=the number of input ports=the number of output ports per switch chip, and N=the number of input ports=the number of output ports for the entire network. In this case, n=4 and N=32. The criteria says that the network will be non-blocking if 2×4−1=7 alternate paths through middle stages of the order 32/4=8 are provided. So, this network meets the CLOS definition of being non-blocking because at least seven alternate paths (herein we have eight, or more than seven) are provided and the 8×8 middle stage switch chips are of the order 8. The eighth alternate path is not necessary to provide non-blocking, but the eighth alternate path does provide fault tolerance by making the FIG. 4 network non-blocking even if one alternate path has failed.

Figure 5A:
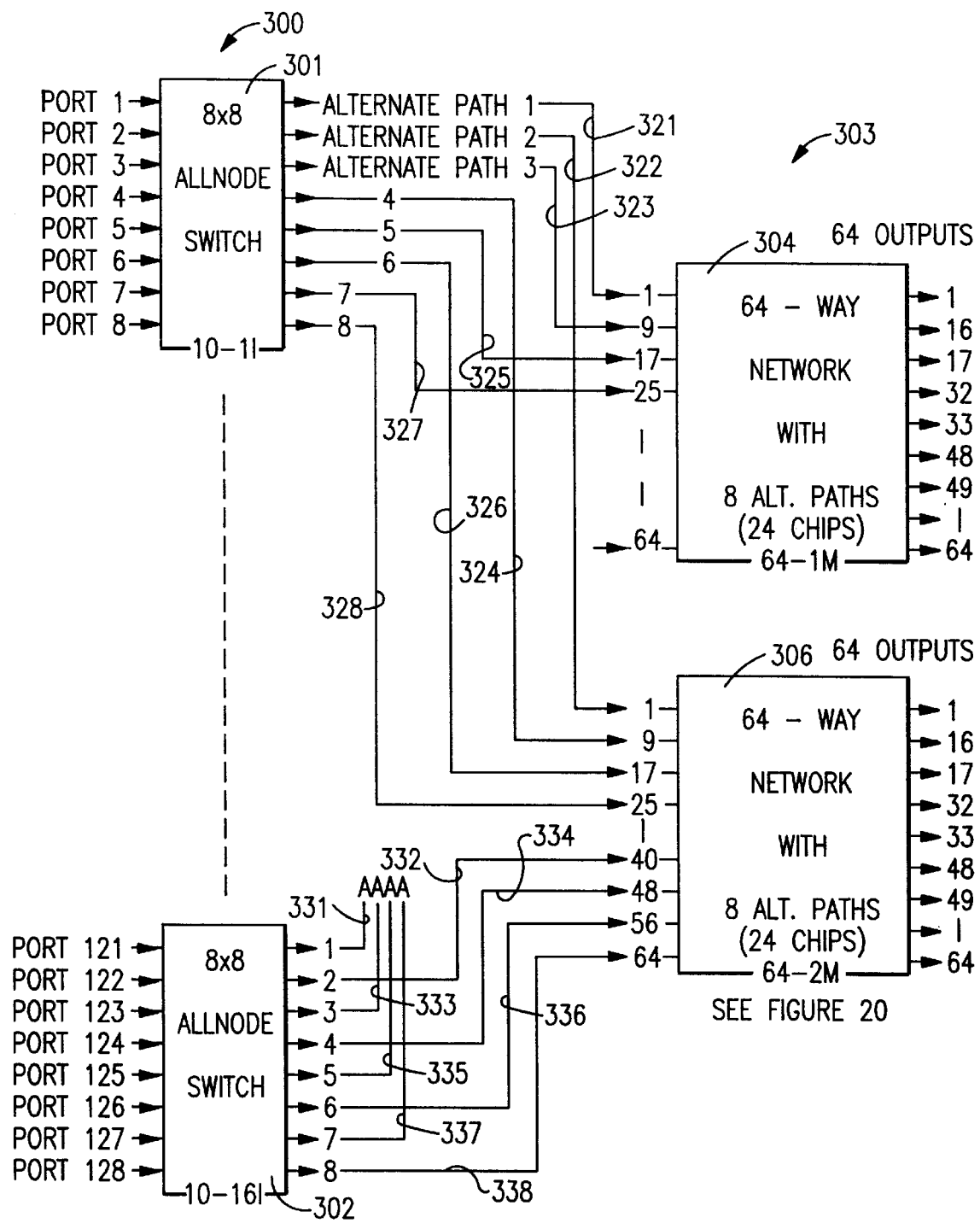
FIGS. 5A and 5B, oriented as shown in FIG. 5, are a diagram showing a 128 node network (N=128) where the middle stage is comprised of eight 64-way sub-networks according to this invention.
Figure 5B:
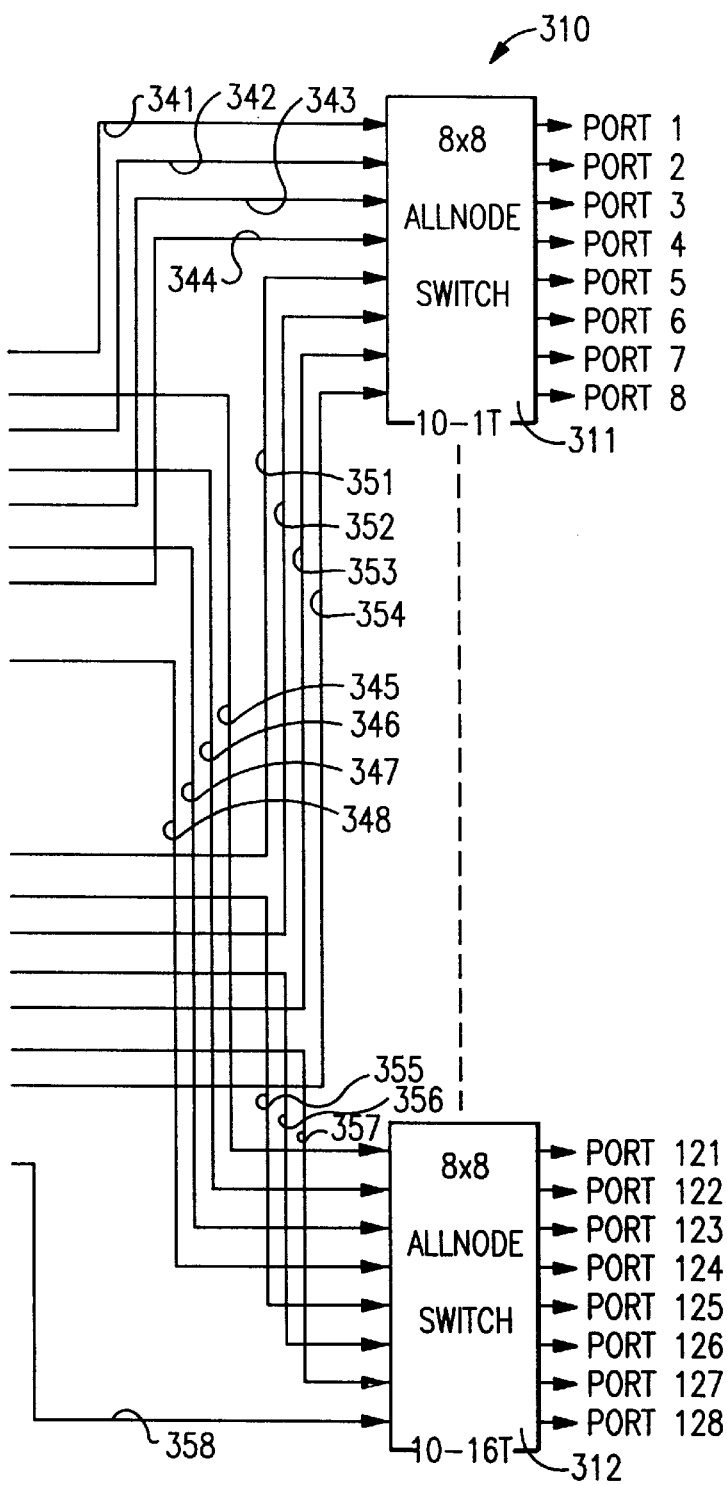

Referring to FIG. 5, an expansion of the Eight Alternate Path Network to 128 nodes is shown. A row 300 of sixteen (for simplicity, only two are shown) first stage switches 301–302 are used to accept inputs from 128 nodes on ports 1 through 128. Each switch 301–302 provides eight alternate paths 321–328, 331–338 from first stage 300, all of which are capable of connecting (through stages 303, 310 and output lines 341–348, 351–358) to any of the 128 nodes. A row 310 of sixteen last stages switches 311–312 (again, only two of these are shown for simplicity) are used as crossbar switches to connect the output of the switch network to these 128 nodes (at stage 310 output ports 1 through 128). Middle stage 303 is comprised of multiple 64-way networks 304, 306, each being configured as shown in FIG. 3.

As illustrated in FIG. 5, for 128 nodes, two 64-way middle stage 303 sub-networks 304, 306 are required to support eight alternate paths from the first stage 300 with each sub-network 304, 306 supporting four alternate paths from first stage 300.

While not illustrated, the network of FIG. 5 expands to 256 nodes by adding two more 64-way middle stage 303 sub-networks, where each middle stage 303 sub-network supports two alternate paths from first stage 300. Finally, the network expands to 512 nodes having a total of eight 64-way middle stage 303 sub-networks, where each middle stage 303 sub-network supports one alternate path from first stage 300. The expansion to 1024 nodes looks like the network shown in FIG. 5, except that the two middle stage 303 sub-networks 304, 306 each become 512-way networks, and the first 300 and last 310 stages require N/8 switch chips each.

Therefore, the general equation for the number of switch chips 301–302, 311–312 required to implement an eight alternate paths network is as follows:

EQUATION FOR NUMBER OF CHIPS PER EIGHT ALTERNATE PATH NETWORK $$C(N)=N/4+2*C(N/2)*U+4*C(N/4)*V+8*C(N/8)*W$$

N=number of nodes

C(N)=number of chips required to implement the network

C(N/2)=number of chips required to implement the network for N/2 Nodes

C(N/4)=number of chips required to implement the network for N/4 Nodes

C(N/8)=number of chips required to implement the network for N/8 Nodes

U=1 when N=16 or 16×8n, where n is a positive integer, otherwise U=0

V=1 when N=32 or 32×8n, where n is a positive integer, otherwise V=0

W=1 when N=64 or 64×8n, where n is a positive integer, otherwise W=0

Allnode Non-blocking Network

Note that for FIG. 3, n=8 and N=64, so that FIG. 3 is blocking, because the CLOS definition requires 2×8−1=15 alternate paths and a middle stage of the order 64/4=16 to be non-blocking, and in FIG. 3 only eight alternate paths with middle stages of order 8 are provided.

Figure 6:
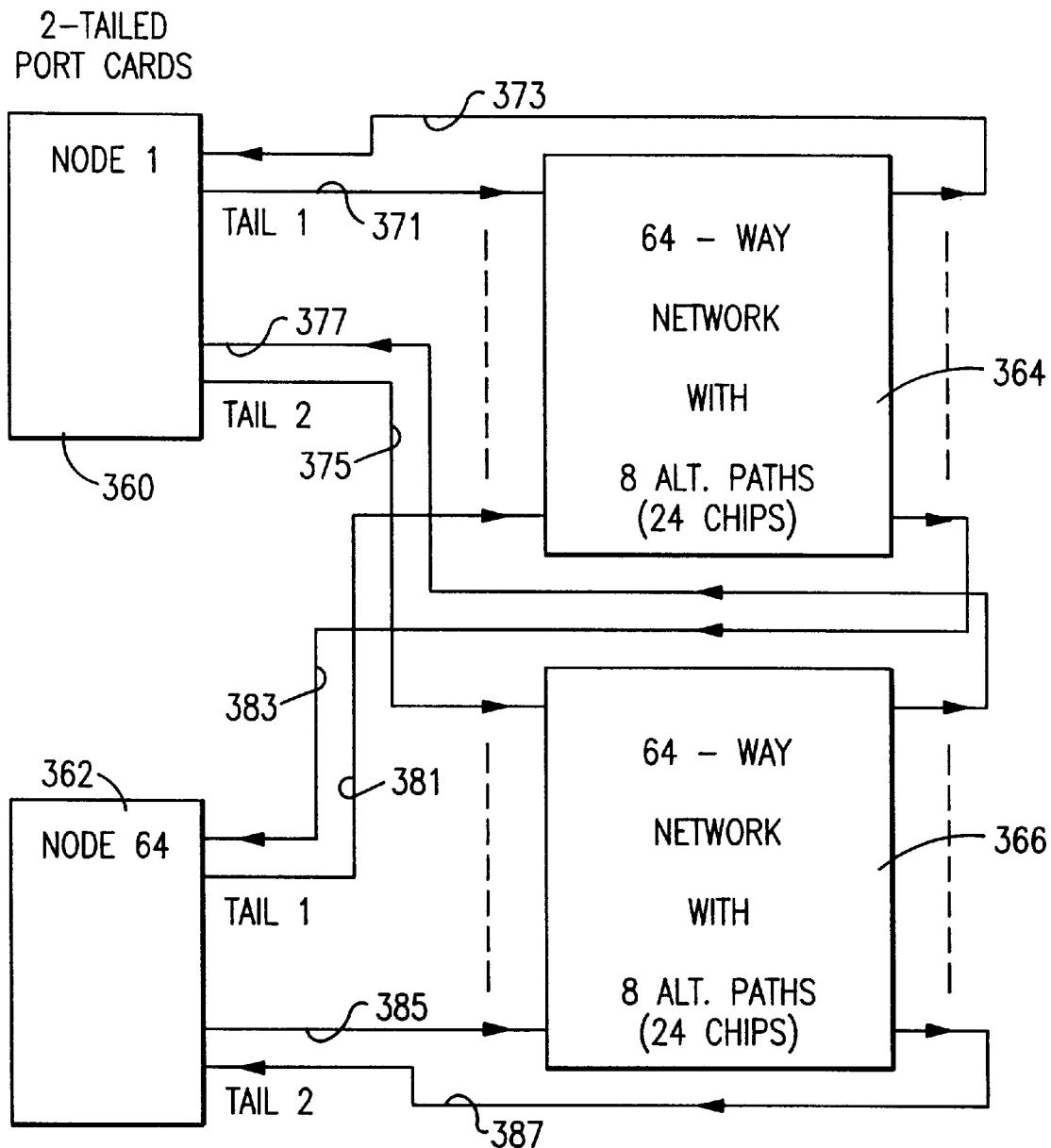
FIG. 6 is a diagram showing two 64 node networks (N=64), where each node is a two-tailed adapter attaching to each 64 node network via a different tail according to this invention.

Referring to FIG. 6, the network of FIG. 3 is made non-blocking by using the present invention of the 2-tailed network adapter 106 in FIG. 1. Two networks 364, 366 of the type shown in FIG. 3 are used to create the Allnode Non-blocking network shown in FIG. 6. Each of 64 nodes 360–362 (only two are shown for simplicity) includes two tails, one tail connected to each of networks 364. That is, each network 364, 366 is connected to a different tail of the 2-tailed network adapter 106 at each of the 64 nodes 360–362. Thus, for node 360, tail 1 includes lines 371, 373, with line 371 connected to port 1 on the input stage of network 364, and line 373 connected to port 1 on the output stage of network 364. Similarly, tail 2 of node 360 is connected by line 375 to port 1 on the input stage of network 366, and by line 377 to port 1 on the output stage of network 366. Similarly, node 362 is connected by lines 381, 383 to port 64 on the input and output stages, respectively, of network 364, and tail 2 of node 64 is connected by lines 385, 387 to the port 64 on the input and output stages, respectively, of network 366.

The resultant network 104, as configured in FIG. 6 to include networks 364, 366, is the only known non-blocking network for 64 nodes 360–362 implemented in only three switch stages (these stages being illustrated in FIG. 3) of twenty four 8×8 switches 201–208, 211–218, 221–228. The 2-tailed adapter 106 enables the network shown in FIG. 6 to provide sixteen alternate paths by paralleling two Eight Alternate Path Networks 364, 366 identical to FIG. 3. The paralleling is implemented by two-tailed network adapter 106 providing a separate connection to each of the two eight Alternate Path Networks 364, 366. Thus each node (102, in FIG. 1, and 360–362 in FIG. 6) has available to it a total of sixteen alternate paths through the network (104, in FIG. 1, and 364, 366 in FIG. 6) that it can traverse in only three switch stages (200, 210 and 220 in FIG. 3.)

The network of FIG. 6 is non-blocking, because the CLOS definition requires, for a switch network to be non-blocking, 2×8−1=15 alternate paths and a middle stage of the order 64/4=16, and sixteen alternate paths with middle stages of order 16 are provided. Actually, two different networks are used in parallel, with each network being of the order 8. Two middle stages having an order of 8 are identical to one middle stage having an order of 16. Thus, the non-blocking Allnode network 104 is created from two parallel networks 364, 366, with each network 364, 366 having middle stages 210 of the order N/8 (that is, for N=64, 64/8=8.)

The Allnode Non-blocking Network 364, 366 greatly reduces the components and latency required by the CLOS Network 140. This will become apparent hereafter when comparing the two network structures.

Figure 7A:
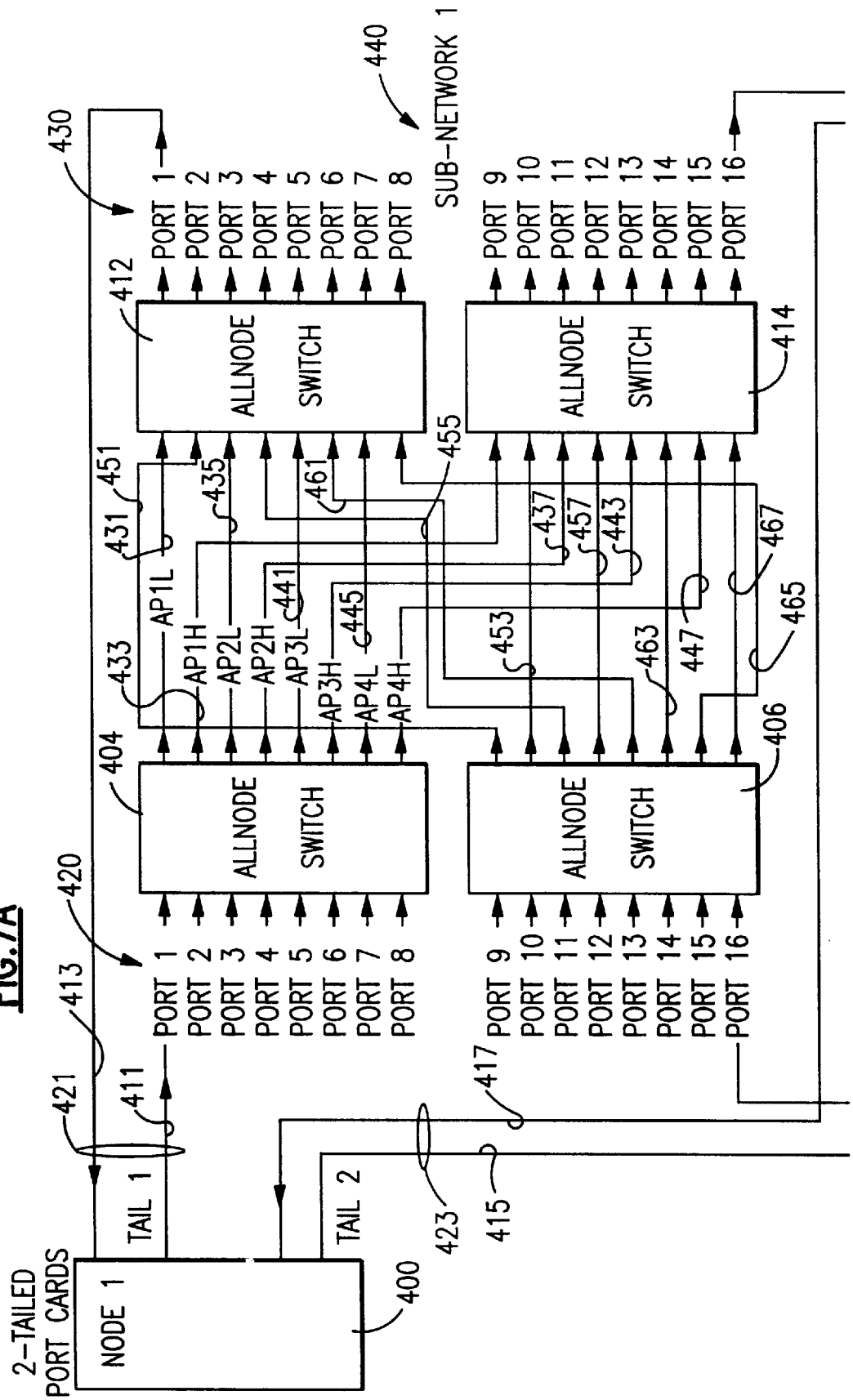

Referring to FIGS. 7 and 8, the general and expandable CLOS Network is shown to use outer stages for connecting four nodes to each switch chip.

Referring to FIG. 7, the Allnode Non-blocking network for sixteen nodes is shown, which is the only known non-blocking network for sixteen nodes implemented in only two switch stages using 8×8 switches 404, 406, . . . , 418. The object is to provide eight alternate paths by paralleling two four-alternate path sub-networks 440, 450. In this embodiment, sixteen nodes 400–402 (two only are shown for simplicity) each have two tails 421, 423 and 425, 427 connected to an inner stage of a CLOS Network containing eight imbedded CLOS sub-networks 404, 406, 408, 410, 412, 414, 416 and 418 arranged in two stages with input ports 420, output ports 430; these are arranged in two sub-networks 440 and 450. Node 400 first tail 421 is connected to sub-network 440 by line 411 to switch 404 input port 1 and by line 413 to switch 412 output port 1. Node 400 second tail 423 is connected to sub-network 450 by line 415 to switch 408 input port 1 and by line 417 to switch 416 output port 1. Similarly, in this embodiment for sixteen nodes, each of the other fifteen nodes, such as node 402, has one tail 425 connected to sub-network 440 and one tail 427 connected to sub-network 450, each at respective input ports 420 and output ports 430, as previously described with respect to node 400.

In FIG. 7, each of the eight switch blocks 404, 406, 408, 410, 412, 414, 416 and 418 functions as an imbedded sub-network of the order N/4 and provides alternate paths for four nodes where N is the total number of nodes supported by the network, in this example sixteen. Thus, for sub-network 440, the embedded sub-networks comprise switch blocks 404, 406, 412 and 414 which are interconnected as illustrated: switch 404 output lines 431, 435, 441 and 445 being connected to switch block 412 to provide alternate paths to lower number ports 1 through 8, and by lines 433, 437, 443, 447 to switch block 414 to provide alternate paths to high number ports 9 through 16. Similarly, switch block 406 connects by lines 451, 455, 461, 465 to switch block 412 and by lines 453, 457, 463, 467 to switch block 414 to provide alternate paths respectively to lower numbered and high numbered ports 430.

Referring to FIG. 8, a prior art CLOS network for sixteen nodes is shown including switches 470–481 and providing eight alternate paths, such as lines 482–489. By extension, a CLOS network for 64 nodes (N=64) would have eight imbedded sub-networks, each of the order 64/4=16. Which means, as is illustrated in FIG. 8, that each of the eight alternate paths would be a 16-way CLOS Network requiring twelve switch chips 470–481. Thus, a 64-node non-blocking CLOS network requires the following number of components: C(N)=N/2+8*C(N/4), where C(N)=number of chips required to implement non-blocking network, and C(N/4)= number of chips required to implement the non-blocking network for N/4 Nodes. C(64)=64/2+(8×12)=128 switch chips implemented in five switch stages. In comparison, an Allnode non-blocking network of the invention only requires two banks of twenty four chips each=48 switch chips implemented in three switch stages.

Figure 9:
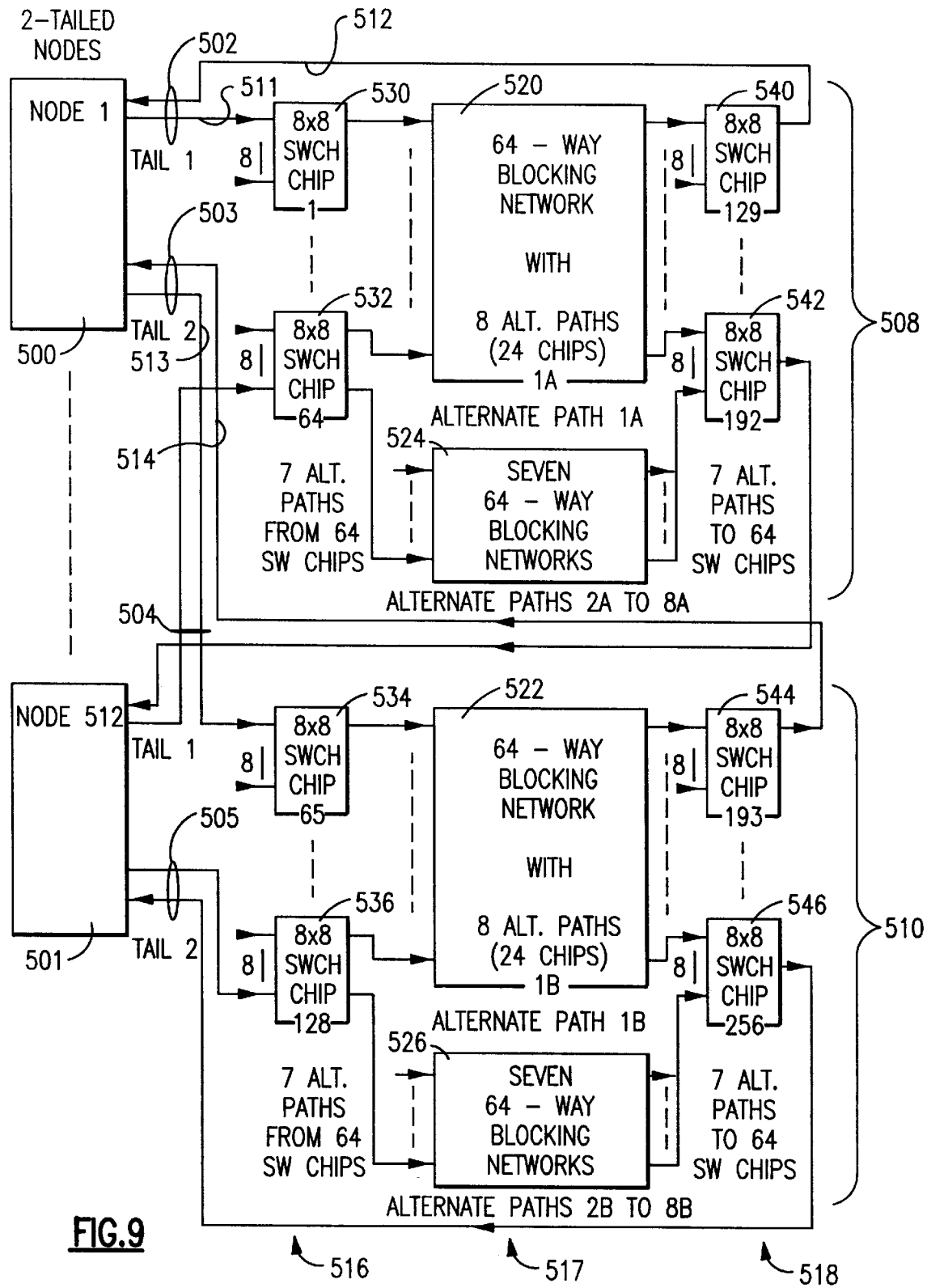
FIG. 9 is a diagram showing two 512 node networks (N=512), where each node is a two-tailed adapter attaching to each 512 node network via a different tail to create a non-blocking interconnection system according to this invention.

Referring to FIG. 9, expandability of the ALLNODE NON-BLOCKING Network to 512 nodes (only two of the 512 nodes, first node 500 and last node 501, are shown for simplicity) is accomplished by using two parallel sub-networks 508, 510 with the outer stages 516, 518 of each sub-network connecting eight of 512 nodes 500–501 to each switch chip. First node 500 tail 502 connects to sub-network 508 by line 511 to input outer stage 516, switch 530 and by line 512 to output outer stage 518 switch 540. First node tail 503 connects to sub-network 510 by line 513 to switch 534 and by line 514 to switch 544. Similarly, as is further illustrated in connection with last node 501, each of the other 511 nodes in a 512 node network connects by one tail 504 to switch chips 532, 542 of sub-network 508 and by second tail 505 to switch chips 536, 546 of sub-network 510.

Middle stage 517 of each sub-network 508, 510 contains in blocks 520, 524 and 522, 526, respectively, eight imbedded Allnode networks of the order N/8, where each imbedded sub-network functions as an alternate path and N is the total number of nodes supported by the network. For instance, an Allnode non-blocking network for 512 nodes (N=512) would have sixteen imbedded networks 520, 524, 522, 526 each of the order 512/8=64. Which means that each of the eight alternate paths from input stage 516 switches 530, 532 (two only of the eight switches are shown) to output stage 518 switches 540, 542 (again, only two of the eight switches are shown for simplicity) across middle stage 517 networks 520, 524 for sub-network 508 includes a 64-way Allnode Non-blocking network requiring twenty four switch chips, as was previously explained with respect to the eight alternate path network (FIG. 3).

The general equation for the number of components required in a scalable network in accordance with this invention is:

EQUATION FOR NUMBER OF CHIPS PER NON-BLOCKING ALLNODE NETWORK $$C(N)=N/2+16*C(N/8),$$

where C(N/8)=–3/16 for N=8 nodes,
¼ for N=16 nodes,
½ for N=32 nodes,
1 for N=64 nodes,
24 for 512 nodes, etc.

Referring to FIG. 10, as networks become larger, the non-blocking Allnode Network requires only one eighth the number of switch chips required by the corresponding CLOS Network. The table in FIG. 10 summarizes the different options offered by the Allnode network in relation to the number of switch chips required.

Figure 11B:
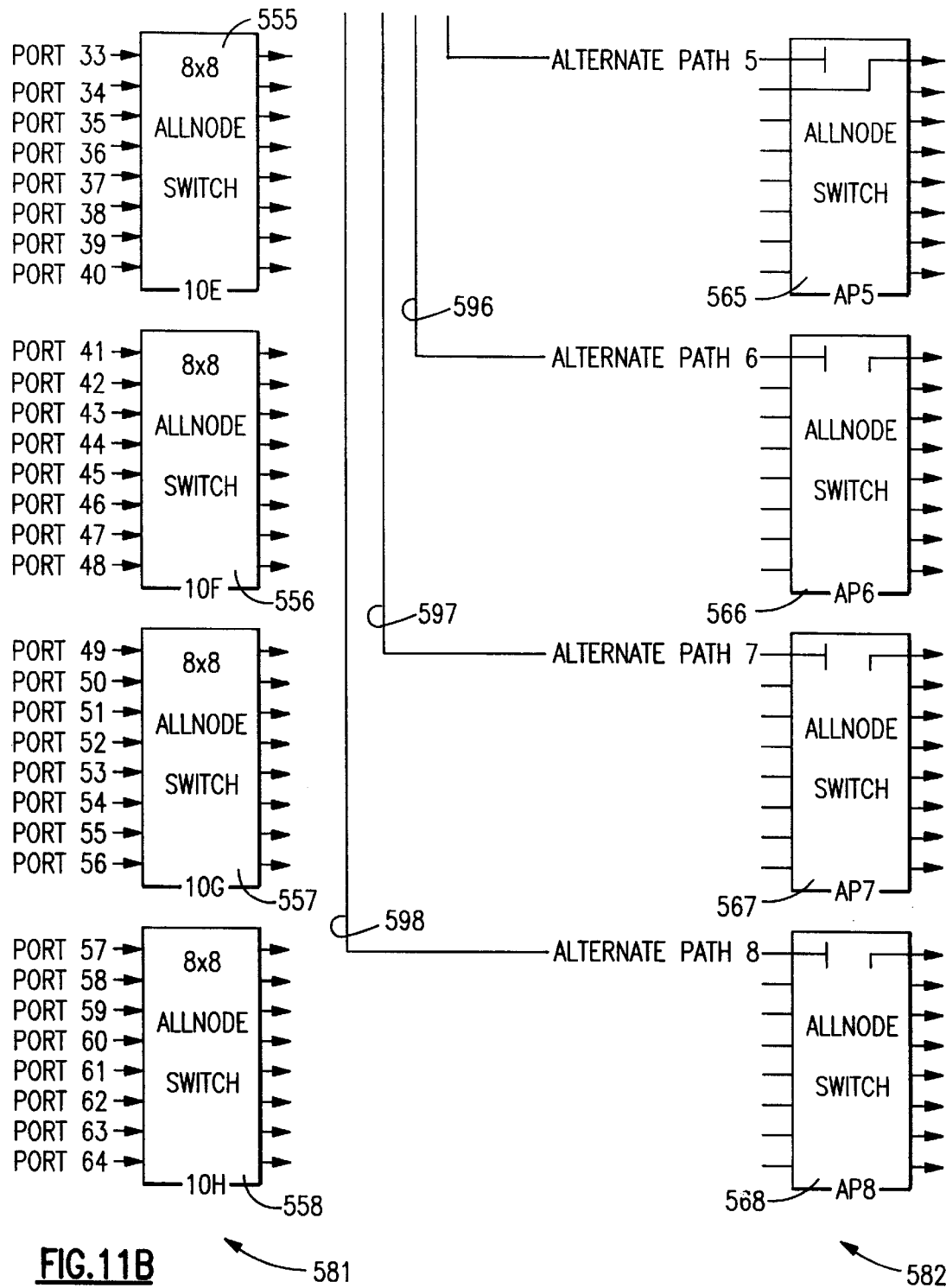
Figure 11C:
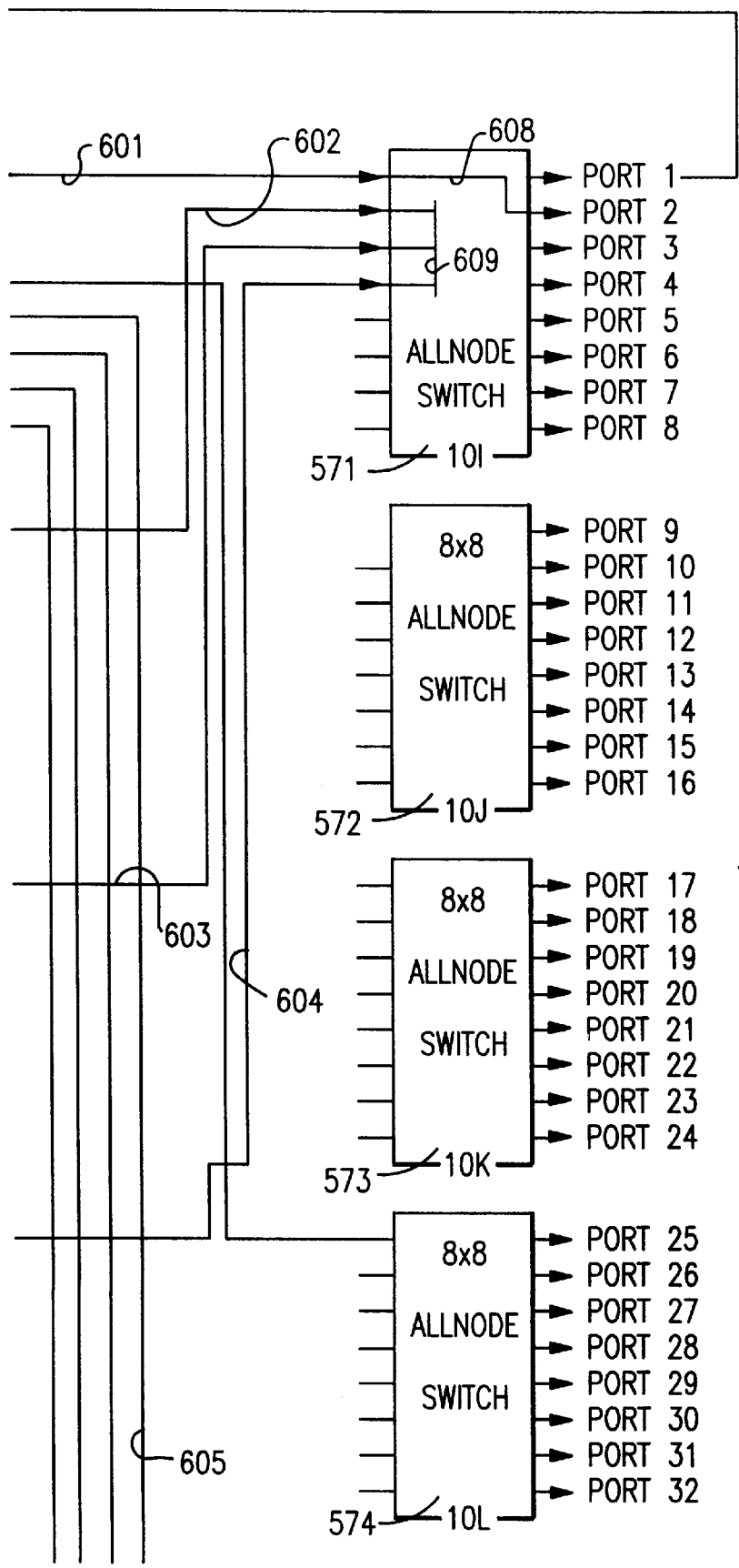
Figure 11D:
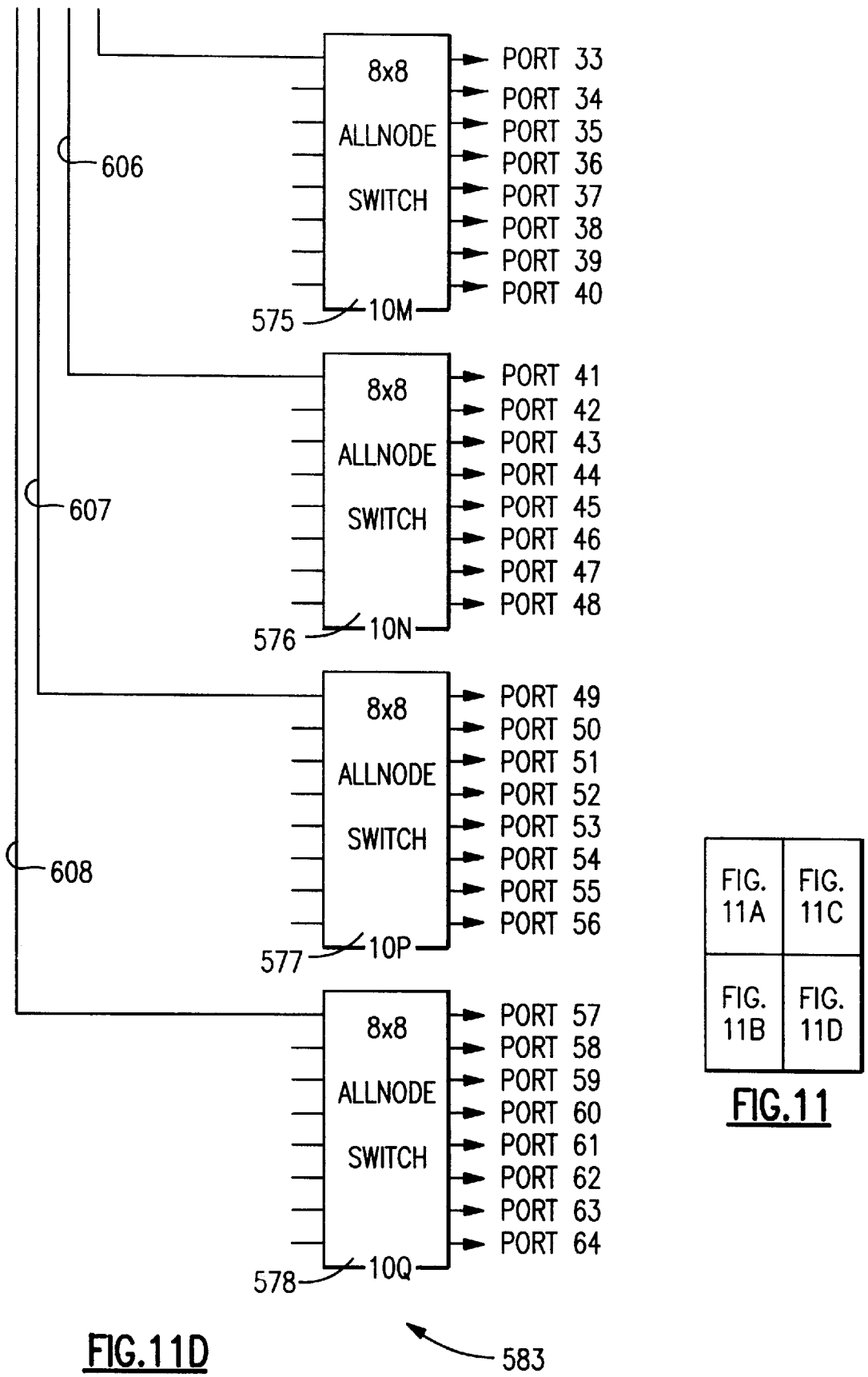

Referring to FIG. 11, a second embodiment for establishing a connection over an eight alternate path network is shown. In accordance with this embodiment, a tail 560 of network adapter 550 is connected by lines 585, 587 to input stage 581 and output stage 583 at switches 551, 571, respectively. Input stage 581 includes switches 551–558, and output stage 583 includes switches 571–578. Middle stage 582 includes switches 561–568, and is connected to the input stage 581 and output stage 583 in a manner which provides alternate paths for simultaneous searching, as will be described hereafter. Input stage 581 switch 551 is connected on the input side to the first through eighth ports, including port 550, and by lines 591–598 to middle stage 582 switches 561–568, respectively. Similarly, one output line (these are truncated and not assigned reference numerals in FIG. 11 for simplicity) of each of the other input stage 581 switches 552–558 is connected (not shown, but the same as is shown for output lines 591–598 for switch 551) to an input on each middle stage 582 switch 561–568. The outputs of middle stage 582 switches 561–568 are connected to output stage 583 switches 571–578, connecting lines 601–608 being illustrative thereof, with the remaining connecting lines being truncated for simplicity. Outputs 601, 605–608 from switch 561 illustrate that an output from each switch of middle stage 582 is connected to an input on each switch of output stage 583, and connecting lines 601–604 illustrating that each switch of output stage 583 receives an input from each switch of middle stage 582.

In operation, the hardware at node 550 searches multiple alternate paths simultaneously, up to 2 m at a time, where m equals the number of alternate paths in each sub-network. Identical searches are always made in both sub-networks simultaneously (only the one sub-network connected to tail 560 being illustrated in FIG. 11); thus, if m alternate paths are searched in one sub-network, 2 m alternate paths are searched simultaneously in the complete network (5). "m" can equal anywhere from one to the maximum number of alternate paths provided by the sub-network. When m alternate paths are searched simultaneously in both sub-networks, if one or more than one path is found available in either sub-network, one of the available connections is established and all the other 2 m–1 connections are broken immediately to free the network as soon as possible.

Referring further to FIG. 11, an example of this searching will be explained for the first sub-network, the one connected to node 550 by tail 560. The second sub-network required by the invention functions identically and is not shown in FIG. 11. In this example, Node 1 attempts to connect across three switch stages 581–583 and eight alternate paths 591–598 to Node 2 at output port 2 on switch 571. Node 550 tries all m (m=8 in this example) paths simultaneously, as shown by an input from Node 550 to switch 551 that tries to connect to all eight output ports 591–598 of switch 551 by the internal connection shown. However, in this example, alternate path 598 is busy with a previous connection and the attempt to make a connection is blocked, as is represented at 570. The result is that node 550 can only win connections to seven of the eight alternate paths 591–597 at switch 551. These seven paths 591–597 connect to switches 561–567, enabling those switches 561–567 to be examined in parallel. That is, for this example, connections are attempted between the upper most input port to the upper most output port middle stage 582 switches 561–567 (switch 568 being blocked, as is shown at 570.) In this example, as illustrated within switches 561–567, four of these attempted connections are successfully made in switches 561, 562, 563 and 564, while three of the connections are not successful in switches 565–567, because they are blocked by previous connections. Finally in this example, four alternate paths 601–604 connect successfully to switch 571 in last stage 583. Switch 571 makes a selection decision by randomly selecting one of the four successful connections 601–604 across the network and rejecting the others. As shown in this example, switch 571 randomly chooses alternate path 601 to connect by line to Node 2 (Port 2 at output of switch 571), which blocks, as is shown at 609, the other three alternate paths 602–604 from connecting across switch 571 successfully. The seven unsuccessful blocked paths 602–608, are broken immediately on an individual basis as soon as they detect blockage, regardless of the stage (stage 581 for path 598, stage 582 for paths 595–597, and stage 583 for paths 602–604) where the blockage is detected. By breaking the connections is meant that the unsuccessful lines in FIG. 11 are immediately disconnected, leaving only the one successful connection (represented, in this example, by lines 585, 591, 601, 608 and 587) and freeing all other switch input and outputs to support other connections in the sub-network.

Direct and Cube Interconnections

Figure 12C:
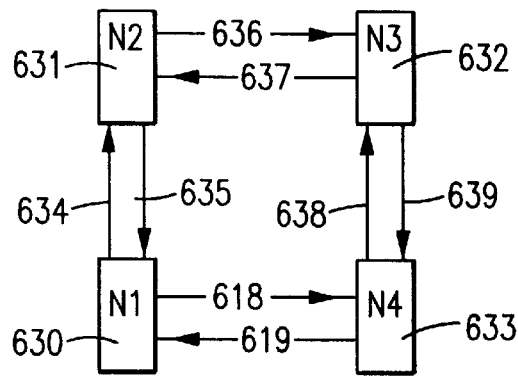
Figure 12D:
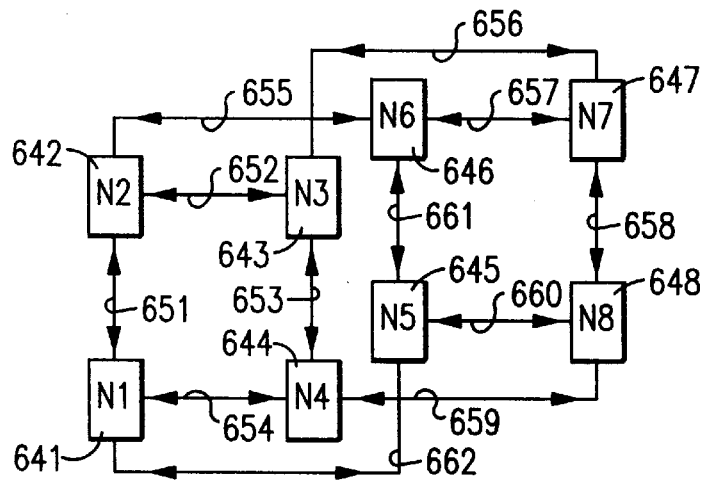
Figure 12E:
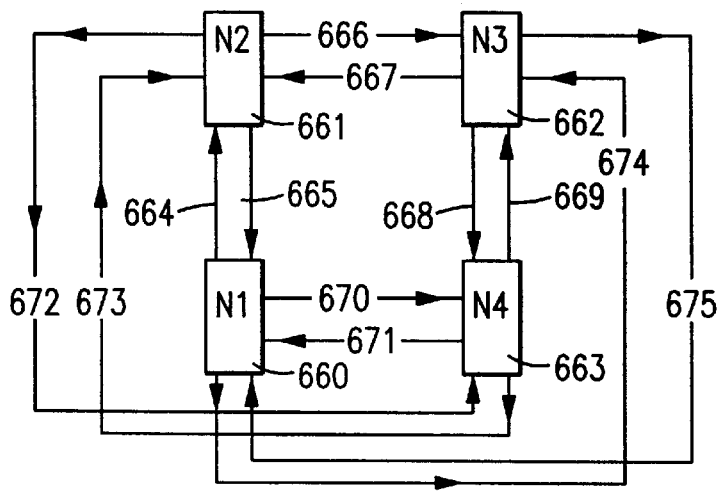

Referring to FIGS. 12A through 12E, a further feature provided by the two-tailed network adapter 106 of FIG. 1 is the ability to use the adapter to interconnect a plurality of nodes without requiring the use of a central switch. Two-tailed adapter 106 is good for interconnecting up to three nodes with direct, non-blocking connections as shown in FIGS. 12A and 12B, and for interconnecting more than three nodes with blocking connections as shown in FIG. 12C. FIGS. 12D–12E show the possible connections provided by a three-tailed network adapter. In FIG. 12A, a node 610 to node 612 direct link, using one or two tails 611, 615, and 613, 614 per node, is provided. In FIG. 12B, direct links amongst three nodes 620–622 are provided, using two tails 628, 629 and 624, 625 per node. In FIG. 12C, a ring network amongst four nodes 630–633 is provided, using two of the four tails 634, 635; 636, 637; 638, 639; and 618, 619 per node. In FIG. 12D, a cube network amongst eight nodes 641–648, using three tails per node, is provided: that being, respectively, tails 651, 654, and 662; 651, 652, 655; 652, 656, and 653; 653, 654, and 659; 661, 660, and 662; 655, 657 and 661; 656, 657, and 658; 658, 659, and 660. For more than three nodes a blocking ring or hypercube network can be formed. FIG. 12E shows the non-blocking connections 664/665, 666/667, 668/669, 670/671, 672/673, and 674/675 (each pair being a tail) amongst four nodes 660–663.

As noted above, the apparatus of the invention can be expanded to adapters having more than two tails. For instance, as shown in FIG. 12E, a 3-tailed adapter would be used for interconnecting up to four nodes without blocking, and as shown in FIG. 12D, up to eight nodes in a hyper-cube type network without requiring a central switch. As shown in each of FIGS. 12A–12E, a central switch is not required to make these connections.

The various configurations provided by the multi-tailed network adapter 106 create five different interconnection options as follows:

Option 1: Dual, Non-Blocking Parallel Sub-Networks for Sending Messages

Referring to FIGS. 1 and 6, in accordance with one embodiment of the invention, adapter 106 with two-tails 112 and 114 creates various functional options. Option 1 connects the adapter to two sub-networks 108, 110 comprising network 104 to provide cost effective non-blocking networks. When using a central switch network 104 and implementing a non-blocking network as shown in FIG. 6, network adapter 106 searches for a connection path and reduces connection latency by sending the same connection command to both sub-networks 108, 110 over both tails 112, 114 simultaneously. Adapter 106 tries to establish a connection over the one alternate path in both sub-networks 112, 114 simultaneously, for the purpose of making a connection between sending node 102 and the selected receiving node, say 121 or 123. Two results are possible:

First: neither path attempt is successful (both paths receive rejection responses as reported by the REJECTN being activated to 0)—in which case, sending adapter 126 cancels both paths and tries two other alternate paths simultaneously (corresponding paths in the two different sub-networks 364, 366 of FIG. 6 are tried). For instance, adapter 106/360 first tries alternate path 1, represented by lines 371/373 and 375/377, in both sub-networks 364, 366 simultaneously. If both paths are blocked, it then tries alternate path 2 in both sub-networks simultaneously, etc.

Second: one path is successful and one path receives a REJECTN 107 response. In this case the sending adapter 126 breaks any partially established unsuccessful path and maintains the successful path.

There are two reasons why a REJECTN signal 107 is activated. A blockage is encountered within the network, or the paths in both networks are made successfully and arrive at the receiving adapter over different tails. In the second case the receiving adapter accepts one of the paths and rejects one of the paths at its discretion by issuing REJECTN 107 to the rejected path only.

The implementation of the Two-Tailed Adapter 106 requires 1:2 fan-out logic 132 and 2:1 fan-in logic 134, as shown in FIG. 1. Blocks 132, 134 perform the function of converting a normal single-tailed Allnode interface 137 from sending adapter 126 and receiving adapter 128 to provide two full-duplex tails 112, 114 to network 104. Note that fan-out and fan-in logics 132, 134 are incorporated at each node 102, 121, 123 of the network 104 as part of network adapter 106.

Figures 13, 13A:
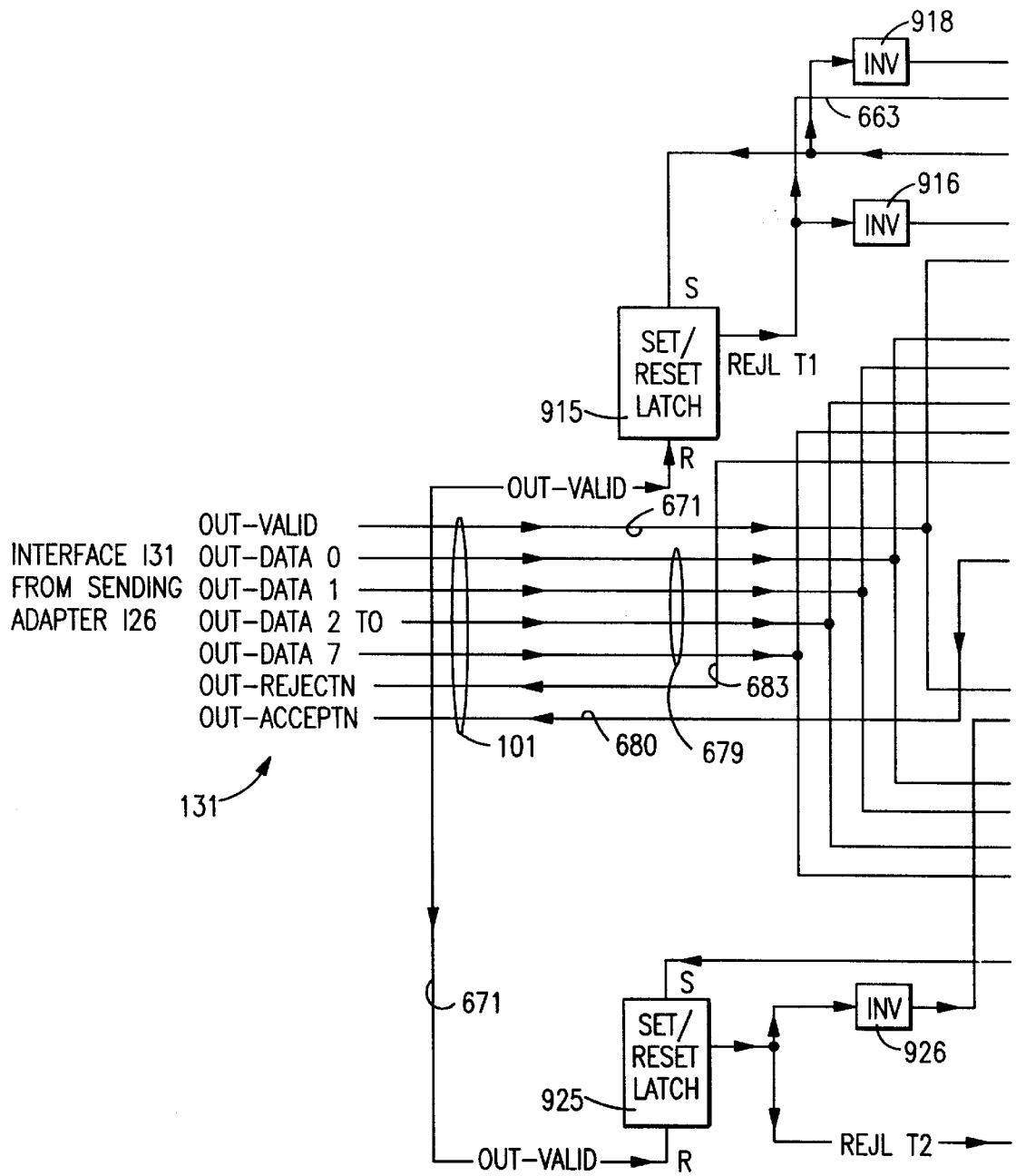
FIGS. 13A and 13B, oriented as shown in FIG. 13, are a logic diagram showing the fan-out of the single tail from the sending adapter to provide the disclosed 2-tail network adapter for the non-blocking Allnode network.
Figure 13B:
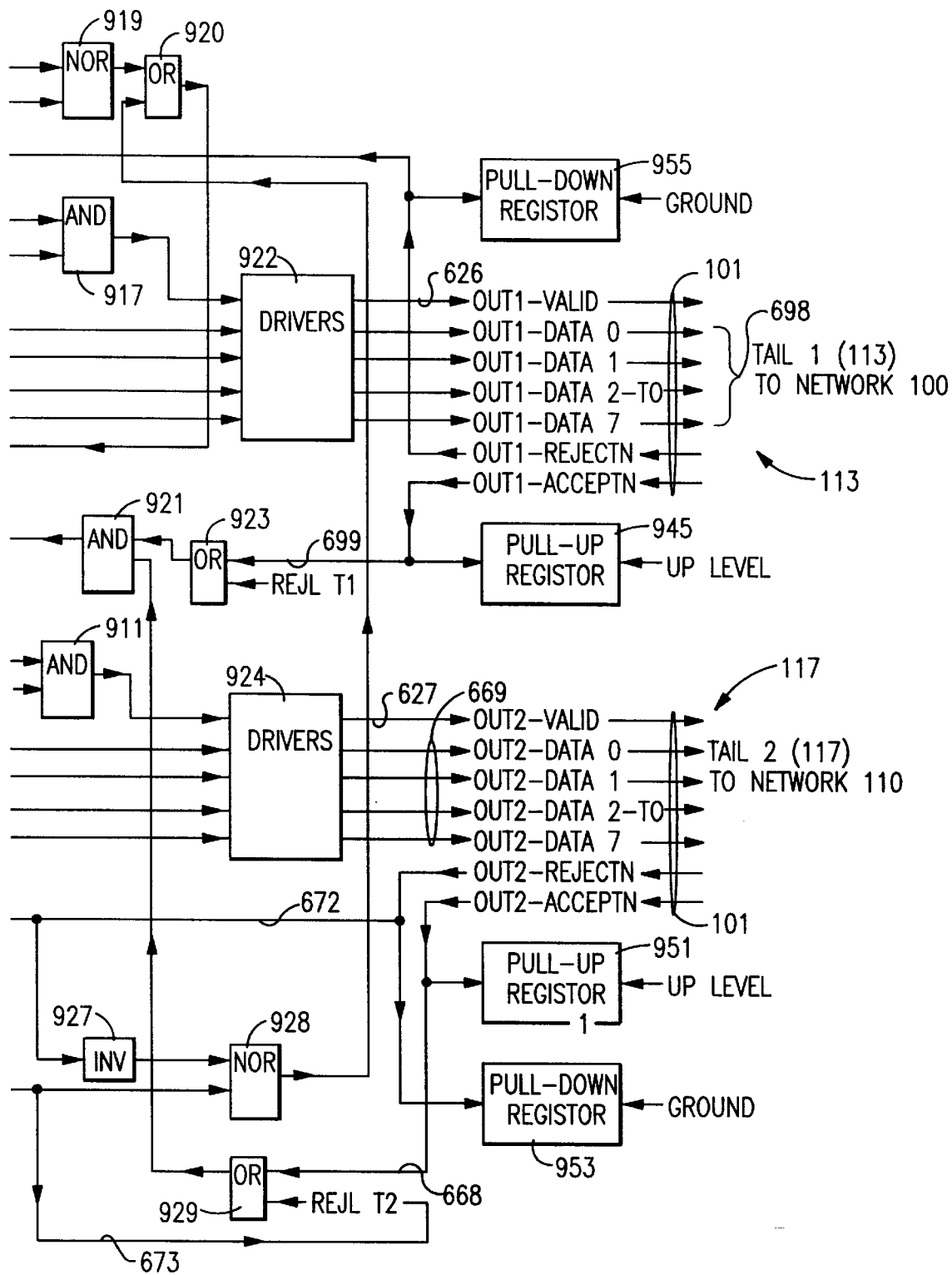
Figure 14A:
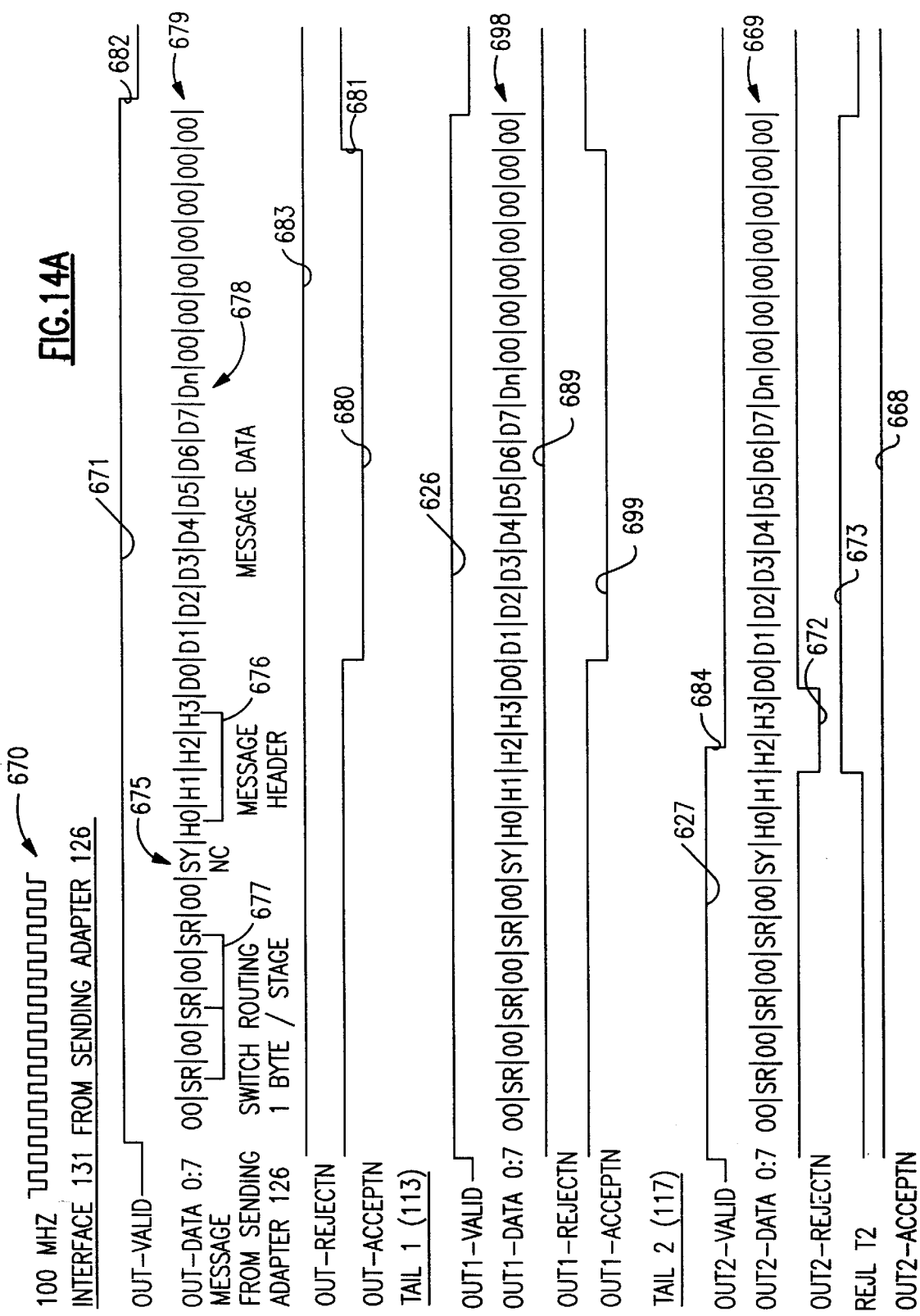
FIG. 14A is a timing diagram showing the timing for sending a message from the disclosed 2-tail network adapter for the non-blocking Allnode network operating in the normal case where one tail makes a valid connection.

Referring to FIGS. 13 and 14a, the functional implementation of 1:2 Fan-Out Logic 132 (FIG. 1) for Option 1 is shown. The Option 1 function being performed is sending any message received from sending adapter 126 over interface 131 to both tails 113, 117. Interface 131 comprises the eleven lines 101 shown in FIG. 1A, herein designated as OUT-VALID 671, OUT-DATA 0:7 679, OUT-REJECTN 683 and OUT-ACCEPTN 680. Likewise, interfaces 113 and 117 are also comprised of the eleven signals 101; interface 113 including OUT1-VALID 626, OUT1-DATA 0:7 698, OUT1-REJECTN 689, and OUT1-ACCEPTN 699; and interface 117 including OUT2-VALID 627, OUT2-DATA 0:7 669, OUT2-ACCEPTN 668 and OUT2-REJECTN 672. The basic flow across fan-out logic 132 is data enters from interface 131 and is redriven to interfaces 113 and 117 through two different sets of drivers, 922 and 924—a different set for each of the two tails. The eight data lines 698 and 669 at tails 113 and 117 respectively are directly redriven by drivers 922, 924, respectively, from interface 131 data lines 679 to tails 113, 117 without requiring any other gating. The three control signals (VALID 105, REJECTN 107, and ACCEPTN 109) require additional gating.

Actually, REJECTN 107 and ACCEPTN 109 are driven in the reverse direction and go from tails 113, 117 to interface 131. The OUTx-REJECTN signals 689 and 672 coming from each of the tails 113, 117, respectively, must be combined to drive the OUT-REJECTN signal 683 back to interface 131. OUT1-REJECTN signal 689 from Tail 1 113, when driven to an active 0, sets Set/Reset Latch 915 which is set by a 0 on the S input and causes the output of the latch 915 REJL T1 663 to go to a 1. REJL T1 latch 915 latches the occurrence of OUT1-REJECTN signal 689 and keeps it latched until the OUT-VALID signal 671 from interface 131 goes inactive at 682 (to 0) and resets the REJL T1 latch 915 causing the signal REJL T1 663 to return to 0. The REJL T2 latch 925 performs the exact same function for OUT2-REJECTN 672 coming from Tail 2 117. The timing involved is shown in FIG. 14*a* for Tail 2 117 activating the OUT2-REJECTN signal as shown by pulse 672. Pulse 672 going to zero causes REJL T2 latch 925 to set to a 1 as shown by signal 673. REJL T2 latch 925 then stays set until reset by OUT-VALID 671 going to a zero at 682.

The occurrence at NOR gate 919 of either REJL T1 663 or OUT1-REJECTN 689 through inverter 918 going to a 1 causes NOR gate 919 to go to 0. Otherwise NOR gate 919 is always a 1. Likewise, the occurrence at NOR gate 928 of either REJL T2 673 or OUT2-REJECTN 672 through inverter 927 going to a 1 causes NOR gate 928 to go to zero. The outputs from both NOR 919 and NOR 928 go to OR 920, which functionally combines both OUT1-REJECTN 689 and OUT2-REJECTN 672 to drive OUT-REJECTN 683 to interface 131. The function of OR 920 is to issue OUT-REJECTN (as 0) only when both inputs to OR 920 are 0's. This means that if both tails T1 113 and T2 117 reject the connection attempt from interface 131, OUT-REJECTN signal 683 will become active negative (0) to indicate to interface 131 that the message was rejected by both tails. In the normal case one of the two tails makes a connection and the other receives a rejection. It is impossible for both tails to connect through the network to the same destination, as the destination adapter will never permit two sources to be connected to the same destination.

The OUTx-ACCEPTN signals 699, 668 coming from each of the tails 113, 117 must be combined to drive the OUT-ACCEPTN signal 680 back to interface 131. OUT1-ACCEPTN 699 from Tail 1 113 goes to one input of OR 923, the other input to OR 923 comes from REJL T1 latch 915. The output of OR 923 goes to AND 921; similar logic using OR 929 generates the same function for tail 2 117 and goes to the other input of AND 921. AND 921 functionally combines the OUTx-ACCEPTN signals 699, 668 from both tails 113, 117 and drives OUT-ACCEPTN 680 to Interface 131. The function of AND 921 is to issue OUT-ACCEPTN (as 0) to Interface 131 from the tail 113 or 117 that is making the connection. The tail not making the connection will have it's REJL Tx latch 915, 925 set to 1, which will deactivate (drive to 1) the associated OR gate 923 or OR gate 929. For instance, tail 1 113 receiving an OUT1-REJECTN signal 689 will set latch REJL T1 915, drive OR gate 923 to a 1, and prime AND 921 to follow the value of the OUT2-ACCEPTN signal 668 from tail 2 117. In this case tail 2 117 is making the network connection.

The OUT1-VALID signal 626 to tail 1 113 is a gated redrive of the OUT-VALID signal 671 from interface 131 as gated by AND 917. The output of AND 917 and OUT1-VALID 626 always follows the OUT-VALID 671 signal directly, except if OUT1-REJECTN 689 has rejected the connection. In that case, REJL T1 latch 915 sets and drives INV 916 to 0, which causes AND 917 and OUT1-VALID 626 both to go to 0 even though OUT-VALID 671 is still a 1. AND 911 and INV 926 perform the identical function for OUT2-VALID 627 to tail 117.

A timing example is shown in FIG. 14A for the normal function provided by the 1:2 fan-out Logic 132 for Option 1 as shown in FIG. 13. In this example, Tail 1 113 successfully makes the connection, and Tail 2 117 receives a rejection. The connection is commanded by interface 131 from sending adapter 126, which activates the OUT-VALID signal 671 and sends a message over the OUT-DATA lines 679. The message is sent byte-wide to interface 131 and is comprised of SYNC byte 675 of all ones to start the message. SYNC byte 675 is followed immediately by the message header 676 and the message data 678. The message 675, 676, 678 is preceded by switch routing bytes 677 which form a network header. One switch routing byte 677 is required to route the data through each switch stage in the network. For instance, the three stage network of FIG. 3 requires three switch routing bytes 677. The switch routing bytes 677 are stripped by the switches in switch network 104, such that the receiving adapter only receives the message 675, 676, 678 and does not receive the switch routing bytes 677. When the message 675, 676, 678 starts to be received by receiving adapter 128, OUT-ACCEPT signal 680 is driven to 0. OUT-ACCEPT signal 680 stays at 0 until message 674, 676, 678 is received correctly in its entirety, then it is raised at 681 to indicate that the receiving adapter 128 has received the message without error. OUT-ACCEPT 680 rising at 681 causes OUT-VALID 671 to reset immediately at time 682. This completes the successful transfer of a message.

Logic 132 drives the same waveforms presented on OUT-VALID 671 and OUT-DATA 0:7 679 to both tails 113, 117 initially. However, at least one tail will always get rejected. In the example of FIG. 14*a*, tail 2 117 gets rejected as indicated by a negative pulse on OUT2-REJECTN 672. The rejection causes OUT2-VALID 627 to be reset at time 684 as caused by REJL T2 latch 925, INV 926, and AND 911 from FIG. 13. REJL T2 673 stays set and continues to hold OUT2-VALID 627 to 0 until OUT-VALID 671 goes to 0 at time 682. Note that OUT2-VALID 627 still stays at 0 after time 682 because now OUT-VALID 671 is a 0 into AND 911. In this example, tail 1 113 does not get a rejection and follows directly the signals driven from interface 131. OUT1-REJECTN 689 and OUT1-ACCEPTN 699 from tail 1 113 are selected to drive signals OUT-REJECTN 683 and OUT-ACCEPTN 680, respectively, to Interface 131. They are selected because REJL T1 latch 915 is not set and therefore does not degate OUT1-REJECTN 672 and OUT1-ACCEPTN 668 from driving OUT-REJECTN 683 and OUT-ACCEPTN 680, respectively. On the other hand, REJL T2 latch 925 is set and does degate OUT2-REJECTN 672 and OUT2-ACCEPTN 668 from driving OUT-REJECTN 683 and OUT-ACCEPTN 680, respectively.

Figure 14B:
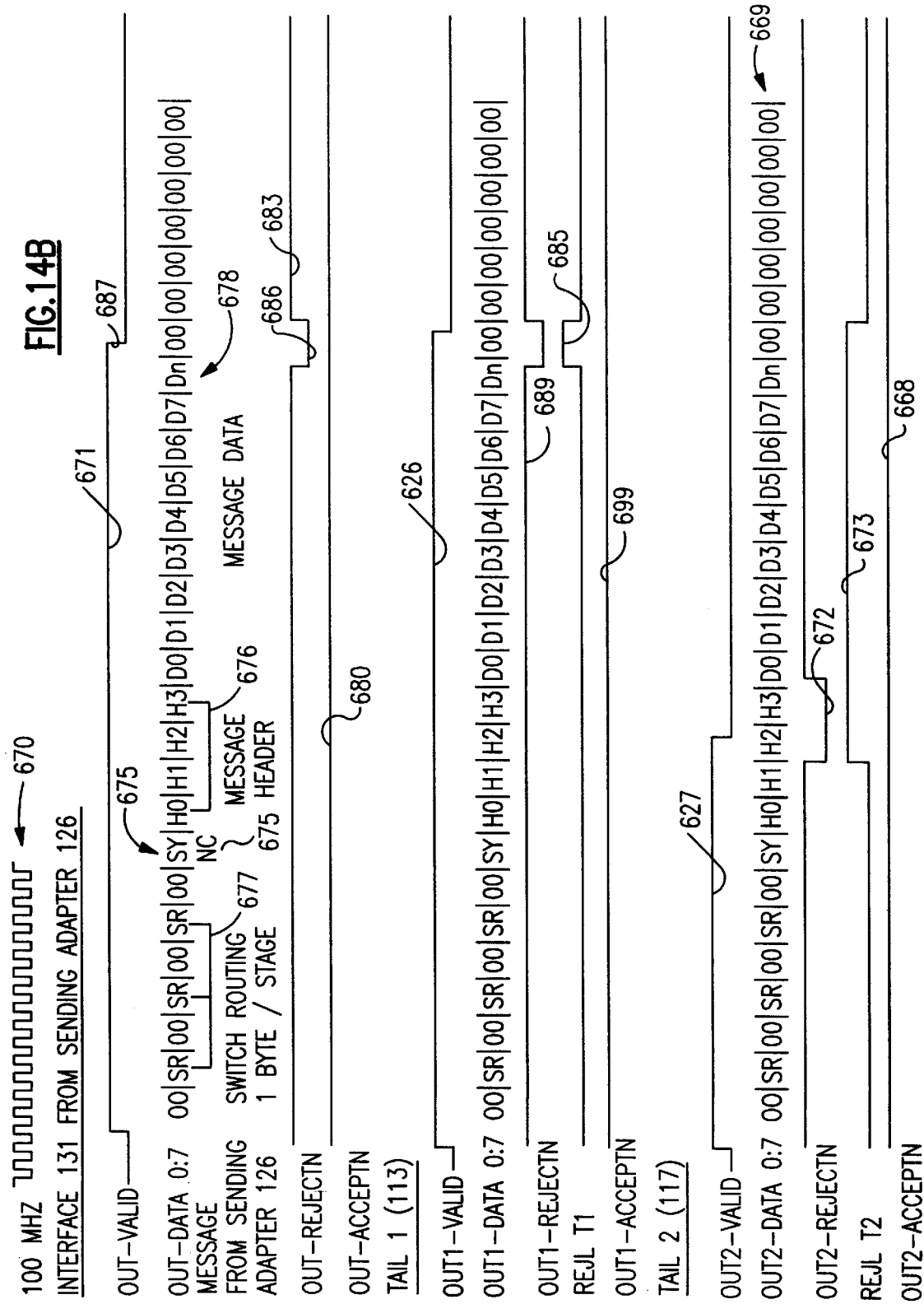
FIG. 14B is a timing diagram showing the timing for sending a message from the disclosed 2-tail network adapter for the non-blocking Allnode network for the case where neither tail makes a valid connection.
Figure 15A:
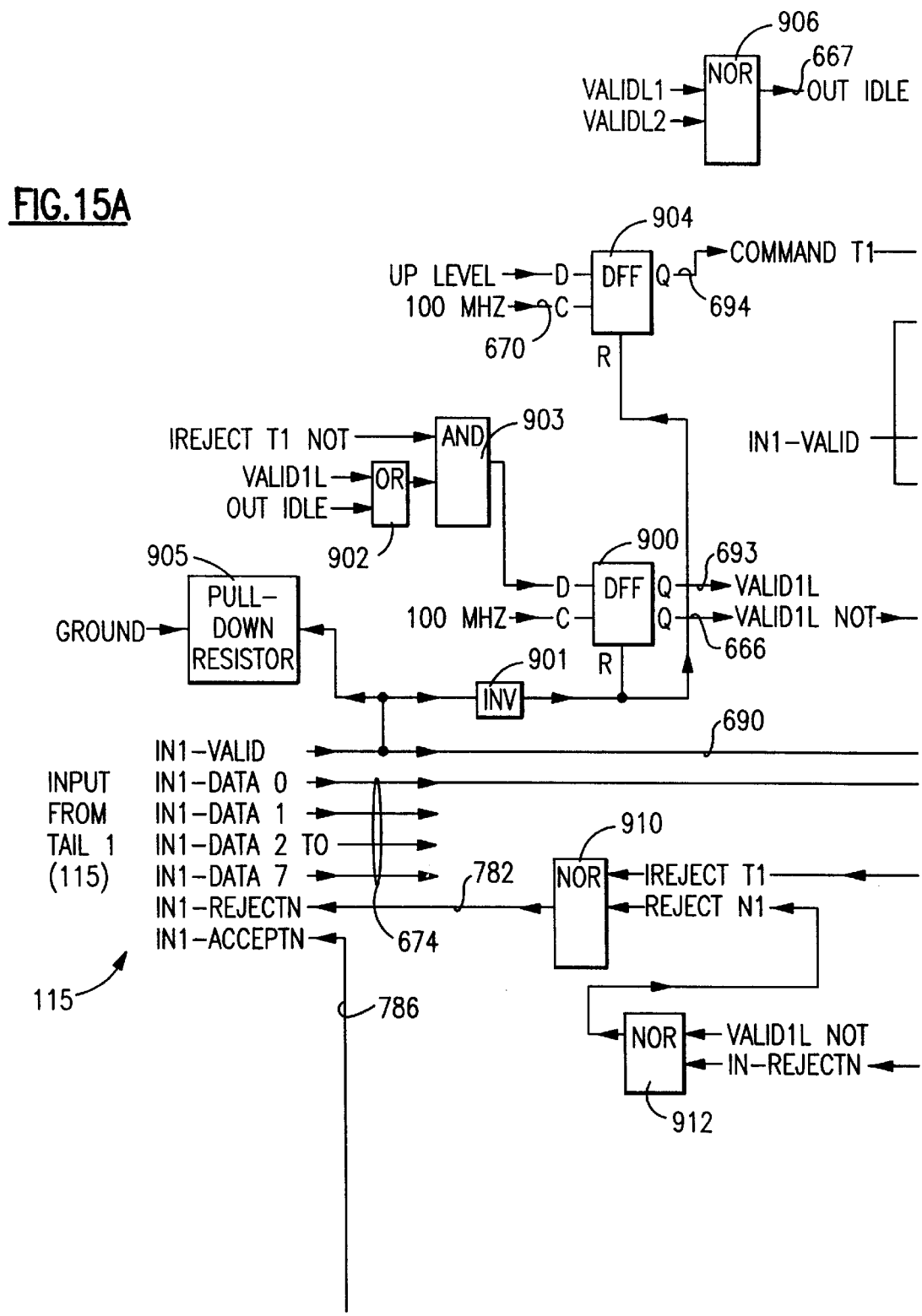
FIGS. 15A through 15D, oriented as shown in FIG. 15, are a logic diagram showing the fan-in to the single tail of the receiving adapter from the 2-tail network adapter of the invention for the non-blocking Allnode network.
Figure 15B:
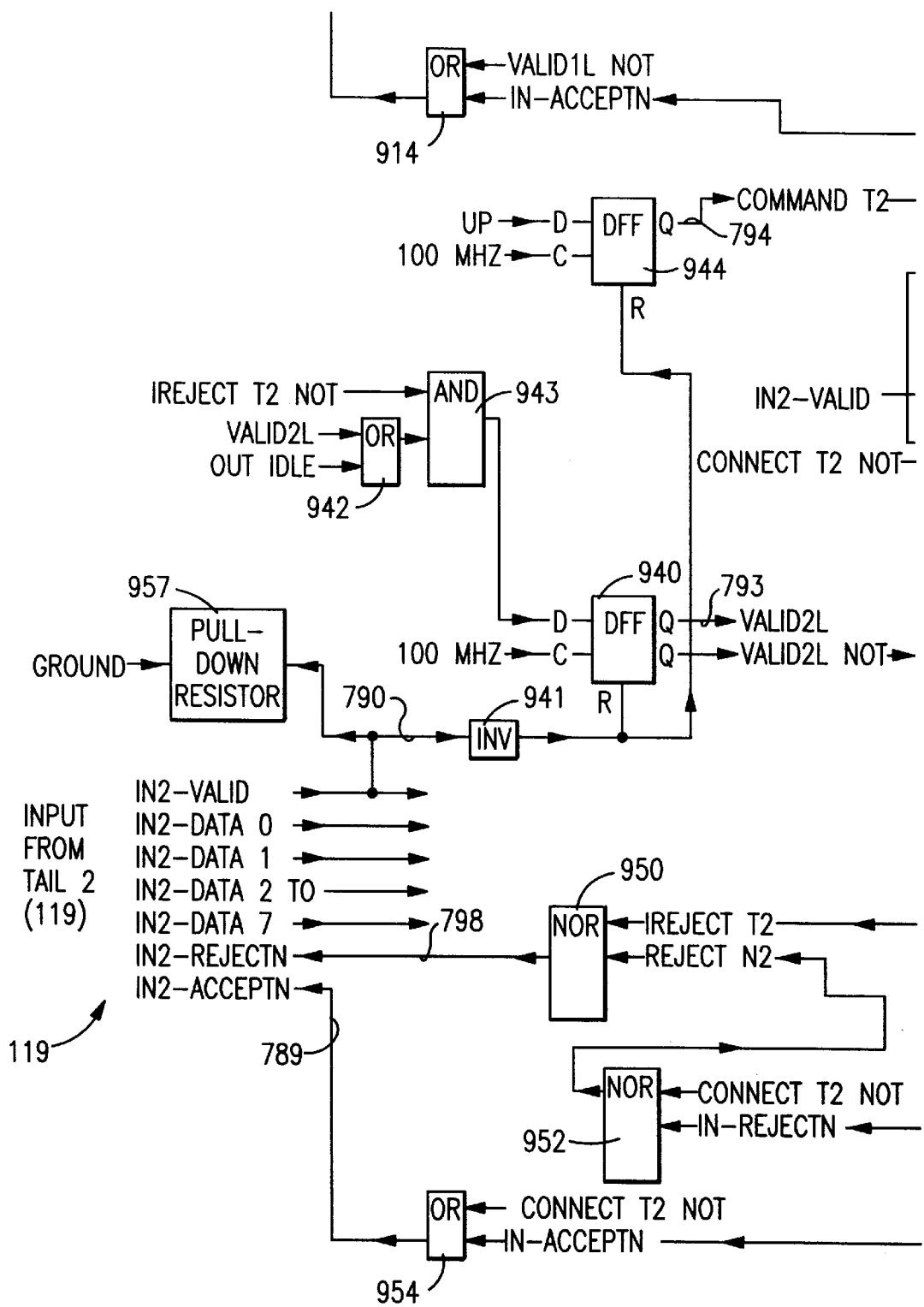
Figure 15C:
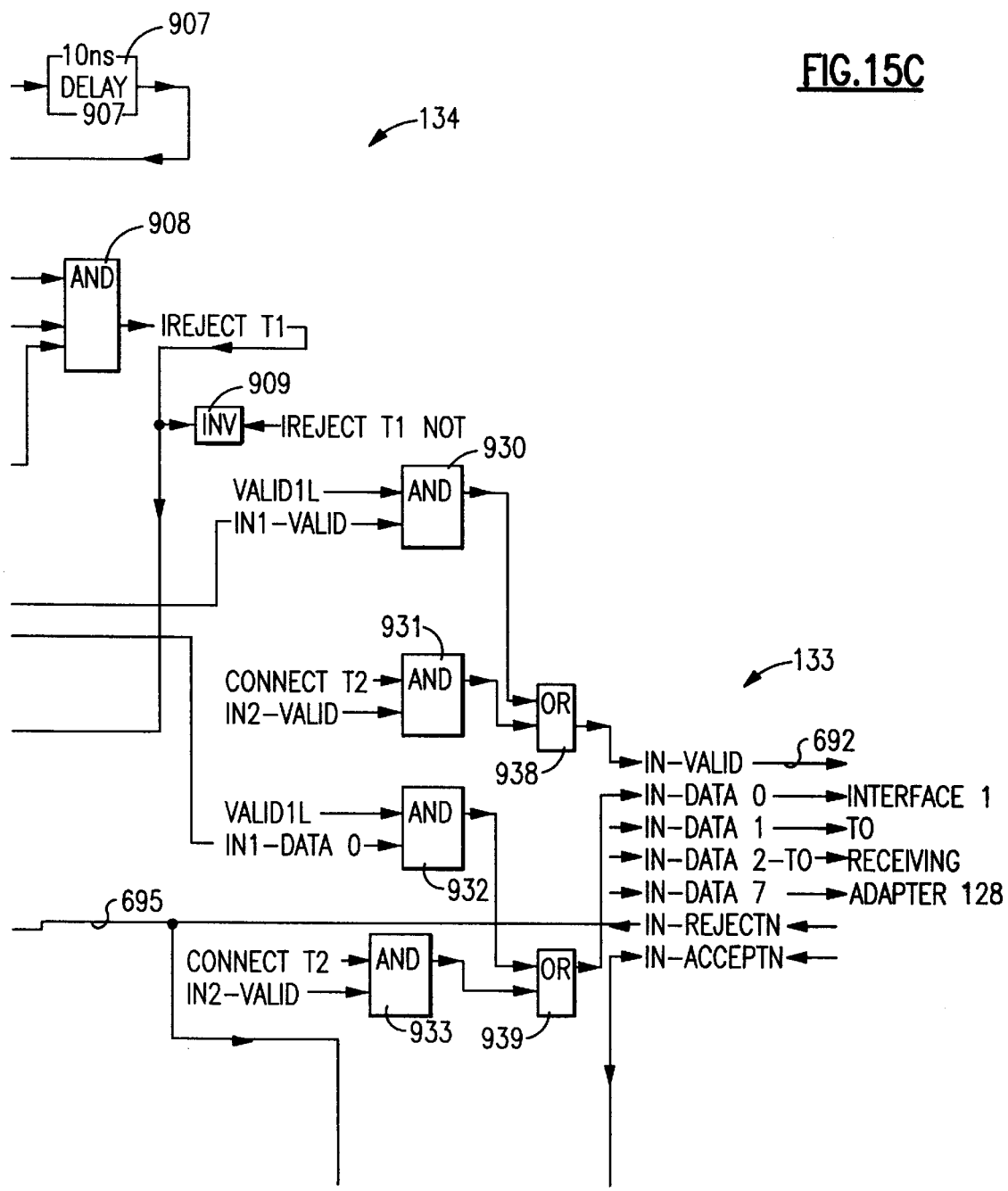
Figure 15D:
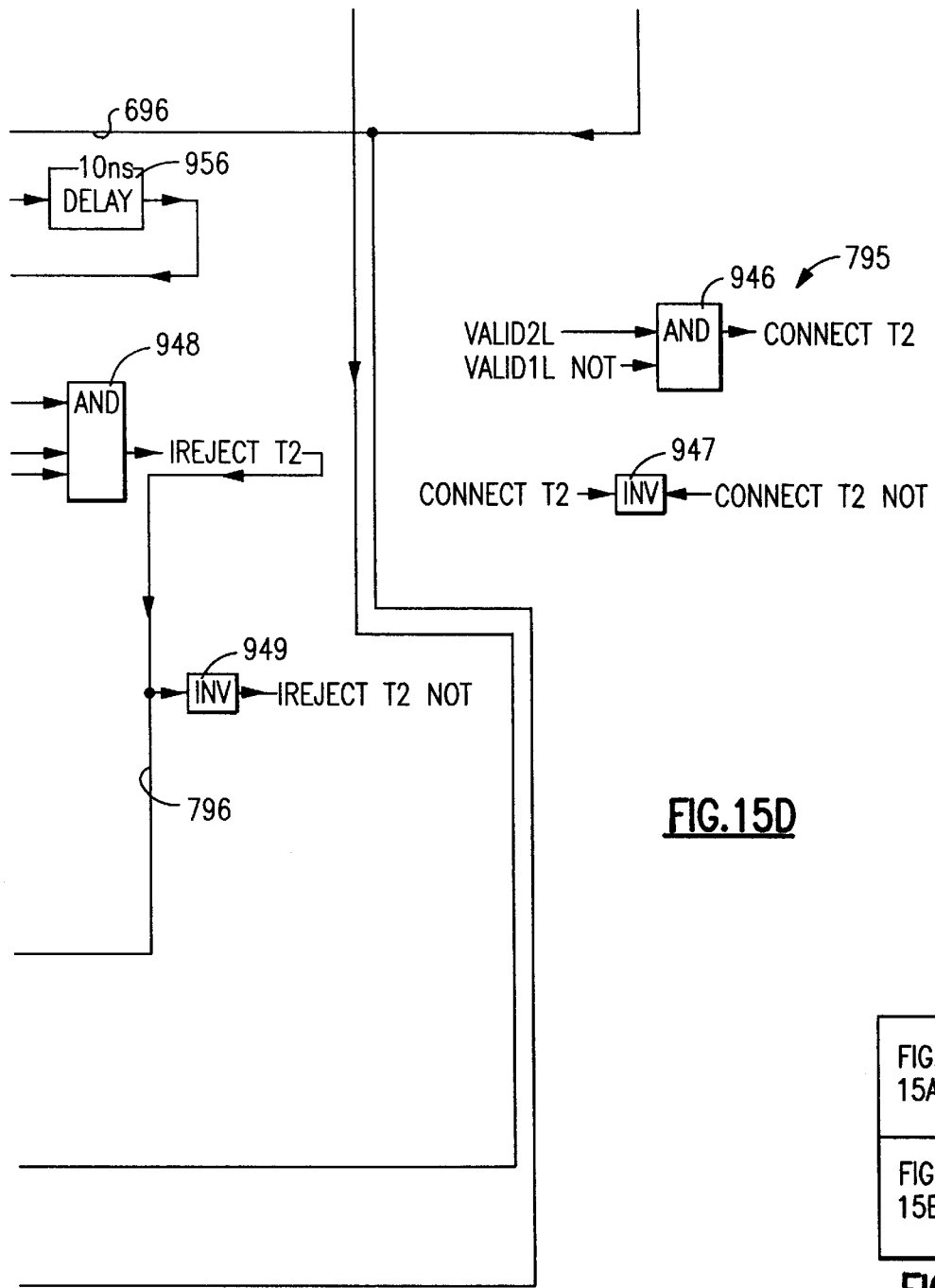

Referring to FIG. 14*b*, the second case of Option 1 is shown—the case where both tails 113, 117 issue rejections. In this case, both REJL T2 signal 673 and REJL T1 signal 685 are set because OUT2-REJECTN 672 and OUT1-REJECTN 689, respectively, were both driven to 0's by tails 117, 113 to indicate the rejection of the connection. In FIG. 13, this drives both NOR gates 928 and 919 to 0's into OR 920, which in turn causes pulse 686 to be issued on OUT-REJECTN 683 to Interface 131. OUT-REJECTN 683 going to 0 resets OUT-VALID 671 to 0 at time 687 and terminates the connection attempt. A retry will follow.

Option 1: Dual, Non-Blocking Parallel Sub-Networks for Receiving Messages

Referring further to FIGS. 13 and 14*a*, fan-out logic 132 sends messages represented by signals/lines 679 to two tails 113, 117 of network 104. Message 679 progresses across two sub-networks 108, 110 and is routed through each sub-network identically as controlled by the switch routing bytes 677 to the commanded network 108, 110 output ports 111, 113. Network 104 will either make the commanded connection or reject the connection attempt, if blockage is encountered in the network. If a successful connection is made, message 679 of FIG. 14a appears at the output port selected, minus one switch routing byte 677 which is used and destroyed by the network. Message 679 is sent from the network outputs over tails 115 and/or 119 to 2:1 fan-in Logic 134 at network adapter 106 of the network node 121 or 123 selected by the network (per switch routing bytes 677) to receive the message.

Referring to FIG. 15, the functional implementation of 2:1 fan-in logic 134 (FIG. 1) for Option 1 is shown. The Option 1 function being performed is that messages received from sub-networks 108, 110 can arrive simultaneously or one at a time over tails 115, 119. 2:1 fan-in logic 134 selects a message from one of the tails 115, 119 to be routed to interface 133 to receiving adapter 128, which will recover the message arriving at node 102. Interface 133 comprises the eleven lines 101 shown in FIG. 1A. Likewise, interfaces 115 and 119 also comprise the eleven signals 101. The basic flow across logic 134 is data enters from either or both interfaces 115, 119 and is routed to interface 133. If two messages arrive simultaneously, one is routed to interface 133 and the other is rejected.

FIG. 16a shows the case where messages arrive simultaneously on tails 115, 119. In this case, IN1-VALID 690 and IN2-VALID 790 rise at about the same time. FIG. 15 shows how fan-in logic 134 handles this case. When IN1-VALID 690 arrives at logic 134 it goes to INV 901, which is driven to a 0 when IN1-VALID goes to a 1. When IN1-VALID 690 was a zero (prior to starting the reception of the message from tail 115), it reset latches 900, 904. IN1-VALID 690 going to a 1 removes the reset and enables latches 900, 904. COMMAND T1 latch 904 is a dual flip-flop (DFF) circuit which sets its output 694 equal to the D input on the rise of the clock (C) input 670, when enabled. Latch 904 is clocked by a continuous clock signal, 100 MHZ 670 and always has its D input enabled because it is attached to a constant up level (logical 1). On the rise of the first 100 MHZ clock 670 after DFF 904 is enabled by IN1-VALID 690 going to a 1, COMMAND T1 latch 904 is set as shown by signal 694 in FIG. 16a. If fan-in logic 134 is idle when IN1-VALID 690 arrives, VALID1L (IN1-VALID 690 latched) latch 900 is set at the exact same time as latch 904 as shown by signal 693. VALID1L latch 900 will set if neither VALID1L latch 900 or VALID2L latch 940 was previously set as detected by NOR gate 906 which generates the OUT IDLE signal 667 going to gate 902. When OUT-IDLE 667 is a 1, it causes the output of gate 902 to go to a 1 to AND gate 903, which supplies the 1 to the D input of latch 900 so that it sets after IN1-VALID 690 rises. VALID1L 900 going to a 1 causes NOR gate 906 to drive OUT IDLE 667 to 0, removing the 1 from OR gate 902. However, by this time the other input to OR gate 902 (VALID1L 693) is a 1 and holds VALID1L latch 900 to a 1, even though OUT IDLE 667 has gone to 0. If VALID2L latch 940 precedes IN1-VALID 690, VALID1L 900 will not set because OUT IDLE 667 will be a 0 as driven by VALID2L 793 into NOR 906.

2:1 fan-in logic 134 implements a similar function for tail 119. When IN2-VALID 790 arrives it goes to INV 941, which is driven to a 0 when IN2-VALID 790 goes to a 1. When IN2-VALID 790 was a 0 (prior to starting the reception of the message 674 from tail 119), it reset latches 940,944. IN2-VALID 790 going to a 1 removes the reset and enables latches 940, 944. Command T2 latch 944 is clocked by a 100 MHZ clock 670 and always has its D input enabled because it is attached to a constant up level. On the rise of the first 100 MHZ clock 670 after the DFF latch 944 is enabled by IN2-VALID 790 going to a 1, COMMAND T2 latch 944 is set as shown by signal 794. If fan-in logic 134 is idle when IN2-VALID 790 arrives, VALID2L 793 (IN2-VALID latched) latch 940 is set at the exact same time as latch 944 as shown by the pulse in FIG. 16a on signal 793. VALID2L 940 will set if neither VALID1L 900 or VALID2L 940 was previously set as detected by NOR gate 906 which generates the OUT IDLE signal 667 that goes to 0 whenever latch 900 and/or latch 904 are 1. OUT IDLE signal 667 going to 1 goes to OR gate 942 and causes the output of gate 942 and AND gate 943 to go to 1's. AND gate 943 supplies the 1 to the D input of latch 940 so that it sets after IN2-VALID 790 rises. VALID2L 940 going to a 1 causes NOR gate 906 to drive OUT IDLE 667 to 0, removing the 1 from OR gate 942. However, by this time the other input to OR gate 942 (VALID2L 793) is a 1 and holds VALID2L to a 1, even though OUT IDLE 667 has gone to 0. If VALID1L 693 precedes IN2-VALID 790, VALID2L 940 will not set because OUT IDLE 667 will be a 0 as driven by VALID1L 693 into NOR gate 906.

The selection of which tail 115, 119 is connected to interface 133 is based on the state of the two latches—VALID1L 900 and VALID2L 940. If neither latch 900, 940 is set, no connection is made to interface 133. If either of the latches 900, 940 is set, the one latch that is set selects the connection to be made. If both latches 900, 940 are set, a priority scheme is required to determine which of the two will be selected to make the connection. Any priority scheme for selecting one of two candidates could be used. The preferred embodiment uses a simple priority scheme as follows: tail 115 is connected, tail 119 is rejected. The priority is implemented via a single AND gate 946, which prevents tail 119 from connecting when CONNECT T2 784=0, if VALID2L 793 is a 0 or VALID1L NOT 666 is a 0. Thus, CONNECT T2 784 is only active when VALID2L=1 and VALID1L=0 (VALID1L NOT=1). The priority decision is shown in FIG. 16a, where VALID1L 693 and VALID2L 793 are set simultaneously. The priority logic causes CONNECT T2 signal 795 to glitch to 1 briefly but immediately returns CONNECT T2 to 0, and prevents tail 2 119 from making a connection to interface 133. The logic that connects tail 115 or 119 to interface 133 is shown for IN-VALID 692 by AND gates 930, 931, and OR gate 938. AND gate 930 is used to connect IN1-VALID 690 from tail 115 to interface 133; it is connected when VALID1L 693=1. Likewise, AND gate 931 is used to connect IN2-VALID 790 from tail 119 to interface 133; it is connected when CONNECT T2 946=1. OR gate 938 combines the connections enabled by gates 930 and 931 into a single line IN-VALID 692 to interface 133. A typical data bit connection which connects either tail 115, 119 to IN-DATA 0 is shown using gates 932, 933, and 939. The other seven data lines each have identical gating comprised of two AND's and one OR. AND gate 932 is used to connect IN1-DATA 0 from tail 115 to interface 133; it is connected when VALID1L 693 from latch 900=1. Likewise, AND gate 933 is used to connect IN2-DATA 0 from tail 119 to interface 133; it is connected when CONNECT T2 946 latch output signal 795=1. OR gate 939 combines the connections enabled by gates 932 and 933 into a single line (IN-DATA 0)to interface 133.

If OUT IDLE 667 is 0 (indicating one tail is connected to interface 133) and the non-connected tail 115 or 119 tries to make a connection to interface 133, the connection attempt is rejected by fan-in logic 134. For tail 115 the rejection logic is implemented by AND gate 908. When tail 115 raises IN1-VALID 690, it attempts to set latches 900 and 904. The combination of COMMAND T1 latch 904 output 694 setting through delay block 907 and VALID1L latch 900 not setting, in conjunction with IN1-VALID 690 being a 1 is used by AND gate 908 to detect the rejection condition. IREJECT T1 781=1, the output from gate 908, goes to NOR gate 910 where it is ORed and inverted to drive IN1-REJECTN 782 as the negative active rejection signal to tail 115. A rejection can also be driven to tail 115 from interface 133, when tail 115 is connected to interface 133. In this case, a negative input from IN-REJECTN 695 of interface 133 is driven to NOR gate 912; if tail 115 is connected to interface 133 as indicated by VALID1L 693 being 1, then VALID1L NOT 666 to NOR gate 912 is a 0 and the output of gate 912 goes to 1 driving NOR gate 910 to 0. Thus, the rejection from interface 133 is passed to IN1-REJECTN 782 of tail 115. Note that if tail 115 is not connected to interface 133, the rejection will not be passed to tail 115 because VALID1L NOT 666=1 and holds NOR gate 912 at 0.

The rejection logic for tail 2 119 is similar and implemented by AND gate 948. When tail 119 raises IN2-VALID 790, it attempts to set latches 940 and 944. The combination of COMMAND T2 latch 944 setting through delay block 956 and CONNECT T2 NOT 947 being 1, in conjunction with IN2-VALID 790 being a 1 is used by AND gate 948 to detect the rejection condition. CONNECT T2 NOT 947 is a 1 when CONNECT T2 946 is a 0, which is cause by either VALID2L 793 being 0 or VALID1L 693 being 1 as detected by gate 946. IREJECT T2 796=1, the output from gate 948, goes to NOR gate 950 where it is ORed and inverted to drive IN1-REJECTN 782 negative to produce the negative active rejection signal to tail 115. A rejection can also be driven to tail 119 from interface 133, when tail 115 is connected to interface 133. In this case, a negative input from IN-REJECTN 695 of interface 133 is driven to NOR gate 952; if tail 119 is connected to interface 133 as indicated by CONNECT T2 795 being 1, then CONNECT T2 NOT 947 to NOR gate 952 is a 0 and the output of gate 952 goes to 1 driving NOR gate 950 output 798 to 0. Thus, the rejection from interface 133 is passed to IN2-REJECTN 798 of tail 119. Note that if tail 119 is not connected to interface 133, the rejection will not be passed to tail 119 because CONNECT T2 NOT 947=1 and holds NOR gate 952 at 0.

2:1 fan-in logic 134 cannot generate an ACCEPTN 786 or 789 to signal to either tail 115, 119, but it passes the IN-ACCEPTN 696 signal from interface 133 to the connected tail, either 115 or 119. OR gate 914 is used to connect IN-ACCEPTN 696 from interface 133 to IN1-ACCEPTN 786 of tail 115. The connection is controlled by the VALID1L NOT signal 666 to OR gate 914 which only permits the connection when VALID1L signal 693 is a 1 (VALID1L NOT 666 is a 0), which indicates that a connection exists between interface 133 and tail 115. Likewise, OR gate 954 is used to connect IN-ACCEPTN 696 from interface 133 to IN2-ACCEPTN 789 of tail 119. The connection is controlled by the CONNECT T2 NOT signal 947 to OR gate 954, which only permits the connection when CONNECT T2 795 is a 1 (CONNECT T2 NOT inverter 947 output signal is a 0), which indicates that a connection exists between interface 133 and tail 119.

A timing example is shown in FIG. 16A of how a connection is made by the 2:1 fan-in logic 134 for Option 1 as shown in FIG. 15. In this example, tail 1 115 and tail 2 119 both try to make connections simultaneously. Due to the preferred embodiment priority logic gate 946 tail 1 115 makes the connection and tail 2 119 is rejected by gate 948. The connection is commanded by both tails 115, 119 simultaneously as indicated by IN1-VALID 690 and IN2-VALID 790 rising at the same time. When IN1-VALID 690 and IN2-VALID 790 rise together, OUT IDLE 906 equals 1 and four latches are set simultaneously—VALID1L 693, VALID2L 793, COMMAND T1 signal 694, and COMMAND T2 signal 795. However, VALID1L 693 being set causes CONNECT T2 795 to go back to 0 as controlled by gate 946. CONNECT T2 signal 795 only glitches to a 1 and then returns to 0. The combination of COMMAND T2 signal 794, IN2-VALID 793, and CONNECT T2 NOT 947 causes AND gate 948 to raise IREJECT T2 signal 796 and cause IN2-REJECTN 798 to be returned to tail 2 119. Tail 2 119 seeing IN2-REJECTN 798 going active (negative), resets IN2-VALID 790 at time 799 which cancels the connection request from tail 2 119. When IREJECT T2 798 goes to 1, it is inverted through INV 949 and causes AND gate 943 to go to 0, which in turn resets VALID2L 793 latch 940 to 0 at the rise of the next 100 MHZ clock signal to latch 940.

In the example of FIG. 16a, tail 1 115 is successful in connecting to interface 133. The connection is made because VALID1L 693=1 and activates gates 930, 932, and similar gates (not shown) for the other seven data lines. Thus, the message sent on tail 1 115 appears directly on interface 133 and is sent to receiving adapter 128. VALID1L NOT 666 going to 0 causes IN-ACCEPTN 696 from interface 133 to be connected to IN1-ACCEPTN 786 of tail 1 115 through OR gate 914. Thus, the acceptance signal 696 generated by receiving adapter 128 is sent to interface 133 and connected to IN1-ACCEPTN 786 of tail 1 115. Likewise, IN-REJECTN 695 is connected to IN1-REJECTN of tail 1 115 through NOR gates 912 and 910. Thus, the rejection signal 695 generated by receiving adapter 128 is sent to interface 133 and reflected to IN1-REJECTN 782 of tail 1 115. In this example, the message is not rejected so there is no pulse on the IN-REJECTN signal 695. However, if a rejection was issued, any rejection appearing on IN-REJECTN 695 would be mirrored on IN1-REJECTN signal 782 of tail 1 115.

Figure 16B:
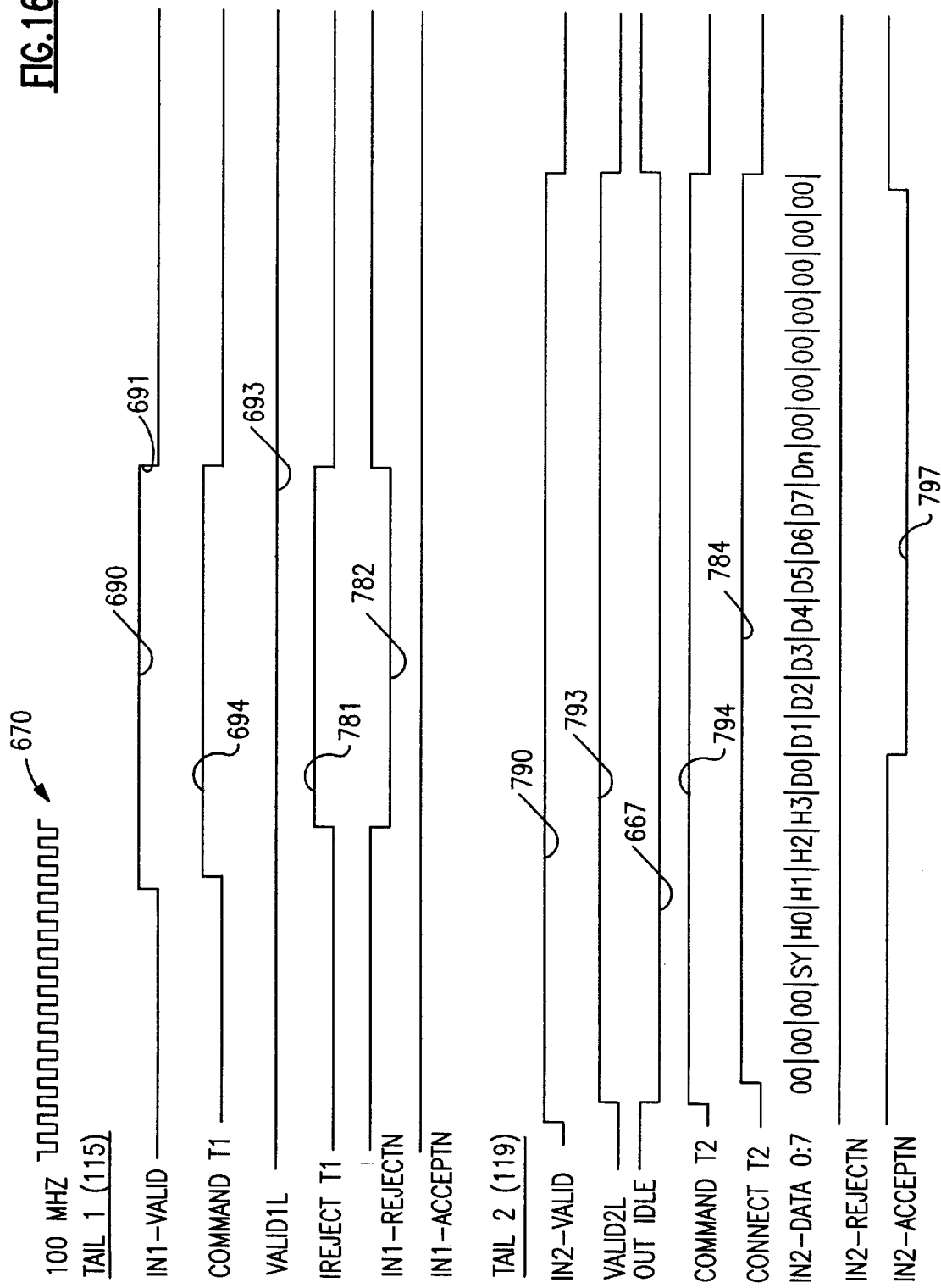
FIGS. 16B(a) and 16B(b), oriented as shown in FIG. 16B, are a timing diagram showing the timing for receiving a message from the 2-tail network adapter of the invention for the non-blocking Allnode network for the case where the message arriving on one tail is delayed with respect to a message arriving on the other tail.

Referring to FIG. 16b, a second timing example without contention is shown for the 2:1 fan-in logic 134 for Option 1 as shown in FIG. 15. In the second example, tail 2 119 attempts to make a connection to interface 133 first and is successful. Then tail 1 115 attempts to make a connection while tail 2 119 is connected and is rejected by logic 134. The IN2-VALID 790 signal rises first; it sets command T2 794 and VALID2L 793 simultaneously on the rise of the first 100 MHZ clock signal 670 after the rise of IN2-VALID 790. Since VALID1L 690 is not active, CONNECT T2 784 also sets simultaneously and causes a connection to be made between Tail 119 and interface 133. OUT-IDLE signal 667 is driven negative at this time because the output to interface 133 is now busy (no longer idle). The connection causes IN-VALID 692 to follow directly IN2-VALID 790, and IN-DATA 0:7 at tail 133 to follow directly IN2-DATA 0:7 at tail 119. In addition, the reverse connection is made such that IN2-REJECTN 798 and IN2-ACCEPTN 789, respectively, follow IN-REJECTN 695 and IN-ACCEPTN 696. While the message is being transferred from tail 119 to interface 133, tail 115 attempts to make a connection by raising IN1-VALID 690. However, because a previous connection exists, OUT-IDLE 667 is 0 and blocks VALID1L 693 from setting, but COMMAND T1 694 is not blocked and sets. The combination of IN1-VALID 690 being set, COMMAND T1 694 being set, and VALID1L 693 not being set drives IREJECT T1 781 to 1 and IN-REJECTN 782 to 0. This rejects the connection attempt from tail 115, which aborts the attempt after sensing IN1-REJECTN 782 going to 0 by driving IN1-VALID 690 to 0 at time 691. This frees the logic 134 associated with tail 115 to await the next connection attempt. Tail 2 119 completes its message to interface 133 undisturbed by the attempt from Tail 1 115.

Option 2: Dual Redundant Networks

Option 2 is very similar to Option 1 and works the same way as Option 1 when both sub-networks 108, 110 are operational (physically present, powered on, and not failed). The difference in function provided by the dual redundant case is that if one of the sub-networks 108 or 110 fails or is powered off or removed, the other operational sub-network 110 or 108 will continue to function and provide continuous availability of the network 104. The failed sub-network 108 or 110 can be powered-down, removed, repaired or replaced, and then powered on and the network 104 will never glitch or stop. Network 104 will provide continuous service; however, the network will function as non-blocking when both sub-networks 108, 110 are functional but revert to being a blocking network when one of the sub-networks 108, 110 is failed or powered off or removed.

The logic used for fan-out and fan-in functions 132 and 134, respectively, for Option 1 as shown in FIGS. 13 and 15, respectively, also apply to Option 2. Referring to FIG. 13, two resistors 945 and 955 for tail 1 113, and two resistors 951 and 953 for tail 2 117 are used to enable the sending portion of the dual redundant function. Resistors 945 and 951 are pull-up resistors on the OUTx-ACCEPTN signals 699, 668, which pull the respective signals to a 1 level if the corresponding sub-network 108, 110 is removed or powered off. Resistors 955 and 953 are pull-down resistors on the OUTX-REJECTN signals 689, 672, which pull the respective signals to a 0 level if the corresponding sub-network 108, 110 is removed or powered off. The pulling-up of the OUTx-ACCEPTN signals 699, 668 and pulling-down of the OUTx-REJECTN signals 689, 672 enable any powered off or removed sub-network 108 or 110 to appear as it is rejecting any attempt to send a message over inoperative sub-network. The fan-out logic 132 of FIG. 13 will still attempt to send messages to both tails 113, 117 and the two cases shown in FIGS. 14a and 14b still apply, where the message will be accepted by one of the two paths and rejected by the other path (FIG. 14a) or the message will be rejected by both paths (FIG. 14b). This is possible because the message to the powered off or removed tail will always appear as if it is rejected, but the message will be sent over the other tail unless that tail is blocked and the message is rejected there also. If rejected from both tails, the sending adapter 126 will continuously retry the message until the functional tail is no longer blocked and accepts the message.

The receiving portion of the dual redundant function is enabled by resistor 905 for tail 1 115 and by resister 957 for tail 2 119. Resistors 905 and 957 are pull-down resistors on the INx-VALID signals 690 and 790, which pull the respective signals to a 0 level if the corresponding sub-network 108, 110 is removed or powered off. The pulling-down of the INx-VALID signals 690, 790 enable any powered off or removed sub-network 108 or 110 to appear as if it is not receiving any valid messages from a removed or powered down tail 115 or 119. Any functional tail will present a message as usual (as shown in FIG. 16b). The 2:1 fan-in logic 134 will see a message arriving on the functional tail and no message arriving on the other tail. In this case as shown in FIG. 16b, logic 134 will select the tail with the active INx-VALID signal 690 or 790 and pass that message to interface 133 and receiving adapter 128. The pull-up and down resistors are designed such that if the tail they are connected to is present and powered, the resistors will be transparent and not perform any function. It is only when the sub-network 108, 110 is powered down or removed that the resistors perform their function of pulling the signal to the default state.

If a sub-network 108 or 110 is failed but still present and powered-on, the dual redundant network still attempts to send a message over both the good and the failed paths. The failed path will not be successful, but the good path will and the failure will be bypassed. If the good path gets rejected, the sending adapter 126 will continuously retry the message until the good tail is no longer blocked and accepts the message.

Option 2 also applies to FIG. 12a, where two nodes 610, 612 communicate with each other over two redundant tails 611, 615 and 613, 614. When neither tail has failed, the message is routed to both tails simultaneously. One tail will make connection and the other tail is rejected just as if the message was being transferred over network 104. If either tail 611, 615 or 613, 614 is failed, fan-out logic 132 still attempts to send a message over both the good and the failed tails. The failed tail will not be successful, but the good tail will and the failure will be bypassed. If the good tail gets rejected, the sending adapter 126 will continuously retry the message until the good tail is no longer blocked and accepts the message.

Option 3: Direct Connections from Node to Node

The various options of this invention are performed by identical node 102 and network adapter 106 functions with one exception—only the fan-out 132 and fan-in 134 logics change slightly to provide the various options.

Option 3 does not use a central network 104, but instead the nodes 102 connect directly with each other using adapter tails 112, 114 (FIG. 1). FIG. 12b shows how three nodes having two tails each form direct connections with each other. The operation from each node is identical, as an example consider Node 1. Node 1 has two full-duplex tails 628, 629 and 624, 625, where each tail 628, 629, 624, and 625 comprises the eleven signals 101 shown in FIG. 1a. Each full-duplex tail has two sets of eleven lines 101 going in opposite directions. Tail 628 sends messages from Node 1 to Node 2 and tail 629 sends messages from Node 2 to Node 1. Likewise, tail 624 sends messages from Node 1 to Node 3 and tail 625 sends messages from Node 3 to Node 1. In Option 1 using network 104, each tail 113, 117 provides alternate routes to the same destination. Option 3 is different because each tail 628 and 624 has a different destination; i.e., tail 628 goes to Node 2 and tail 624 goes to Node 3. For Option 3, adapter 106 normally does not want to send messages to both tails 628, 624 simultaneously (unless it is broadcasting the message). 2:1 fan-out logic 132 must assure that some Node 3 does not get a message that is destined for some other Node 2, and vice versa. Therefore, 1:2 fan-out logic 132 for Option 3 cannot be as simple as for Option 1, where every message was sent identically to both tails. Instead, fan-out logic 132 for Option 3 must contain routing logic to determine whether the message is to be sent to tail 1 only, tail 2 only, or to both tails for broadcasting.

Figure 17A:
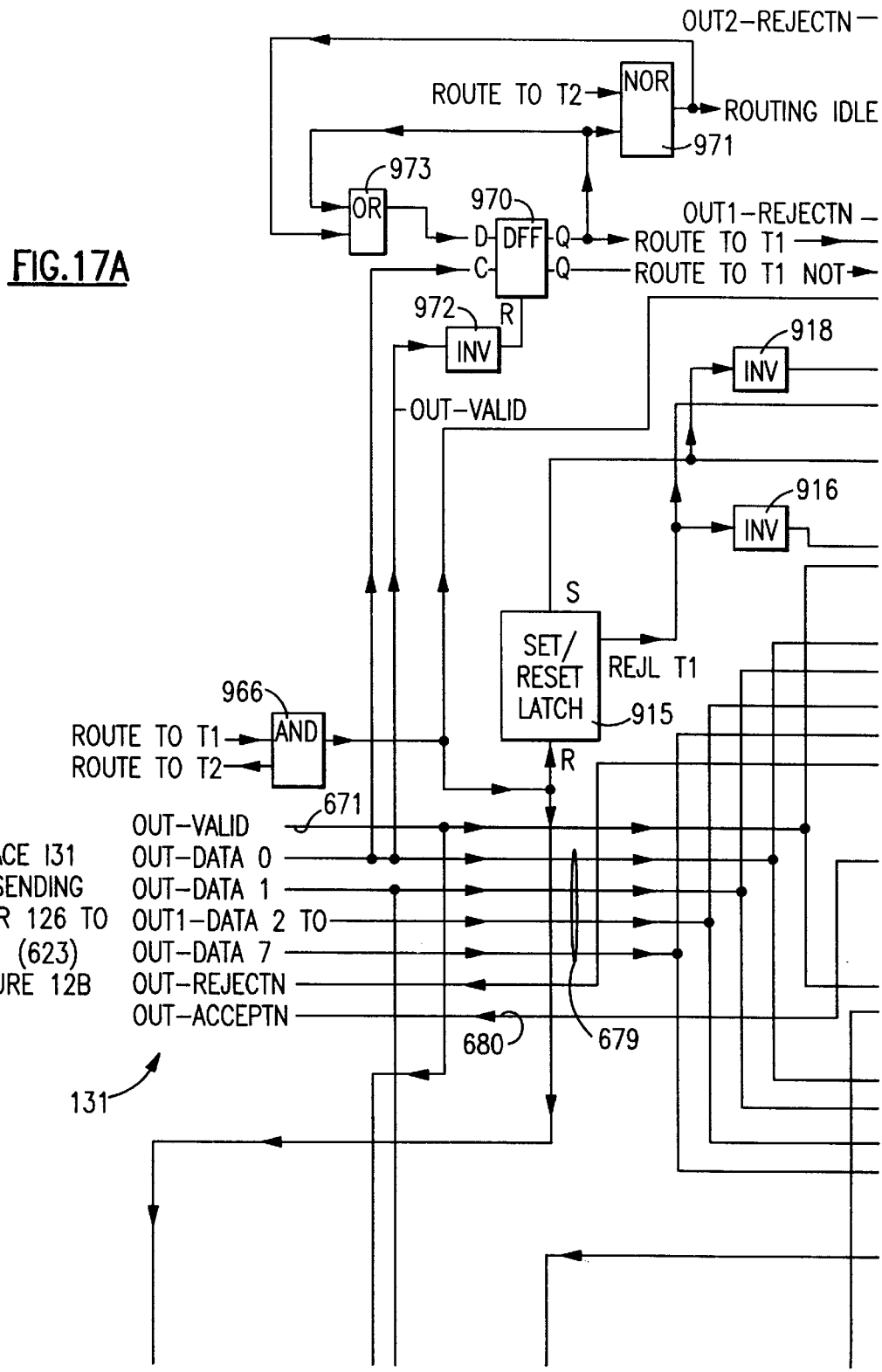
FIG. 17A through 17D, oriented as shown in FIG. 17, are a logic diagram showing the fan-out of the single tail from the sending adapter to provide the 2-tail network adapter of the invention for making direct connections amongst three nodes.
Figures 17, 17B:
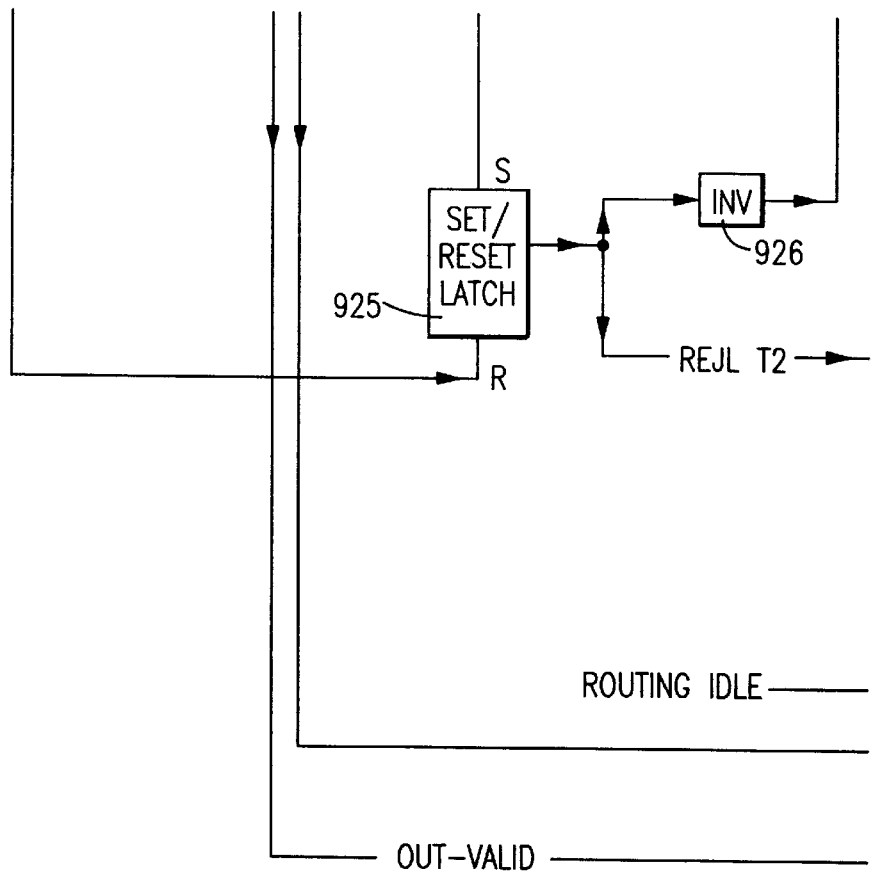
Figure 17C:
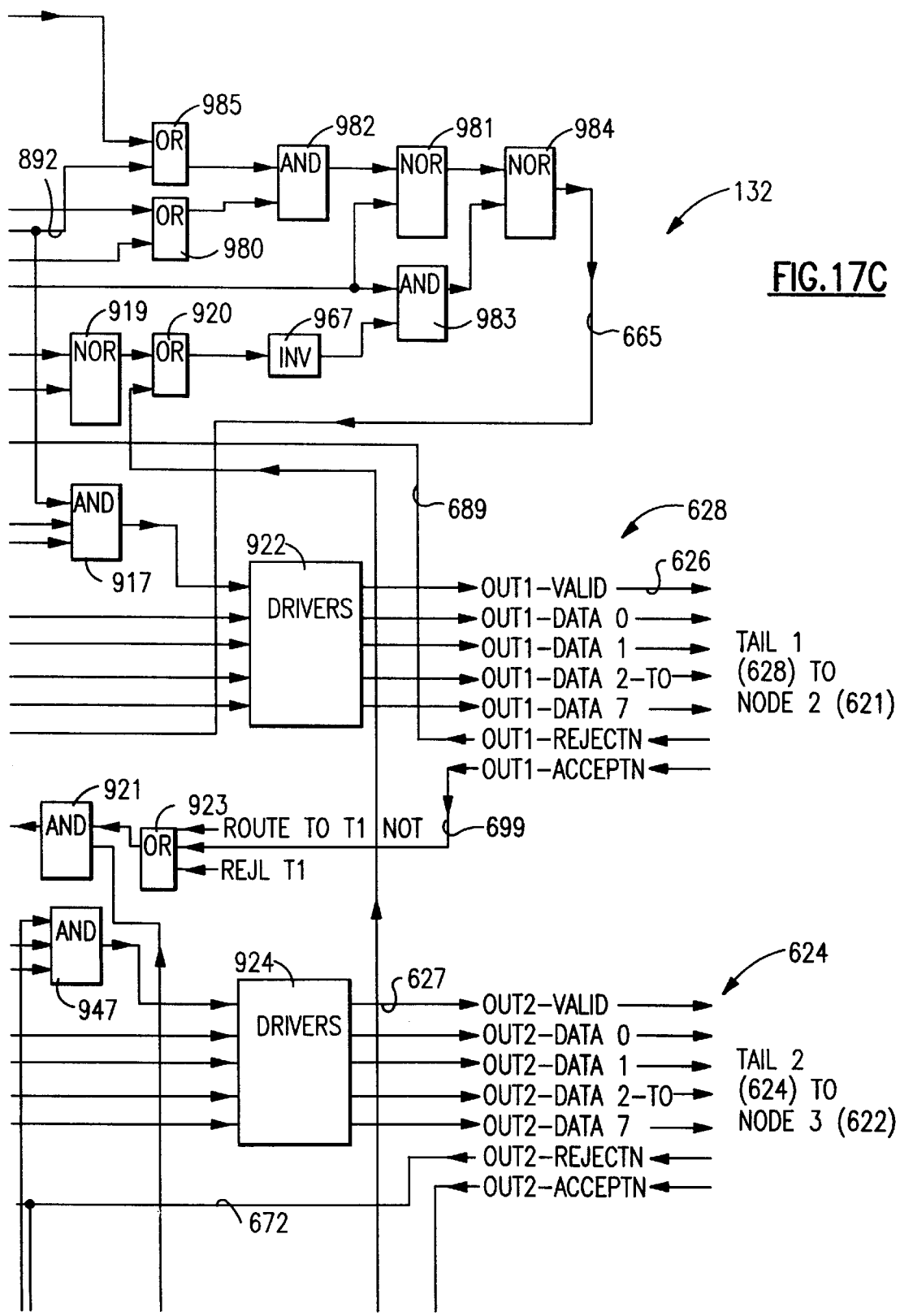
Figure 17D:
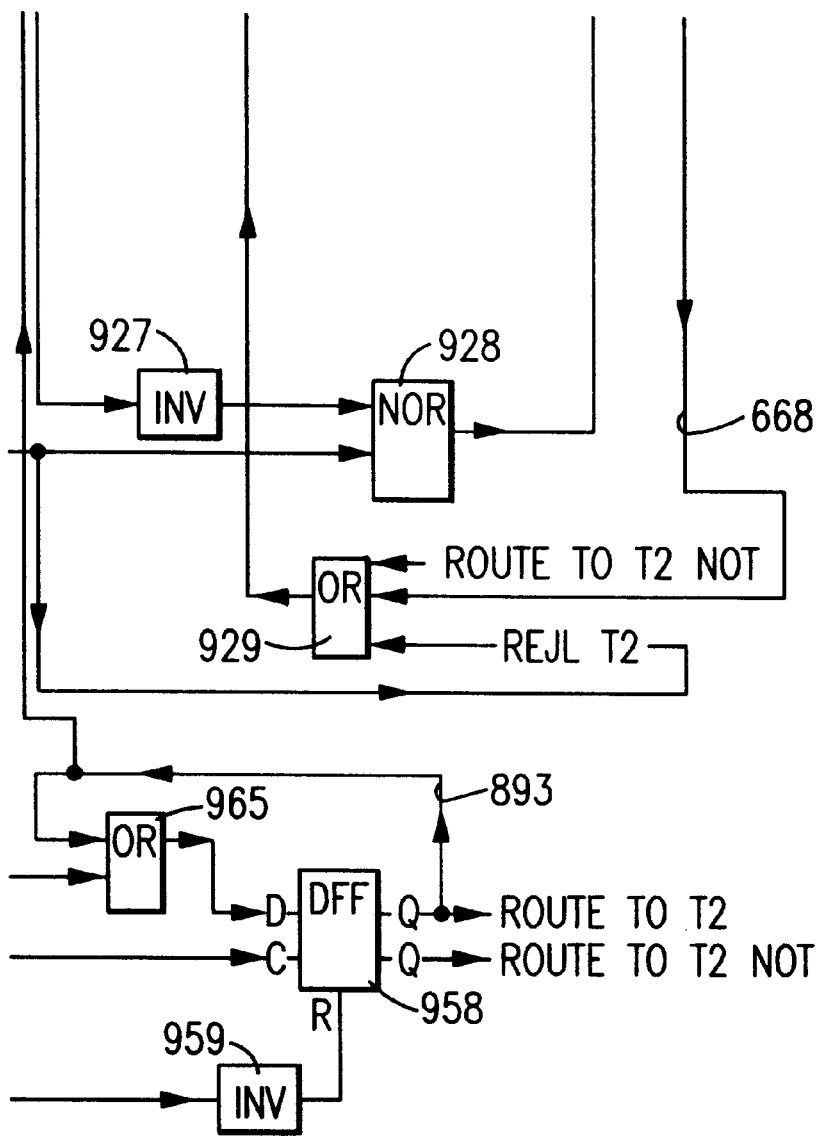

Referring to FIG. 17, the 1:2 fan-out logic 132 is shown for Option 3. FIG. 17 is basically the same as FIG. 13, except two latches 970 and 958 (one for each tail) are added to implement the routing function. FIG. 18a is a timing diagram showing a normal message transfer plus the additional sequences required to perform routing. The message transfer starts in the same way as for Option 1 with OUT-VALID 671 going active. The new routing function takes place first in the message sequence and is performed by the addition of routing byte 890 to the message sequence 675, 676, 678. Routing byte 890 contains information on which the routing decision is based. Routing byte 890 is data that appears on the OUT-DATA 0:7 lines 679 of interface 131. The routing byte 890 is all zeroes except for two bits of routing information carried on OUT-DATA lines 0 and 1. A pulse to a logical 1 appearing during the routing byte time 890 on OUT-DATA 0 will define to logic 132 that the message is to be routed to tail 628. A pulse appearing during the routing byte time 890 on OUT-DATA 1 will define to logic 132 that the message is to be routed to tail 624. A pulse appearing during the routing byte time 890 on both OUT-DATA 0 and 1 simultaneously will define to logic 132 that the message is to be routed to both tails 628 and 624; i.e., the function is the same as Option 1 where both tails are sent the same message. The logic for Option 3 is capable of performing Option 1, but not vice versa. When Option 3 logic (FIG. 17) performs the Option 1 function, it is not performed as efficiently because additional logic and time are required to perform the routing function.

FIG. 17 shows how the routing function required for Option 3 is performed. Latch 970 is added to route messages to tail 1 628. Latch 970 is enabled by OUT-VALID 671 going to 1 through inverter 972; this removes the reset from latch 970. When OUT-VALID 671 is a 0, latch 970 is held reset and there is no connection of interface 131 to tail 1 628. Likewise, latch 958 is added to route messages to tail 2 624. Latch 958 is enabled by OUT-VALID 671 going to 1 through inverter 959; this removes the reset from latch 958. When OUT-VALID 671 is a 0, latch 958 is held reset and there is no connection of interface 131 to tail 2 624. The first data to appear on the OUT-DATA 0:7 679 after OUT-VALID 671 goes to 1 is the routing byte 890, otherwise the eight OUT-DATA lines 679 have been held at 0's during reset and start-up time by sending adapter 126. If OUT-DATA 679 line 0 pulses to 1 during the routing byte time 890, it goes to the clock line of latch 970 and sets the latch as shown in FIG. 18*a* by the route to T1 892 going to a 1. The D (data) input to latch 970 is a 1 at this time, so latch 970 will be set by a pulse on OUT-DATA 671 line 0. Likewise, if OUT-DATA 671 line 1 pulses to 1 during the routing byte time 890, it goes to the clock line of latch 958 and sets the latch. The routing byte 890 can set either or both latches 970, 958 depending on the values of OUT-DATA 671 lines 0 and 1 during the routing byte 890. FIG. 18*a* shows the case where only OUT-DATA 671 line 0 is a 1, which leads to route to T1 892 setting and Route To T2 893 not setting.

Either latch 970 or 958 setting causes NOR gate 971 to go to 0 indicating that a routing decision has been made (ROUTING IDLE 971 goes to 0 indicating not idle). In the example timing shown in FIG. 18*a*, ROUTE TO T1 latch 970 is not affected by ROUTING IDLE 971 going to a 0 into OR gate 973. This is because the other input to OR 973 is a feedback of latch 970. This keeps latch 970 set to 1 by holding a 1 on the D input of latch 970, so if OUT-DATA 0 rises and falls as the message is transmitted on the OUT-DATA 0:7 lines 679 nothing will change the state of latch 970. Latch 970 can only be reset by OUT-VALID 671 going to 0. In the example timing shown in FIG. 18*a*, ROUTE TO T2 latch 958 is a 0 and it is held at 0 by ROUTING IDLE 971 going to a 0 into OR gate 965. This is because the other input to OR 965 is a feedback of latch 958, which is a 0. Thus, OR 965 stays at 0 and keeps latch 958 from setting by holding a 0 on the D input of latch 958. If OUT-DATA 679 line 1 rises and falls as the message is transmitted on the OUT-DATA 0:7 lines, it cannot change the state of latch 958 because the D-input is held at 0.

The routing latches 970 and 958 control the routing of a message by enabling OUT-VALID 671 to be transmitted to the tail 628 or 624 selected and by inhibiting OUT-VALID 671 from being transmitted to the tail not selected. This is accomplished by adding an extra input into the basic AND gate 917 (shown in FIG. 13) to enable Route To T1 latch 970 to gate OUT-VALID to tail 1 628; i.e., Route To T1 latch 970 must be a 1 or OUT-VALID will not be sent to tail 1 628. Likewise, an extra input is added to AND gate 947 to enable Route To T2 latch 958 to gate OUT-VALID to tail 2 624; i.e., Route To T2 latch 958 must be a 1 or OUT-VALID 671 will not be sent to tail 2 624. FIG. 18*a* shows how OUT1-VALID is sent to tail 1 628 and how OUT2-VALID 627 is held at 0, when Route To T1 892 is a 1 and Route To T2 893 is a 0.

A further change required to logic 132 is to change the reset function to the reject latches 915 and 925, as these two latches apply only to the Option 1 case. Therefore, Option 1 is detected by AND gate 966 going active when both latches 970 and 958 are active simultaneously (indicating that the message is to be sent to both tails 628, 624). For the normal case, both or one of the latches 970 and 958 are 0's and AND gate 966 is held at 0 to disable both latches 915, 925. FIG. 18*b* shows the case where Route To T1 latch 970 and Route To T2 latch 958 are active simultaneously. The timing shows the message to tail 2 624 being rejected by OUT2-REJECTN 672 which leads to REJL T2 signal 673 from latch 925 setting just like in FIG. 14*a* for Option 1. FIG. 18*b* shows the case where both latches 970, 958 are active works the same as Option 1 in FIG. 14*a*, where the data is broadcast to both tails 628, 624.

The fan-out logic 132 used to generate the OUT-REJECTN to interface 131 works differently depending on whether Option 1 or Option 3 is active. NOR gate 984 generates OUT-REJECTN 665 to interface 131 and has two inputs—one from gate 981 for Option 3 and one from gate 983 for Option 1. NOR gate 984 combines the two cases into a single OUT-REJECTN signal 665. For Option 1, AND gate 966 goes to a 1 and it is input to AND 983 to select the Option 1 input to NOR 984. Also, when AND 966 goes to a 1, it is input to NOR 981 to deselect the Option 3 input to NOR 984. When Option 1 is selected, the output of OR gate 920 (from FIG. 13 for Option 1) is inverted by INV 967, which is selected to be gated through AND 983 to NOR 984 to drive the OUT-REJECTN signal 665 to interface 131. OR 920 generates the Option 1 function for OUT-REJECTN 665, which is that both tails 628, 624 must reject a message before the rejection is passed to interface 131. However, the Option 3 function of selecting either tail 628, 624 to receive the message requires a different rejection function. For the Option 3 case where only one tail 628, 624 is selected by latches 970, 958, if that tail rejects a message the rejection must be passed to interface 131. The not-connected tail has no effect on the rejection signal to interface 131. For the Option 3 case, only one of the two latches 970, 958 is set and AND gate 966 goes to 0. AND gate 966 being 0 is input to AND 983 to deselect the Option 1 input to NOR 984. AND gate 966 (when 0) goes to NOR 981 to select the Option 3 input to NOR 984. When Option 3 is selected, the output of AND gate 982 is selected to be gated through NOR 981 to NOR 984 and drive the OUT-REJECTN signal 665 to interface 131. AND gate 982 generates the Option 3 function for OUT-REJECTN 665, which is that only the selected tail, either 628 or 624, must reject a message. The selection of one reject function is formed by OR gates 980, 985 into AND 982. OR gate 980 selects the negative active OUT1-REJECTN signal 689 to AND gate 982 when Route To T1 latch 970 is a 1 (Route To T1 Not is a 0). The OUT-REJECTN signal 665 to interface 131 follows the OUT1-REJECTN signal 689 from tail 3 628 when Route To T1 latch 970 is a 1. Likewise, the OUT-REJECTN signal 665 to interface 131 follows the OUT2-REJECTN signal 672 from tail 2 624 when Route To T2 latch 958 is a 1. This happens through OR gate 985.

The fan-in logic 134 of FIG. 15 does not require any changes, but works the same for Options 1, 2, and 3. This is because logic 134 of FIG. 15 selects a message from either of one of two tails and routes that message through to interface 133 and receiving adapter 128. This is the function that is required for Options 1, 2, and 3.

Option 4: Direct Connections Amongst Multiple Nodes for Sending Messages

Option 4 is an extension of Option 3 to more nodes. FIG. 12e shows how four nodes having three tails each form direct connections with each other. The operation of each node is identical, as an example consider Node 1. Node 1 has three full-duplex tails 664, 665 and 670, 671 and 674, 675; where each tail 664, 665, 670, 671, 674, 675 is comprised of the eleven signals 101 shown in FIG. 1a. Each full-duplex tail has two sets of eleven lines 101 going in opposite directions. Tail 664 sends messages from Node 1 to Node 2 and tail 665 sends messages from Node 2 to Node 1. Likewise, tail 674 sends messages from Node 1 to Node 3 and tail 675 sends messages from Node 3 to Node 1, tail 670 sends messages from Node 1 to Node 4 and tail 671 sends messages from Node 4 to Node 1.

Figure 19A:
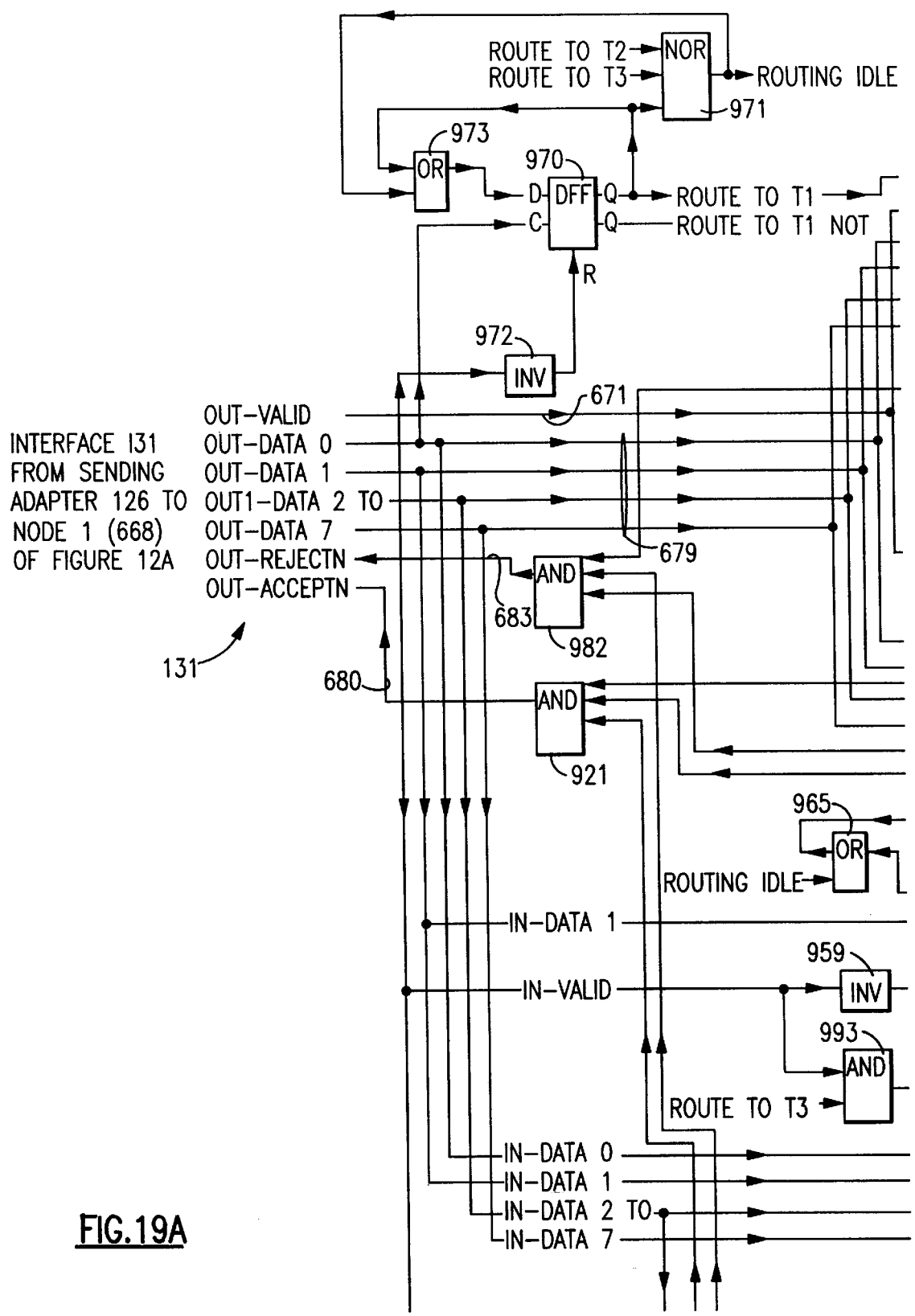
Figures 19, 19B:
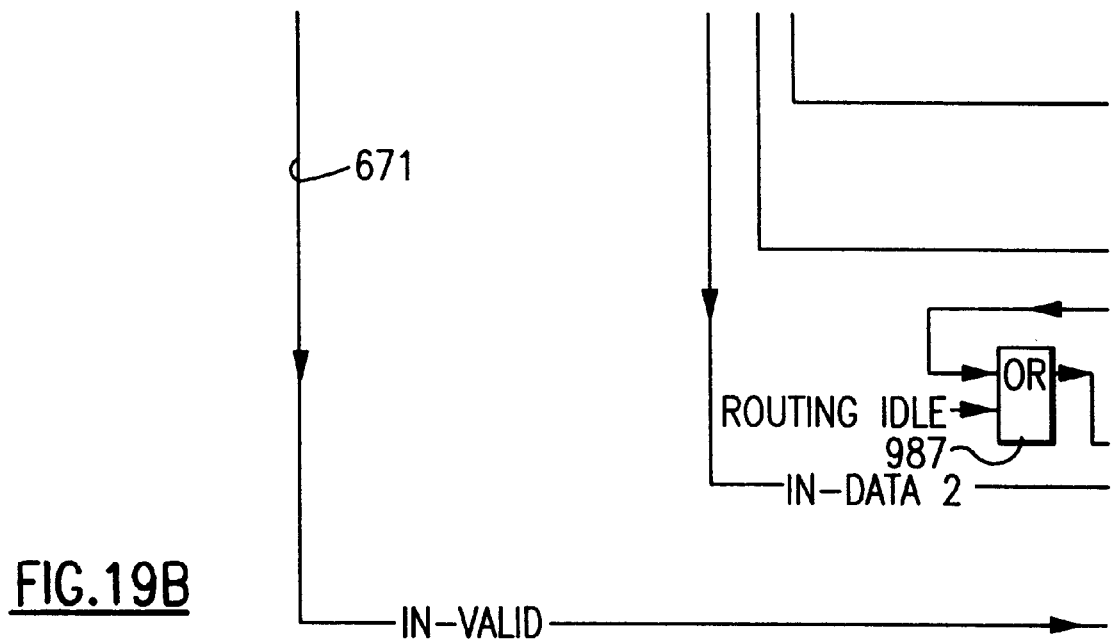
Figure 19D:
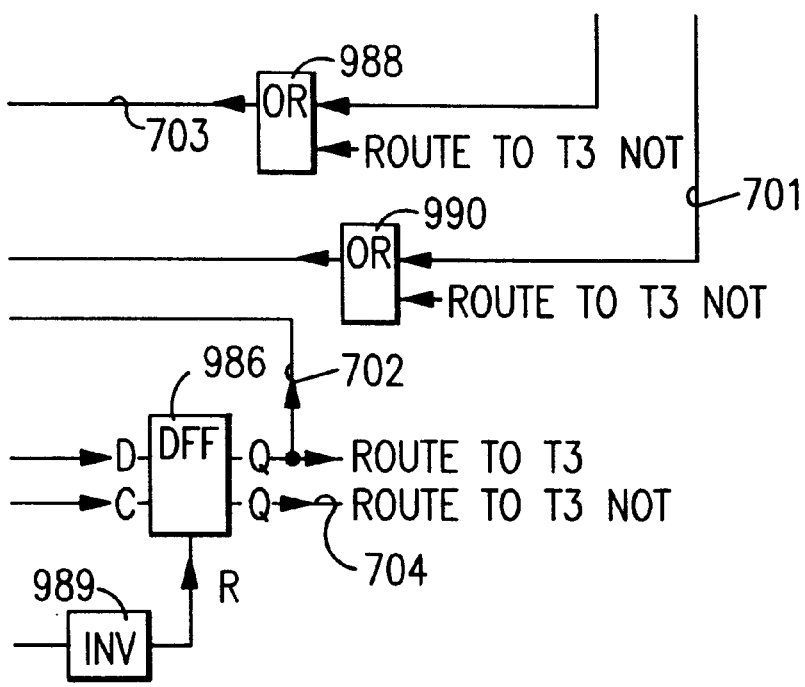
Figure 21A:
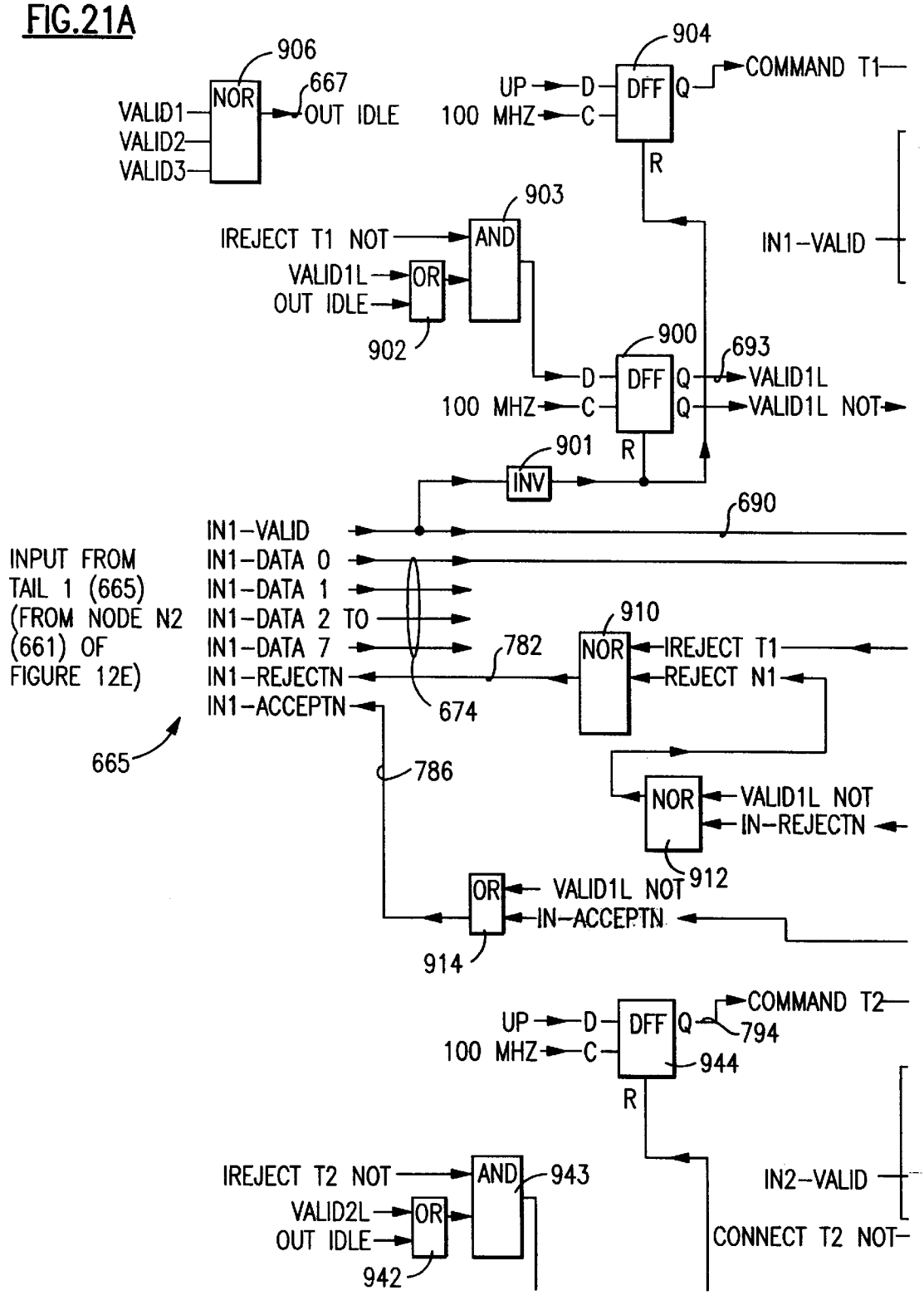
Figure 21B:
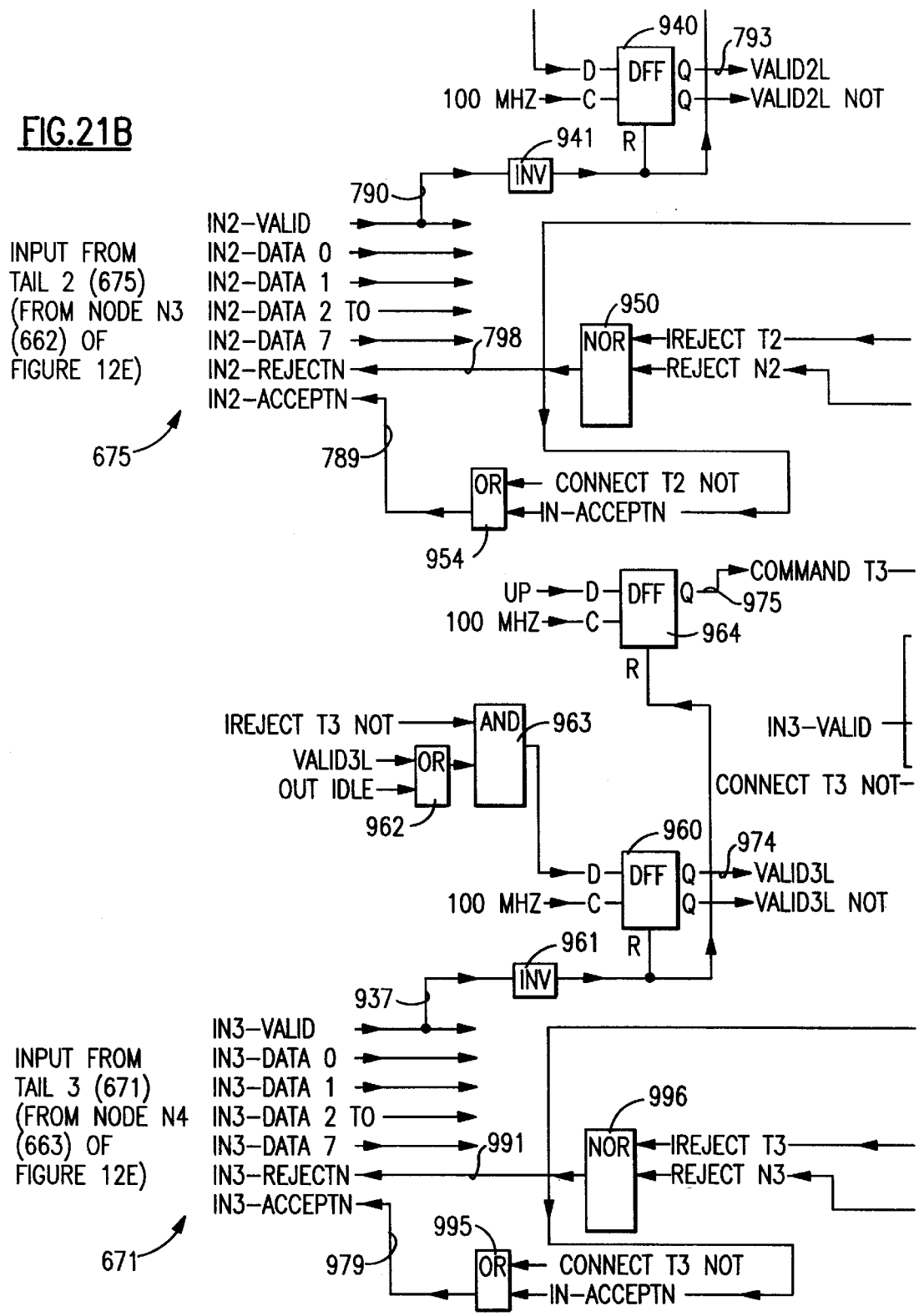

The extension from the 2-tailed network adapter 102 of Option 3 to the 3-tailed network adapter required for Option 4 requires modification to only 1:2 fan-out logic 132 and 2:1 fan-in logic 134. 1:2 fan-out logic 132 must be extended to 1:3 fan-out logic as shown in FIG. 19, and 2:1 fan-in logic 134 must be extended to 3:1 fan-in logic as shown in FIG. 21.

Referring to FIG. 19 where the 1:3 fan-out logic is shown for a typical Node N1 660, the extension of FIG. 13 (1:2 fan-out logic 132) from two to three tails is shown. The third tail 670 is added to interface to Node N4 663, while the first two tails 664 and 674 are used to interface to Nodes N2 and N3, respectively. The third tail 670 required logic similar to the first two tails. A third set of drivers 992 is required to drive the OUT3-VALID and OUT3-DATA 0:7 from tail 3 to Node N4. Like Option 3, routing byte 890 contains the tail selection information. For Option 4 the routing byte is all zeroes except for three bits of routing information carried on OUT-DATA lines 0, 1 and 2. (In FIG. 19, the OUT-x lines appearing at interface 131 also appear within the FIG. as corresponding IN-x lines.) A pulse to a logical 1 appearing during the routing byte time 890 on OUT-DATA 0 will define to logic 132 that the message is to be routed to tail 664. A pulse appearing during the routing byte time 890 on OUT-DATA 1 will define to logic 132 that the message is to be routed to tail 674. A pulse appearing during the routing byte time 890 on OUT-DATA 2 at interface 131 will define to logic 132 that the message is to be routed to tail 670.

1:3 fan-out logic 132 requires several modifications over 1:2 fan-out logic 132. Route To T3 latch 986 and its surrounding gates (987, 989) are added to perform the same function for tail 3 670 as similar latches 970 and 958 perform for tails 1 and 2, respectively. Latch 986 is enabled by OUT-VALID 671 going to 1 through inverter 989; this removes the reset from latch 986. When OUT-VALID 671 is a 0, latch 986 is held reset and there is no connection of interface 131 to tail 3 670.

Figure 20A:
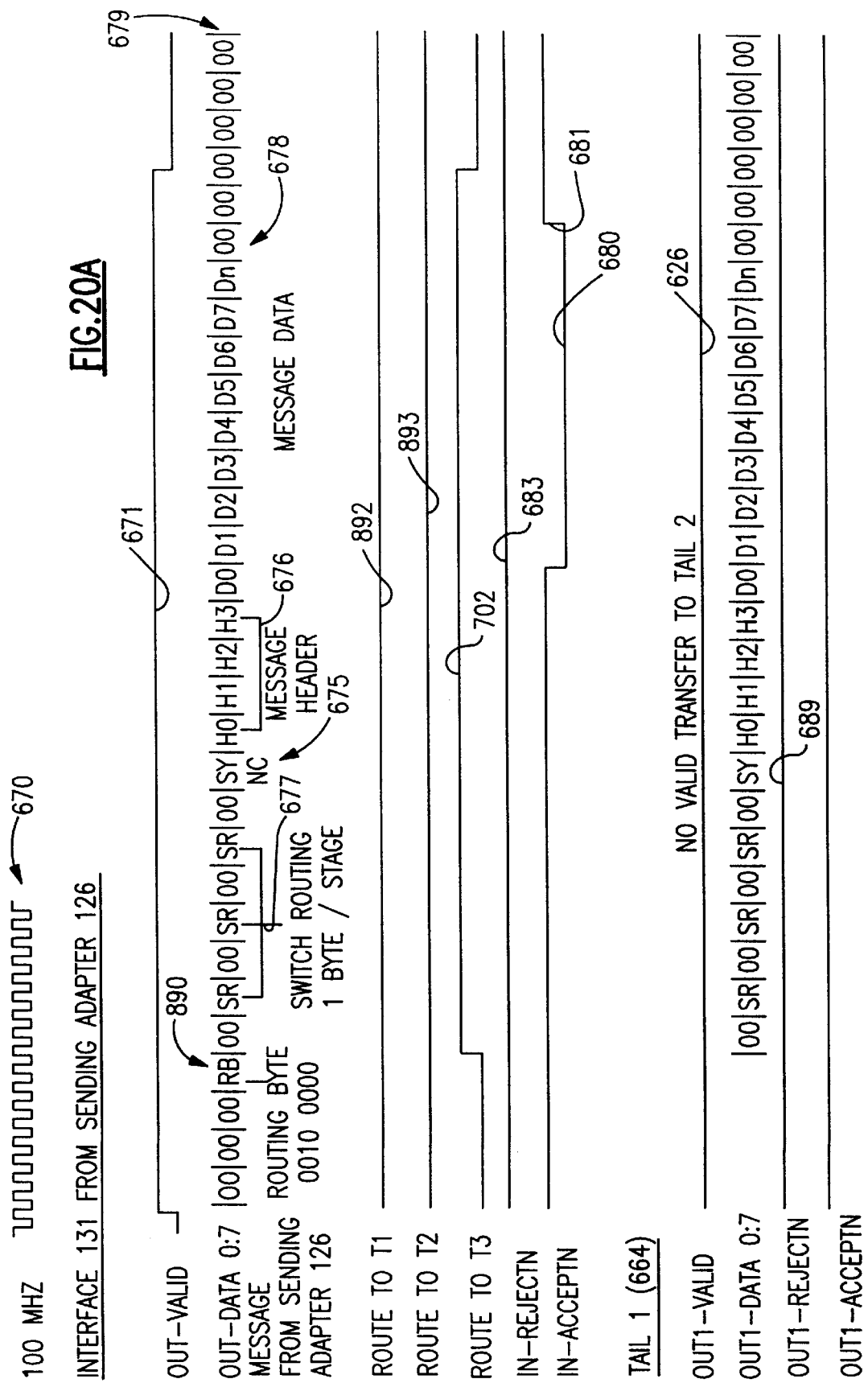

Referring to FIG. 20, the timing is shown for routing a message to tail 3 670. The first data to appear on the OUT-DATA 0:7 679 after OUT-VALID 671 goes to 1 is the routing byte 890, otherwise the eight OUT-DATA lines 679 have been held at 0's during reset and start-up time by sending adapter 126. If OUT-DATA 679 line 2 pulses to 1 during the routing byte time 890, it goes to the clock line of latch 986 and sets the latch as shown in FIG. 20 by the Route To T3 signal 702 going to a 1. The D (data) input to latch 986 is a 1 at this time, so latch 970 will be set by a pulse on OUT-DATA 679 line 2. NOR gate 971 in FIG. 19 receives an additional input (route to T3 702) over the same NOR gate 971 as shown also in FIG. 17. Thus, any latch 970, 958, or 986 setting causes NOR gate 971 to go to 0 indicating that a routing decision has been made. In the example timing shown in FIG. 20, ROUTE TO T3 latch 986 is not affected by ROUTING IDLE 971 going to a 0 into OR gate 987. This is because the other input to OR 987 is a feedback of latch 986. This keeps latch 986 set to 1 by holding a 1 on the D input of latch 986, so if OUT-DATA 679 line 2 rises and falls as the message is transmitted on the OUT-DATA 0:7 679 lines nothing will change the state of latch 986. Because of the feedback line from latch 986 through OR gate 987, latch 986 can only be reset by OUT-VALID 671 going to 0. In the example timing shown in FIG. 20, ROUTE TO T1 latch 970 output line 892 and ROUTE To T2 latch 958 output line 893 are 0's and they are held at 0's by ROUTING IDLE 971 going to a 0 into OR gates 973 or 965. If OUT-DATA 0 or 1 rise and fall as the message is transmitted on the OUT-DATA 0:7 lines 679, they cannot change the state of latches 970 and 958 because their D-inputs are held at 0's.

The routing latches 970, 958, and 986 control the routing of a message by enabling OUT-VALID 671 to be transmitted to the tail selected and by inhibiting OUT-VALID 671 from being transmitted to the tails not selected. For tail 3 670 this is accomplished by AND gate 993, which causes Route To T3 latch 986 to gate OUT-VALID to tail 3 670; i.e., Route To T3 latch 970 must be a 1 or OUT-VALID 671 will not be sent to tail 3 670. FIG. 20 shows how OUT3-VALID 628 is sent to tail 3 670 and how OUT1-VALID 626 and OUT2-VALID 627 are held at 0's, when Route To T3 signal 72 is a 1 when Route To T1 892 and Route To T2 893 are 0's.

Another change required to fan-out logic 132 is to eliminate the REJL latches 915 and 925 with their associated gates that appear in FIG. 17. The function provided by the REJL latches 915 and 925 is used only by the Option 1 case, where two tails are used to provide a non-blocking network. Option 4 having three tails would not be used to provide the Option 1 two tail approach, so in this embodiment latches 915 and 925 are not extended to the third tail but eliminated instead. Also AND 966 gate and gates 980, 981, and 985 of FIG. 17 are eliminated, as these were used to provide the FIG. 17 OUT-REJECTN signal to interface 131. Instead a new OUT-REJECTN function is implemented in FIG. 19, which uses AND gate 982 to AND together the selected reject signal from each of the three tails 664, 674, and 670. The selected reject function is formed by OR gates 923, 929, 988 for the three tails 664, 674, 670, respectively. A typical gate implementing this function from tail 3 is OR gate 988, which selects the negative active OUT3-REJECTN signal 703 to AND gate 982 when Route To T3 latch 986 is a 1 (Route To T3 Not 704 is a 0). The OUT-REJECTN 683 signal to interface 131 follows the OUT3-REJECTN 703 signal from tail 3 670 when Route To T3 latch 986 is a 1. Likewise, the OUT-REJECTN 683 signal to interface 131 follows the OUT1-REJECTN signal 689 from tail 1 664 when Route To T1 latch 970 output 892 is a 1, and the OUT-REJECTN signal 683 to interface 131 follows the OUT2-REJECTN signal 672 from tail 2 674 when Route To T2 latch 958 is a 1. If more than one Route To Tx latch 970, 958, 986 is set, the OUT-REJECTN signal 683 to interface 131 follows the AND of the selected reject signals as controlled by AND gate 982. Option 4 performs a multicast to two tails or a broadcast to all three tails 664, 660, and 670 if two or more of the IN-DATA 679 lines 0, 1, 2 are set in routing byte 890. AND gate 982 will go to 0 if any of the three OUTx-REJECTN signals 689, 672, 703 (one from each tail) goes to 0. This will reject the broadcast if any destination rejects the broadcast. AND gate 921 will go to 0 if any of the three OUTx-ACCEPTN signals (one from each tail) goes to 0. This will keep the OUT-ACCEPTN signal 680 to interface 131 at 0 until the accept signals from all three tails 664, 674, and 670 rise at time 681 indicating that all tails have accepted the message.

The last change for Option 4 is that AND gate 921 gets an new input coming from the selected accept signals from all three tails 664, 674, and 986. OR gate 990 is added to select the negative active OUT3-ACCEPTN signal 701 to AND gate 921 when Route To T3 latch 986 output 702 is a 1 (Route To T3 Not 704 is a 0). FIG. 20 shows an example of this as OUT-ACCEPTN signal 680 to interface 131 following OUT3-ACCEPTN signal 701 from tail 3 670. Thus gates 921 and 990 allow the accept signals from tail 3 670 to be funneled into the accept signal 680 going to interface 131. Since the REJL latches 915 and 925 have been eliminated in the embodiment of FIG. 19 from the embodiment of FIG. 17, the REJL T1 and REJL T2 signals are removed from OR gates 923 and 929.

The approach shown in FIG. 19 of adding another sending tail to those shown in FIG. 17 can be reapplied or replicated to further extend the design to more than three tails.

Option 4: Direct Connections Amongst Multiple Nodes for Receiving Messages

The extension from the 2-tailed network adapter 102 embodiment of Option 3 to the 3-tailed network adapter embodiment of Option 4 requires modification to the 2:1 fan-in logic 134. Thus, the 2:1 fan-in logic 134 of FIG. 15 is extended to 3:1 fan-in logic as shown in FIG. 21.

Referring to FIG. 21 in connection with FIG. 12e, the 3:1 fan-in logic 134 is shown for a typical Node N1 (660), where the embodiment in FIG. 15 of 2:1 fan-in logic 134 is extended from two to three tails. The third tail 671 is added to interface to Node N4 663, while the first two tails 665, 675 are used to interface to Nodes N2 and N3, respectively. The third tail 671 requires logic similar to the first two tails: latch 960 and its associated gates 961, 962, 963 implement the VALID3L signal 974; latch 964 and delay 976 implement the delayed COMMNAND T3 signal 975, AND 968 and INV 969 implement the IREJECT T3 signal 977 and its inverse, NOR 970 and NOR 972 implement the IN3-REJECTN signal 991 to Tail 3 671, and OR 974 implements the IN3-ACCEPTN signal 979 to Tail 3 671. All of these gates function identically to the comparable gates discussed in connection with FIG. 15 under Option 1 for tail 1 115 and tail 2 119.

Other changes required to implement the third tail 671 are as follows:

a) AND gate 998 implements the CONNECT T3 signal, which when set to 1 establishes a connection from interface 133 to tail 3 671. AND gate 998 provides the priority function for connecting tail 3 to interface 133, when there is contention with tails 1 and 2 wanting to connect to interface 133 at the same time. The preferred embodiment implements one possible priority scheme where tail 3 is assigned the lowest connection priority. Therefore, as defined by AND 998, CONNECT T3 only goes to a 1 if VALID3L 974 is a 1 (indicating that tail 3 wants to connect to interface 133) and VALID1L 693 from latch 900 and VALID2L 793 are both 0's (indicating that tails 1 665 and 2 675 are not contending to connect to interface 133 at this time). INV 999 generates the inverse of the CONNECT T3 signal.

b) Additional gates 934 and 935 are input to OR gates 938, 939 to form typical connections from tail 3 671 to the IN-VALID 692 and IN-DATA 0:7 lines of interface 133. AND gate 934 uses CONNECT T3 signal 998 to select the connection of tail 3 to interface 133 and gates the IN3-VALID 937 signal from tail 3 671 to OR gate 938 and connects it to IN-VALID 692 of interface 133. Note, at this time VALID1L 693 to AND 930 and CONNECT T2 946 to AND 931 are both 0's; this enables IN3-VALID 937 from tail 3 to pass directly to IN-VALID 692 of interface 133. AND gate 935 uses CONNECT T3 signal 998 to select the connection of the IN3-DATA 0 signal from tail 3 671 to OR gate 939 which connects to it to IN-DATA 0 of interface 133. While not shown, the other seven data bits are gated to interface 133 in the same manner. Note that OR gates 938 and 939 change from being 2-input gates in the embodiment of FIG. 15 to being 3-input gates in the embodiment of FIG. 21, where the third input permits the third tail 671 to fan-in to interface 133.

c) NOR gate 906 which generates the OUT IDLE signal 667 changes from being a 2-input gate in the embodiment of FIG. 15 to being a 3-input gate in the embodiment of FIG. 21. This allows the setting of VALID3L latch 960 to also drive the OUT IDLE 906 signal 667 to 0 to indicate that fan-in logic 134 is not idle because tail 3 671 wants to connect to interface 133. Otherwise the OUT IDLE 906 signal 667 performs the same functions as it did for the embodiment of Option 1 as shown in FIG. 15.

d) NOR gates 996 and 997 are added to select IN-REJECTN 695 from interface 133 to be connected to tail 3 when CONNECT T3 from gate 998 is 1. Likewise, OR gate 995 is added to select IN-ACCEPTN 696 from interface 133 to be connected to tail 3 when CONNECT T3=1.

Option 5: Ring and Hypercube Connections Amongst Multiple Nodes

The implementation of the present invention begins with the simplest of connections as demonstrated by Option 1 and increases in complexity to Option 5, which is the last and has the most complex logic for establishing connections. FIG. 12c (Ring Connection) and 12d (Hypercube Connection) show examples of Option 5 connections. These connections introduce a new feature that the previous options have not required and which leads to the increased complexity. The new feature is the ability of every sending tail to be driven from multiple sources, and every receiving tail to fan-out to multiple sources. Put another way, new is the ability of the fan-out logic 132 to fan-in as well, and the ability of the fan-in logic 134 to fan-out as well. Thus, the distinction between having different functions for sending logic 132 which fans out and receiving logic 134 which fans in disappears, and for Option 5 sending logic 132 and receiving logic 134 become identical functions, both being able to fan-out and fan-in.

The reason why both fan-out and fan-in are needed for both sending and receiving becomes apparent from the following example using FIG. 12c. It is possible for Node N2 (631) to make a direct connection and send a message to Node N1 630 over tail 635, which would connect to interface 133 of Node N1 and the message would be received into the receiving adapter 128 for use by Node N1. This is the standard direct connection as considered previously in Option 3. But in FIG. 12c an additional connection is possible, since in a ring network it is possible for Node N2 631 to send a message to Node N4 633 over tail 635 to Node N1 and then connecting tail 618 to Node N4. Thus, the receiving logic 134 in Node N1, which normally fans-in tails 635 and 619 to connect to interface 133 internal to Node N1, now has to also connect tail 635 to fan-out to tail 618 as well. This also affects the fan-out logic of Node N1, which for Option 3 caused the interface 131 generated internal to Node N1 to fan-out to tails 634 and 618, now requires a fan-in function that permits either interface 131 or tail 635 to fan-in to tail 618. Likewise, when Node N4 is trying to connect to Node N2 by going through Node N1, N1 requires a fan-in function that permits either interface 131 or tail 619 to fan-in and go to tail 634. Thus, fan-in and fan-out merge into a single design. As a further example of all functions being both fan-in and fan-out, consider Node N1. Interface 131 from Node N1 must fan-in with tails 635 and 619 (fan-in of 3) and the result must fan-out to tails 634, 618 and interface 133 internal to Node N1 (fan-out of 3).

Figure 22A:
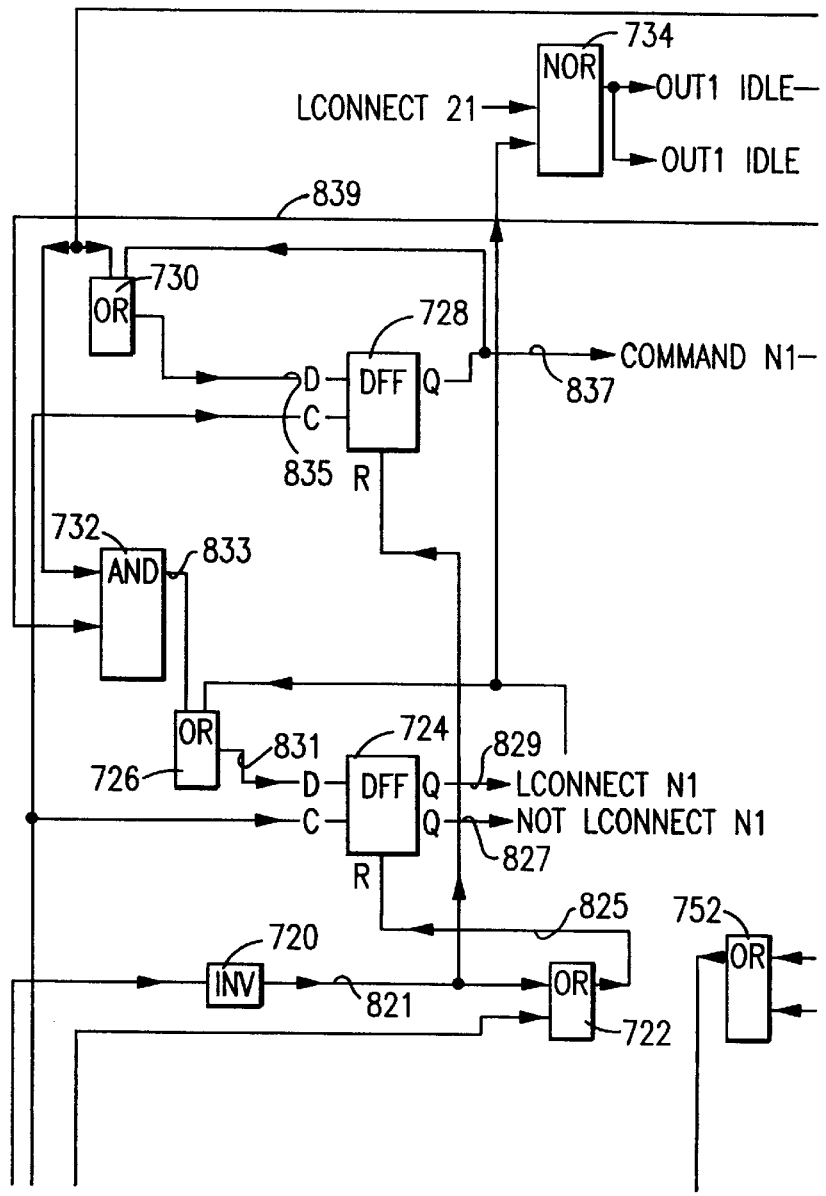
FIGS. 22A through 22D, oriented as shown in FIG. 22, are a logic diagram showing the unique logic required to implement each tail-to-tail unidirectional connection for the two-tailed adapter according to this invention.
Figure 22B:
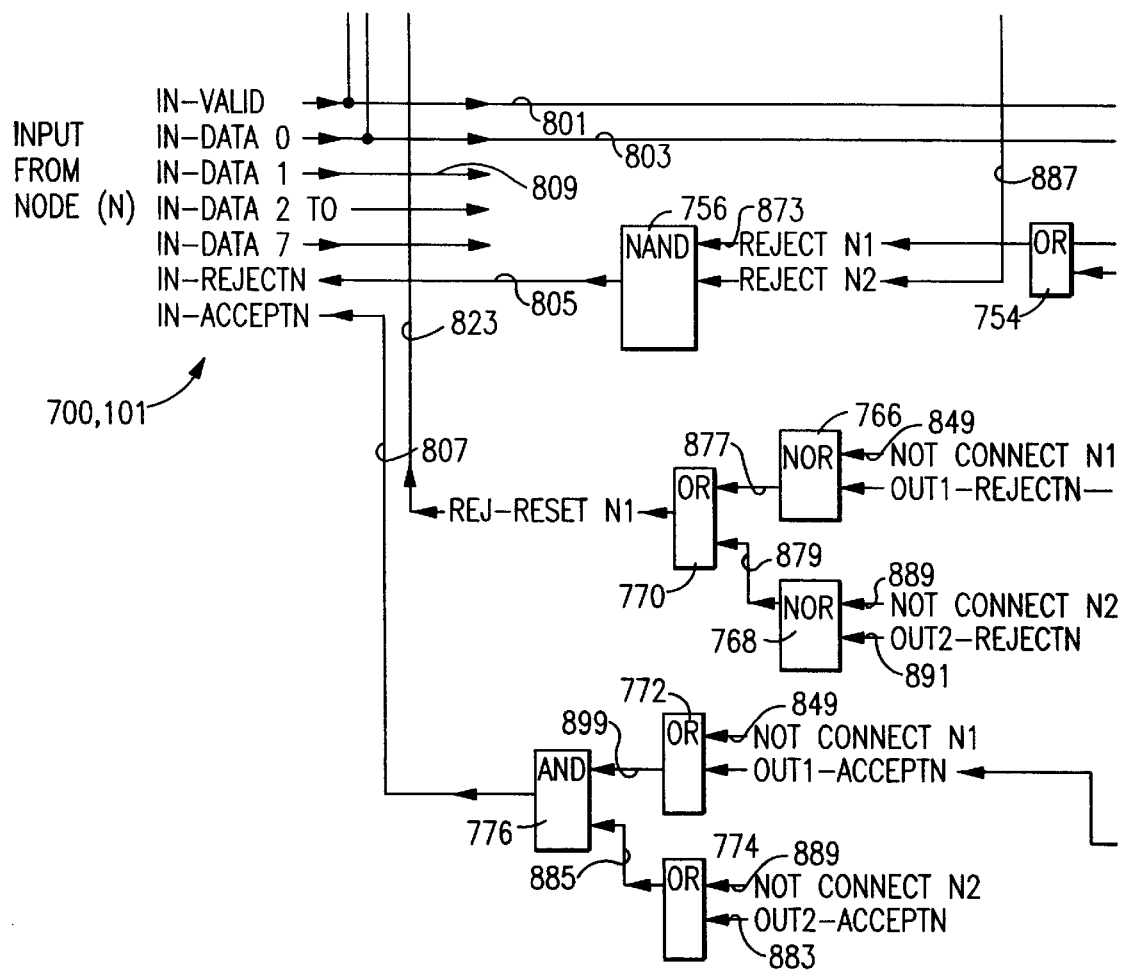
Figure 22C:
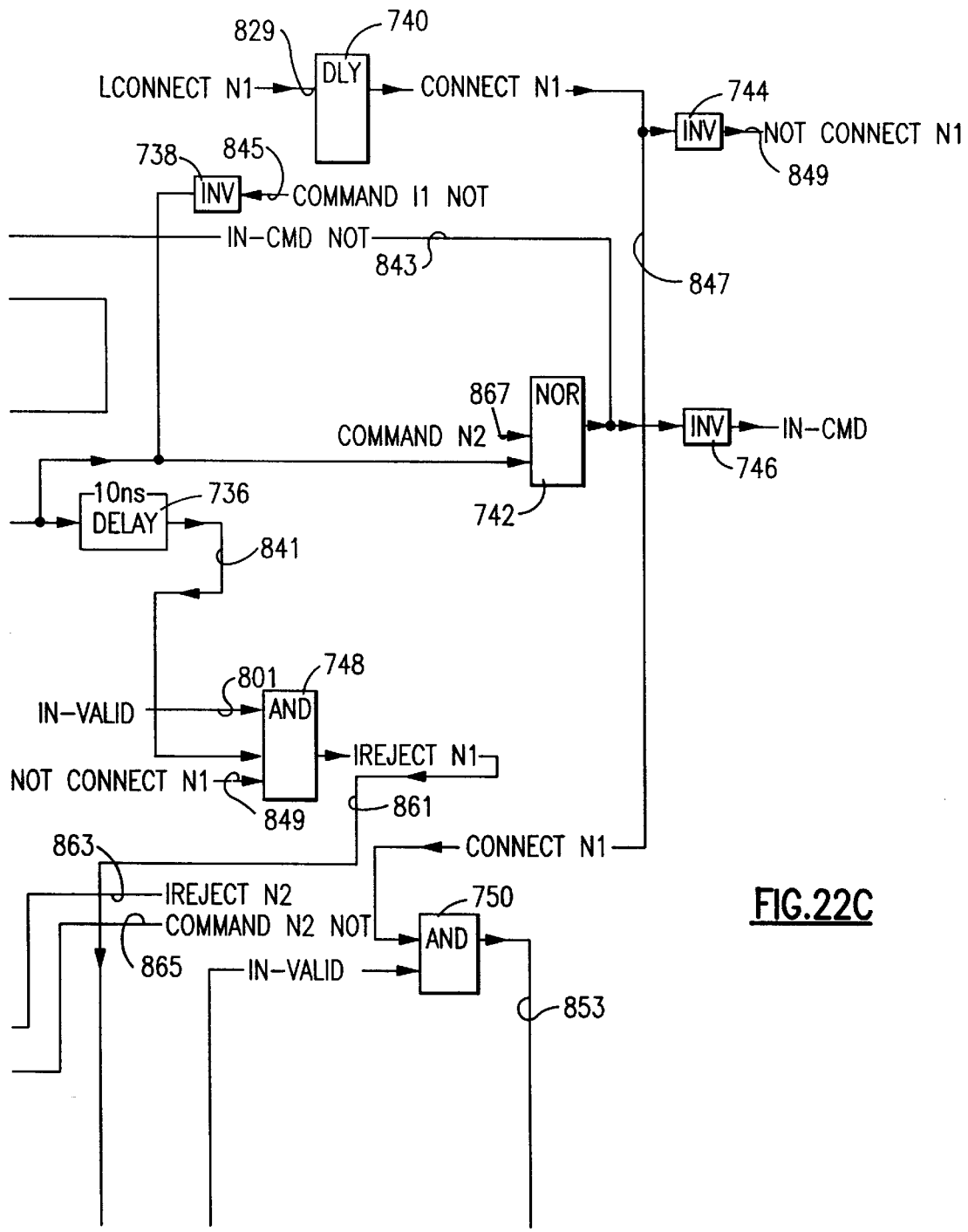
Figures 22, 22D:
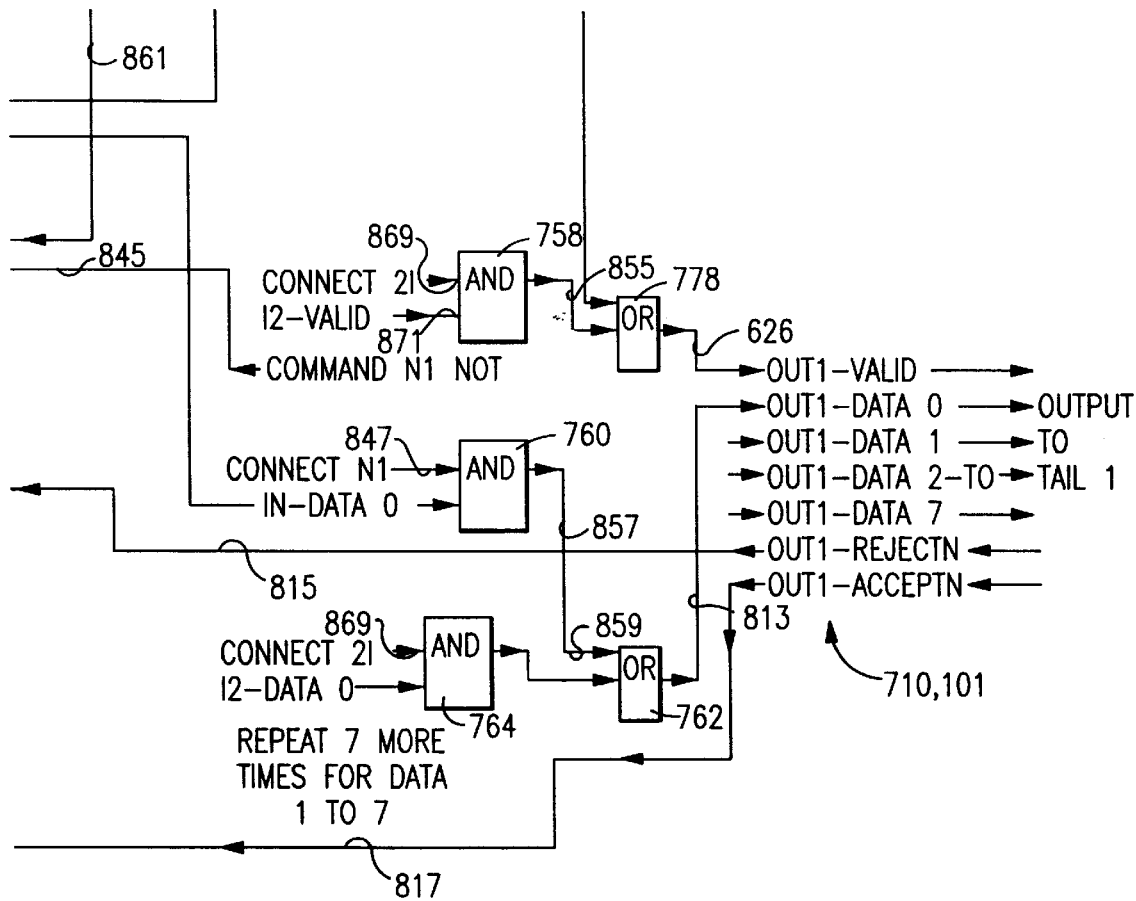

Referring to FIG. 22, a hardware design for tail-to-tail unidirectional connections is shown which is capable of performing the complex Option 5 connections. In addition, the embodiment of FIG. 22 is also flexible enough to perform any of the Options 1 to 4, as well. Thus, FIG. 22 discloses a general design capable of covering all cases. However, if only one specific function is required, such as any Option 1 to 4, that specific solution can be accomplished simpler and faster by using the specific hardware disclosed above for each individual embodiment of Options 1 to 4.

Referring further to FIG. 22, a preferred embodiment of the logic for connecting a typical tail from node N to Tail 1 will be described. Keeping in mind that the connections are unidirectional, similar logic is required to connect Node N to Tail 2, Tail 1 to Tail 2, Tail 2 to Tail 1, Tail 1 to Node N, and Tail 2 to Node N. Thus, a total of six sets of the logic shown in FIG. 22 are required to provide the Y-Connection logic for supporting six different connections, plus the non-blocking connection to both tail 1 and tail 2 simultaneously, which is required for Option 1.

The interface to each tail consists of eleven lines 101 (FIG. 1A) which appear selectively (unless blocked) at input port 700 and output port 710.

IN-VALID line 801 is fed to AND gates 748 and 750, and to inverter 720, the output of which appears on line 821 to OR gate 722 and at the reset input to latch 728. The other input to OR gate 722 is REJ-RESET N1 line 823 from OR gate 770. The output of OR gate 722 is fed on line 825 to the reset pin of latch 724.

IN-DATA 0 line 803 is fed to AND gate 760 and to the clock inputs of latches 724 and 728. The data input to latch 728 is line 835 from OR gate 730, and the output is fed on line 837 as COMMAND N1 signal to OR gate 730, 10 nsec delay 736 and thence on line 841 to AND gate 748, to NOR gate 742 and to inverter 738 to appear on line 845 as COMMAND II NOT. NOR gate 742 receives as inputs COMMAND N1 on line 837 and COMMAND N2 on line 867. The output of NOR gate 742 is fed on line 843 as IN-COMMAND NOT to inverter 746 to appear on line 851 as IN COMMAND, to OR gate 730, and to AND gate 732.

Latch 724 is reset by line 825, clocked by IN-DATA 0 on line 803, and receives the data signal on line 831 from OR gate 726. The inverted output of latch 724 appears on line 827 as NOT LCONNECT N1, and the output appears on line 829 as LCONNECT N1, which is fed to OR gate 726, to delay 740 and to NOR gate 734. The other input to NOR gate 734 is LCONNECT 21, and its output is OUT1 IDLE which is fed on line 839 to AND gate 732, the output of which appears on line 833 to OR gate 726.

AND gate 748 receives as inputs delayed COMMAND N1 on line 841, IN-VALID on line 801, and NOT CONNECT N1 on line 849. Its output appears on line 861 as IREJECT N1 to OR gate 754. OR gate 754 also receives COMMAND N1 NOT on line 845, and its output appears on line 873 as the REJECT N1 input to NAND gate 756. IREJECT N2 on line 863 and COMMAND N2 NOT on line 865 are the inputs to OR gate 752, the output of which appears on line 887 as REJECT N2. The output of NAND 756 appears on line 805 as IN-REJECTN.

LCONNECT N1 829 is delayed at 740, to become the CONNECT N1 input to AND gate 750 on line 847, and is inverted at 744 to become NOT CONNECT N1 on line 849, which is fed to NOR 766 and OR 772. The output of AND gate 750 is fed on line 853 to OR gate 778, the output of which appears on line 626 as OUT1-VALID 626. CONNECT 691 line 869 is fed to AND gates 758 and 764. The other input to AND gate 758 is I2-VALID on line 871, and its output is fed on line 855 to OR gate 778. The other input to AND gate 760 is CONNECT N1, and its output is fed on line 857 to OR gate 762. The other input to AND gate 764 is I2-DATA 0, and its output is fed on line 859 to OR gate 762, the output of which appears on line 813 as OUT1-DATA 0. The logic including AND gate 764 and OR gate 762 is, as appropriately modified, repeated seven times for data lines 1 to 7.

OUT1-REJECTN line 815 is fed to NOR gate 766, the other input to which is NOT CONNECT N1 line 849. The output of NOR GATE 766 is fed on line 87 to OR gate 877. NOT CONNECT N1 line 849 is also fed to OR gate 772, along with OUT1-ACCEPTN line 817. NOT CONNECT N2 line 889 is fed to NOR gate 768 along with OUT2-REJECTN line 891 and to OR gate 774 along with OUT2-ACCEPTN line 883. The inputs to AND gate 776 are lines 885 from OR gate 774 and 899 from OR gate 772, the output of which appears on line 807 as IN-ACCEPTN. The inputs to OR gate 770 are lines 877 from NOR gate 766 and 879 from NOR gate 768, the output of which appears as REJ-RESET N1 on line 823.

Referring further to FIG. 22, in operation, a connection starts by IN-VALID 801 rising on the Input Lines 700 from Node (N). Previously when IN-VALID 801 equalled 0, it reset the two latches 728 and 724—the two latches required to control the connection from Node (N) to Tail 1 through gates 720 and 722. Latch 724 being reset breaks the connection, while latch 724 being set makes the connection. After IN-VALID 801 rises, a pulse or two simultaneous pulses are put on IN-DATA 0 line 803 and/or the IN-DATA 1 line. This pulse selects the connection to be made as follows:

a) Pulse on IN-DATA 0 line 803 only attempts to connect Node (N) to Tail 1 b) Pulse on IN-DATA 1 line 809 only attempts to connect Node (N) to Tail 2 c) Pulses on both IN-DATA 0 line 803 and IN-DATA 1 line 809 attempt to connect Node (N) to Tail 1 and Tail 2 (the non-blocking connection to both tails).

This is accomplished in the embodiment of FIG. 22 by the pulse on IN-DATA 0 line 803 going to clock both latches 728 and 724. Latch 728 (COMMAND N1) will always set when the first pulse after IN-VALID 801 occurs on IN-DATA 0 line 803, and indicates that an attempt has been commanded to connect Node (N) to Tail 1. Latch 724 (LCONNECT N1) controls the actual making of the connection, but it will not set if Tail 1 is supporting a previous connection (from Tail 2) as detected by gate 734. Gate 734 detects whether Tail 1 is IDLE and is available to make a connection, or if it is previously busy. The OUT1 IDLE signal 839 goes to AND gate 732 and OR gate 726 to latch 724; this permits only latch 724 to set if Tail 1 is IDLE (not busy) when the first pulse on IN-DATA 0 line 803 occurs. The other input to AND gate 732 comes from NOR gate 742, which is initially a 1 and turned to 0 by first pulse after IN-VALID 801 occurring on either IN-DATA 0 line 803 or IN-DATA 1 line 809. This is the control that permits only the first pulse after IN-VALID to be used for routing, all subsequent pulses are transmitted as data and have no effect on latches 728 and 724 because of NOR gate 742.

If LCONNECT N1 latch 724 sets, OUT1 IDLE 839 goes to 0 to prevent Tail 2 from connecting to Tail 1. Also LCONNECT N1 724 being set establishes connections (after going through delay 740) from all eleven input lines from Node (N) to all eleven output lines to Tail 1. Delay 740 is equal to the pulse width of the first pulse on IN-DATA 0 803, and delays the connection from Node (N) to Tail 1 from being made until the pulse has gone to 0—this strips the pulse from the data train. A typical connection is shown by IN-DATA 0 803 going through gate 760 and OR gate 726 to OUT1M-DATA 0 813. Likewise, an ACCEPT line connection is formed in the reverse direction, as shown by OUT1-ACCEPTN 817 going through gates 772 and 776 to connect to IN-ACCEPTN 807. However, REJECT line 805 is formed differently and cannot be a direct connection like ACCEPT 807, because when operating in the non-blocking mode REJECTs 873, 887 must be received from both tails before they are passed to Node (N) on line 805. When trying Tail 1 and Tail 2 simultaneously, in all cases one of the tails will receive a REJECT 805. If a connection is successful, one tail will form the connection and the other tail will be rejected. This special function is handled by gate 748 which detects a REJECT on a per tail basis by detecting the case where latch 728 is set and latch 724 is reset—this means that a connection has been commanded but not made. In that case, IREJECT N1 861 is sent to OR gate 754, which is always held at a 1 when latch 728 is reset. NAND gate 756 checks that REJECT N1 873 and REJECT N2 887 are both active before driving a 0 to IN-REJECTN 805 to indicate a reject.

If COMMAND N1 837 and COMMAND N2 867 are both active, both IREJECT signals 861, 863 have to be active in order to drive a 0 to IN-REJECTN. However, if either of the COMMAND N1 latch 728 or COMMAND N2 latch (not shown, but signal is shown on line 867) is not active, it will control gates 754 or 752 correctly, so that only the active IREJECT signal 873 or 887 controls the driving of IN-REJECTN 805 to 0.

IREJECT gate 748 can be activated in either of two ways: 1) Tail 1 is busy when the connection is first attempted, or a REJECT arrives from Tail 1 over OUT1-REJECTN 815. The reject arriving on OUT1-REJECTN 815 goes through gates 766 and 770 to reset latch 724 via gate 722. This automatically breaks all connections between Node (N) and Tail 1, as typically identified by gates 760 and 762. It also immediately issues IREJECT 861, because latch 728 is set and latch 724 is reset. Latch 728 resets only when IN-VALID 801 returns to 0 at the end of a message or if IN-REJECTN 805 goes to 0.

Figure 23:
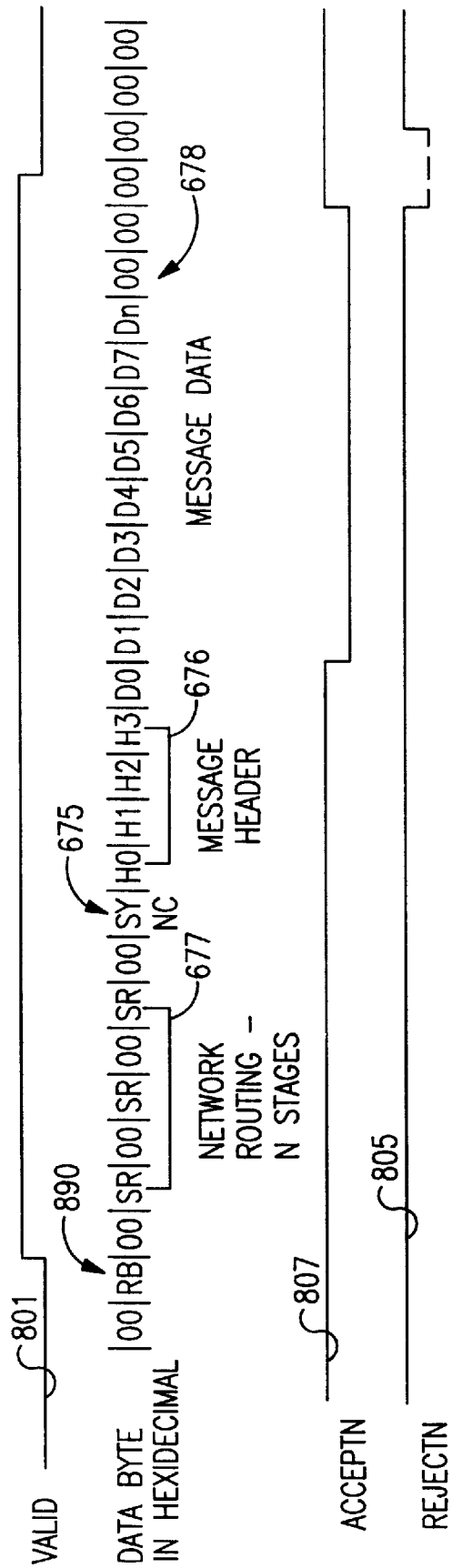
FIG. 23 is a timing diagram showing the transfer of a data message over either of the two tails according to this invention.

Referring to FIG. 23, VALID 801 stays active until either REJECTN 805 goes negative, or ACCEPTN 807 is negative and returns to being positive.

When using a central switch and implementing a non-blocking network as shown in FIG. 6, network adapter 106 searches for a connection path and reduces connection latency by sending the same connection command over lines 371, 365 to both sub-networks 364, 366 (over both tails) simultaneously. In a first method, adapter 106 tries to establish a connection over one alternate path in both sub-networks 364, 366 simultaneously, for the purpose of making a connection between sending node, say 360, and the selected receiving node, say 362. Three options are possible:

1. Neither path attempt is successful (both paths receive REJECTN responses 805 on lines 373 and 377)—in which case, sending node 360 adapter 106 cancels both paths and tries two other alternate paths simultaneously (corresponding paths in the two different sub-networks 364, 366 of FIG. 6 are tried). For instance, adapter 106 first tries alternate path 1 in both sub-networks 364, 366 simultaneously. If both paths are blocked it then tries alternate path 2 in both sub-networks simultaneously, etc.

2. One path is successful (only one path receives a REJECTN 805 response)—in which case, sending adapter 360 breaks any partially established unsuccessful path and maintains the successful path.

3. Both paths get through the network 364, 366 successfully and arrive at receiving adapter 362 over different tails 383, 387—in which case, receiving adapter 362 rejects one of the paths at its discretion by issuing REJECTN 815 to one path only.

Referring further to FIG. 22, the hardware apparatus disclosed gives the 2-tailed adapter the flexibility of functioning in three different modes: non-blocking mode or direct or cube connection mode. The three modes are very different. In the non-blocking mode (as shown in FIG. 6) sending node, say 360, adapter 106 tries to establish a connection over two to 2 m sub-network paths simultaneously. Thus, it sends identical data to both tails 371, 375 simultaneously. In the direct or cube modes (as shown in FIG. 12E), with respect to node 641, tails 651, 654 and 662 are treated separately and can make connections in any of the six following ways:

a. Node 641 can make a connection via tail 1 651 only,
b. Node 641 can make a connection via tail 2 654 only,
c. Tail 1 651 can make a connection to tail 2 654,
d. Tail 2 654 can make a connection to tail 1 651,
e. Tail 1 651 can make a connection to node 641,
f. Tail 2 654 can make a connection to node 641.

Three of these connections (a) through (f), supra, can occur simultaneously, because the tails are full duplex.

ADVANTAGES OVER THE PRIOR ART

The advantages of the method of the preferred embodiment of this invention include:

The two network approach greatly reduces the complexity of the CLOS middle network stages from the order of N/4 for the one CLOS network to the order of N/8 for each of two networks. This results in an overall saving which ranges from ¼ to ½ fewer switch chips being required to construct an interconnect system having the identical non-blocking characteristics. The extent of saving varies depending on the size of the network, the larger the network the more the saving. This feature makes the invention extremely useful for scaling to larger networks.

A key advantage of the invention is the elimination of unused ports at the network and the ability to construct networks from a single switch chip, which has the same number of ports used at every stage of the network.

In addition, the method of using two networks to provide the non-blocking feature, also provides network redundancy which is required for continuous availability. If the redundant networks are kept completely separate and powered by different power supplies, one network can continue to function if the other network fails or is powered off for repair. The one functioning network will still provide an excellent interconnection network, which is blocking but provides a "near non-blocking" network having middle stages of the capability N/8. The performance of the network will decrease when one network is powered off or failed, but the effect on over-all performance will be negligible to a 25% reduction in network bandwidth depending upon the traffic in the network at any particular time.

Another advantage provided by the two-tailed adapter is the ability to use the adapter to interconnect a plurality of nodes without requiring the use of a central switch.

ALTERNATIVE EMBODIMENTS

It will be appreciated that, although several specific embodiments of the invention have been described herein for purposes of illustration, various modifications may be made without departing from the spirit and scope of the invention.

For example, the two-tailed adapter is good for interconnecting up to three nodes with direct, non-blocking connections. For more than three nodes a blocking ring network can be formed. The connection logic structure and method of the invention can be further expanded to adapters having more than two tails. For instance, a 3-tailed adapter would be used for interconnecting up to four nodes without blocking, and up to eight nodes in a hyper-cube type network without requiring a central switch.

Accordingly, the scope of protection of this invention is limited only by the following claims and their equivalents.

We claim:

1. A scalable, non-blocking network apparatus for interconnecting at least two nodes, comprising:
   at each said node, a 2-tailed sending adapter, and a 2-tailed receiving adapter;
   a centralized multi-stage network, including:
      first and second redundant sub-networks, each uniquely controlled, operating simultaneously, and having a plurality of ports, said first and second sub-networks being uniquely controlled and functionally independent; and
      a connection topology for making a full-duplex connection from each sub-network port to one of the two tails of one said sending adapter and to one of the two tails of one said receiving adapter.

2. The apparatus of claim 1, further comprising for each redundant sub-network a separate power source for providing continuous availability, whereby any said sub-network can continue to function upon another sub-network failing or being powered off for repair.

3. The apparatus of claim 1, wherein said connection topology implements alternative communication paths through said sub-networks between said sending adapters and said receiving adapters, whereby non-blocking is provided.

4. The apparatus of claim 3, further comprising means for searching alternative paths through said sub-networks, one path at a time in series, until a connection can be established between an originating sending adapter and a requested receiving adapter.

5. The apparatus of claim 4, wherein each said sub-network includes three stages, each stage including a plurality M of M×M unidirectional switch chips and with each middle stage switch chip providing an alternative path through said sub-network.

6. The apparatus of claim 5, wherein M=8.

7. The apparatus of claim 1, said sending adapter further including means for simultaneously searching identical alternate paths, one at a time in series, through each of said sub-networks until a connection is established in one sub-network.

8. The apparatus of claim 7, further comprising means responsive to the establishment of a connection through said first sub-network for immediately clearing any partial connections established through a corresponding alternate path in said second sub-network, whereby said corresponding alternate path is made available to service other connections.

9. The apparatus of claim 7, said sending adapter further comprising means responsive to one of said sub-networks being disabled, the other sub-network being enabled, for responding to connection requests only from the enabled sub-network yet sending identical connection requests simultaneously to both the enabled and disabled sub-networks.

10. The apparatus of claim 4, wherein said sending adapter further comprises means for simultaneously searching identical alternate paths, m at a time in both sub-networks until one connection is established in either sub-network, and where m is an integer between 2 and the maximum number of alternate paths provided by each said sub-network.

11. The apparatus of claim 7, wherein said sending adapter further comprises means for simultaneously searching identical alternate paths, m at a time in both sub-networks until one connection is established in either sub-network, and where m is an integer between 2 and the maximum number of alternate paths provided by each said sub-network.

12. The apparatus of claim 3, said connection topology further comprising an extra alternative path, whereby said network non-blocking characteristic is maintained upon failure of an alternative path in said network.

13. Non-blocking and path searching network comprised of two sub-networks each comprised of first, last, and middle stages, wherein said two sub-networks operate simultaneously and combine to form a single network having a plurality of input and output ports for interconnecting a plurality of nodes, both said sub-networks interconnecting said nodes by 2-tailed adapters located at each node, each sub-network being uniquely controlled and functionally independent, wherein said network provides 2n−1 alternate paths from each input port to each output port through a middle stage of the order N/8 in each sub-network; where n=the number of input ports=the number of output ports per switch chip, and N=the number of input ports=the number of output ports for the entire network.

14. Communication network apparatus for connecting a plurality of nodes, comprising:
   a first sub-network and a second sub-network, each said sub-network including three stages, each stage having a plurality of switch chips, each switch chip having n input ports and n output ports, said three stages including a first stage having N input ports, a last stage having N output ports, and a middle stage of the order N/8, said two sub-networks operating simultaneously and each sub-network being uniquely controlled and functioning independently;
   each said node including a 2-tailed adapter, each sub-network being connected to one of said two tails; and
   means for interconnecting said 2-tailed adapters to form a single network with 2n−1 alternate paths from said first sub-network and said second sub-network.

15. Method for establishing communication between a plurality of nodes over a network including two identical sub-networks, each node including a two-tailed sending adapter and a two-tailed receiving adapter, wherein each said sub-network interconnects to one tail of said two-tailed sending adapter and to one tail of said two-tailed receiving adapter and each sub-network is uniquely controlled and functionally independent, said method of communication comprising the steps of:

simultaneously searching alternate paths through said sub-networks, one path at a time in series, until a connection is established between an originating sending adapter and a requested receiving adapter; and responsive to establishing a connection through one sub-network, immediately clearing any partial connections established through a corresponding alternate path in the other second sub-network.

16. Method for establishing communication between a plurality of nodes over a network including two identical sub-networks, each node including a two-tailed sending adapter and a two-tailed receiving adapter, wherein each said sub-network interconnects to one tail of said two-tailed sending adapter and to one tail of said two-tailed receiving adapter and each sub-network is uniquely controlled and functionally independent, said method of communication comprising the steps of:

simultaneously searching identical alternate paths, one at a time in series, through each of said sub-networks until a connection is established in one sub-network from a sending adapter at one node to a receiving adapter at another node; and responsive to establishing a connection through one sub-network, immediately clearing any partial connections established through a corresponding alternate path in the other second sub-network.

\* \* \* \* \*